United States Patent
Olevsky et al.

(10) Patent No.: US 8,216,439 B2
(45) Date of Patent: Jul. 10, 2012

(54) HYBRID SLIP CASTING-ELECTROPHORETIC DEPOSITION (EPD) PROCESS

(75) Inventors: Eugene Olevsky, San Diego, CA (US); Xuan Wang, Chandler, AZ (US); Margaret Stern, Leesburg, VA (US)

(73) Assignee: San Diego State University (SDSU) Foundation, San Diego, CA (US)

( * ) Notice: Subject to any disclaimer, the term of this patent is extended or adjusted under 35 U.S.C. 154(b) by 771 days.

(21) Appl. No.: 12/161,936

(22) PCT Filed: Feb. 2, 2007

(86) PCT No.: PCT/US2007/002993
§ 371 (c)(1),
(2), (4) Date: Jan. 30, 2009

(87) PCT Pub. No.: WO2007/092363
PCT Pub. Date: Aug. 16, 2007

(65) Prior Publication Data
US 2009/0288952 A1 Nov. 26, 2009

Related U.S. Application Data

(60) Provisional application No. 60/764,966, filed on Feb. 3, 2006.

(51) Int. Cl.
*C25D 13/12* (2006.01)
*C25D 13/22* (2006.01)
(52) U.S. Cl. ........ 204/483; 204/471; 204/484; 204/487; 204/622; 204/625

(58) Field of Classification Search ............ 204/471, 204/483, 484, 487; 205/622, 625
See application file for complete search history.

(56) References Cited

U.S. PATENT DOCUMENTS

| | | | |
|---|---|---|---|
| 4,121,987 A | 10/1978 | Ryan et al. | |
| 4,357,222 A * | 11/1982 | Lucek | 204/472 |
| 5,027,018 A * | 6/1991 | Kindlmann et al. | 327/434 |
| 5,498,383 A | 3/1996 | Marple et al. | |
| 6,479,406 B2 * | 11/2002 | Gal-Or et al. | 438/785 |
| 6,627,433 B2 * | 9/2003 | Frazier et al. | 435/288.7 |
| 2003/0178307 A1* | 9/2003 | Sarkar | 204/483 |

OTHER PUBLICATIONS

Goring et al., Nano Letters (2004) 4(6):1121.
International Search Report for PCT/US2007/002993, mailed on Sep. 27, 2007, 2 pages.

* cited by examiner

*Primary Examiner* — Bruce Bell
(74) *Attorney, Agent, or Firm* — Gavrilovich, Dodd & Lindsey LLP; Gregory P. Einhorn

(57) ABSTRACT

The invention provides novel a hybrid slip casting-Electrophoretic Deposition (EPD) process which can be used to produce arbitrary shape geometries with controlled materials properties. The invention provides processes for the fabrication of Functionally Graded Materials (FGM) by a controlled Electrophoretic Deposition (EPD).

20 Claims, 35 Drawing Sheets

HYBRID SLIP CASTING-ELECTROPHORETIC DEPOSITION (EPD) PROCESS

FIELD OF THE INVENTION

This invention provides novel a hybrid slip casting-Electrophoretic Deposition (EPD) process which can be used to produce arbitrary shape geometries with controlled materials properties. The invention provides processes for the fabrication of Functionally Graded Materials (FGM) by a controlled Electrophoretic Deposition (EPD). The invention provides products of manufacture comprising Functionally Graded Materials (FGMs) made by processes of the invention.

BACKGROUND OF THE INVENTION

Electrophoretic Deposition (EPD) is a technique which is used to deposit particles from a slurry under an external electric filed. Ceramic, polymer and metallic powders have been successfully deposited using this technique.

Functionally Graded Materials (FGM) are composites in which the materials composition varies with respect to spatial locations. Composites are developed to obtain enhanced materials properties. However, material interfaces generate many problems, especially residual stresses which often obstruct structure/component integrity and reliability. FGM enable smooth transitions between materials. Therefore the residual stresses are minimized.

The traditional methods of producing FGM include slip casting. For example, Basil et. al., U.S. Pat. No. 5,498,383, described fabrication of complex shape geometries by slip casting to produce FGM. However, this method requires the preparation of slurries with different composition ratio. The graded structure was achieved by circulating the slurries. Therefore, the process takes much longer time than the invented hybrid process.

EPD as a method to produce FGM was first explored by Sarkar and Nicholson. Most of the research to produce FGM by EPD are focused on organic solvents, such as ethanol, acetone, IPA, methanol, etc. The reason here to use organic solvents instead of water is due to the bubble generation in aqueous EPD. The bubbles formed by hydrolysis of water will lead to pinholes which severely undermine the quality of the deposits. Lucek, U.S. Pat. No. 4,357,222, described an electrophoretic slip casting process. However, in order to avoid the bubble formation and decomposition of deposit, very low voltage was used in this invention. The low voltage inevitably limits the shaping rate so it's not efficient for batch production. Ryan William et. al., U.S. Pat. No. 4,121,987, developed an electrophoretic slip casting procedure in which an electrically-conductive porous carbonaceous mould is employed. An osmotic pressure is applied inside the mold in order to remove the gas bubbles formed by the electrolysis of water. It is difficult to control this slip composition so it's not convenient to produce FGM. Moreover, the deposition electrode has to be carefully manufactured since the irregularity of the cathode will lead to local defects in the deposit. All the shortcomings prohibit its application especially in producing FGM.

Until 1994, EPD was believed to be a faradic process, in which the reduction of charged particles has to occur at the deposition electrode. All the above-mentioned inventions didn't realize this characteristic and involved complicate processing techniques. In 1994, Sarkar and Nicholson proved by studies that EPD is a non-faradic process. They developed the membrane method to overcome the problem of bubble formation. However, the shape of the deposit is difficult to control. Therefore, the membrane method was limited to simple shapes. Clasen et. Al further developed the membrane approach by using a polymeric porous mold. Again the cost of mold manufacturing prevents its wide application. Moreover, his research did not address the fabrication of FGM using aqueous slurry.

The current similar technology such as slip casting can produce FGM but it is a very slow process so it is not suitable for batch production. Other technique such as powder stacking renders sharp interfaces causing residual stress build-up. In addition, organic solvent-based EPD is not environmentally friendly.

SUMMARY

This invention provides novel hybrid slip casting-Electrophoretic Deposition (EPD) processes which can be used, e.g., to produce products of manufacture (compositions) having designed, or arbitrarily-shaped, forms and geometries with controlled materials properties. The invention provides products of manufacture comprising Functionally Graded Materials (FGMs) made by processes of the invention. These shaped products of manufacture (compositions) can comprise components comprising a metal, ceramic, polymer (or equivalent compounds), or any combination thereof. In one aspect, these materials can be in the form of powders, e.g., comprising $Al_2O_3$, SiC, $ZrO_2$, zeolite 3A, zeolite 5A, $TiO_2$, Ni, Cu, etc. and equivalents; or at least are in form of a powder, which is made into a slurry with water, particle charging agent, binder, deflocculant and dispersant to make the slurry, which is subsequence applied to a mold operatively linked to an electrical field (a mold to which can be applied an internal electric field or an externally-applied electric field).

Through adjustment of the (internal or external) applied electric field and selective shielding of the electrical field, the particles in the slurry—comprising the powders of defined composition (metal, ceramic, polymer, etc.)—are selectively deposited onto mold, e.g., a porous mold, to form deposits. By changing the slurries' composition, the deposited component's composition can be precisely controlled. Compared to powder stacking process, there is no sharp interface in the materials produced by this method. Therefore, in one aspect, Functionally Graded Materials (FGM) can be produced based on this process. By changing the geometry of the deposition mold and/or the applied electrical field, components of any shape can be easily formed.

Instead of using organic solvents, the materials used in the process of this invention are completely environmentally friendly. Compared to traditional slip casting process, this method enables a straightforward framework for tailoring materials properties easily. Furthermore, the shaping process is much shorter compared to slip casting. Therefore, the processes of this invention can be scaled up for high efficiency volume production.

The invention provides hybrid slip casting-Electrophoretic Deposition (EPD) processes comprising a process as set forth in FIG. 2, and equivalent processes. The invention provides products of manufacture for hybrid slip casting-Electrophoretic Deposition (EPD) comprising a system as set forth in FIG. 1, and equivalent processes.

The invention provides processes for hybrid slip casting-Electrophoretic Deposition (EPD) comprising the steps of: (a) providing a powder comprising a metal, ceramic, polymer or an equivalent compound or any combination thereof, (b) mixing the powder with water, a particle charging agent, a binder, a de-flocculant and a dispersant to make a slurry; (c)

pouring the slurry such that it is selectively deposited onto a mold to form a deposit, wherein optionally the mold is a porous mold; (c) applying an electric field, thereby forming a desired shape and a Functionally Graded Material (FGM) from the slurry, wherein optionally the electric field is an externally applied electric field; wherein optionally the method further comprises drying and/or firing the electric field-shaped slurry.

In one aspect, the powder comprises $Al_2O_3$, SiC, $ZrO_2$, zeolite 3A, zeolite 5A, $TiO_2$, Ni, Cu, equivalents thereof or any combination thereof; or, the particle charging agent comprises n-butylamine as the particle-charging additive.

In one aspect, the mold comprises an aligned porous structure, and optionally the aligned porous structure is made by a unidirectional freezing followed by freeze-drying and sintering; after the aligned porous structures were sintered they are impregnated by brushing gold; and optionally after annealing at 600° C., gold wires having diameters ranging from several hundreds of nanometers to several micrometers were applied.

The invention provides processes Electrophoretic Deposition-Slip casting methods (processes) for near net shaping of articles comprising, or consisting of, the following steps: preparing a mold conforming to the shape of a desired casting geometry, wherein optionally the mold comprises a gypsum mold; preparing at least one suspension (slurry) to be used to deposit the articles desired, wherein optionally the at least one suspension (slurry) comprises a powder comprising a metal, ceramic, polymer or an equivalent compound or any combination thereof, and also optionally comprises a particle-charging additive, and optionally the at least one suspension (slurry) comprises a surfactant, which optionally comprises at least one, several or all of a dispersant, an electrosteric stabilizer, an electrostatic dispersant, a binders, wherein optionally the binder comprises phosphate ester; assembling the mold of step (a) in a silicone mold, or equivalent mold, wherein the mold of step (a) separates the said silicone or equivalent mold into two impermeable chambers; placing two electrodes at two ends of the said silicone or equivalent mold; pouring the at least one suspension (slurry) into a chamber A in the said silicone or equivalent mold, wherein optionally at least two suspensions (slurries) are added sequentially, or together (simultaneously); pouring an ionic solution into a chamber B of the said silicone or equivalent mold; applying an electric field to the said electrodes, wherein optionally the electric field comprises an external electric field; adding the said suspension (slurry) to the said chamber A of the said silicone mold or equivalent, wherein optionally the addition is by a circulation pump; drying the deposited suspension (slurry) (article) in the said mold of step (a) (optionally a gypsum mold) after deposition is complete; removing the casting from the said mold of step (a) (optionally a gypsum mold) and sintering or firing the article, wherein optionally the sintering or firing comprises a microwave sintering, pressureless sintering, hot isostatic pressing and/or by hot pressing in a rigid die.

In one aspect, the powder comprises $Al_2O_3$, SiC, $ZrO_2$, zeolite 3A, zeolite 5A, $TiO_2$, Ni, Cu, equivalents thereof or any combination thereof. In one aspect, the particle charging agent comprises n-butylamine as the particle-charging additive. In one aspect, the gypsum mold is a water permeable mold, optionally made from plaster of Paris, and optionally part of the said gypsum mold is covered with organic glue while the area to be deposited is exposed.

In one aspect, the suspensions comprise, or consist of: water or any hydrophilic solution, buffer or reagent, which optionally comprises, or consists of, distilled water, the said powders to be deposited, and a deflocculant, and optionally the powder concentration is from about 5% to 50% v/v, or from about 1% to 90%, or from about 10% to 40%, and optionally the suspension is processed for between about 1 to 60 minutes, or for about 10, 20, 30, 40, 50 or 60 or more minutes, wherein optionally the suspension is processed using a planetary ball mill.

In one aspect, the powders comprise metallic, ceramic or polymeric powders, and optionally the powders comprise a particle size ranging from about 40 nm to about 50 microns, or from about 30 nm to about 60 microns, or from about 10 nm to about 100 microns, and optionally the powder comprises any permutation of metallic, ceramic, polymeric, metal/ceramic composite, metal/polymer composite, polymer/ceramic composite, metal/ceramic/polymer composite.

In one aspect, the silicone mold is capable of holding the said gypsum mold, and optionally the said gypsum mold separates the said silicone mold into the said chamber A and chamber B, and optionally the silicone mold has elasticity which can ensure that there is no mixing of liquid in chamber A and chamber B. In one aspect, the electrodes are made of stainless steel.

In one aspect, the ionic solution comprises a water, wherein optionally the water is DI water, and tetramethylammonium hydroxide (TMAH). In one aspect, the pH of the ionic solution rages from between about pH 9 to about pH 13, or about pH 8, pH 9, pH 10, pH 11, pH 12 or pH 13. In one aspect, the electric filed comprises a DC voltage, and optionally the voltage ranges from between about 5 V to about 400 V, or about 5, 10, 20, 30, 40, 50, 60, 70, 80, 90, 100, 150, 200, 250, 300, 350 or 400 V.

In one aspect, the mixing and deposition steps (processes) are simultaneous, or alternatively, consecutive.

In one aspect, the sintering is done with a minimum of warping, which can be achieved by the process comprising: using particle sizes to control the sintering rate, creating a variable temperature gradient (which optionally can be with laserbeam surface heating), microwave sintering, electric discharge through a stepped and/or use of a tapered die.

The invention provides Functionally Graded Materials (FGMs) made by the processes of this invention.

The invention enables the net shape manufacturing of arbitrary shape geometries with controlled materials properties. The components to be shaped were first deposited onto a plaster of Paris mold by electrophoretic deposition in water. The shaped components can be metals, ceramics, polymers, and their combination as long as the material is in the form of powders. Through adjustment of an externally applied electric field and the shielding of electrical filed, the particles in the slurry are selectively deposited onto the porous mold which defines the desired geometry. By changing the slurries' composition, the deposited component's composition can be precisely tailored. Therefore, it is especially capable of producing Functionally Graded Materials (FGM). Compared to powder stacking process, there is no sharp interface in the materials produced by this method. By changing the geometry of the porous deposition mold, components of any shape can be easily formed.

Instead of using organic solvents, the materials used in the invented process can be completely environmentally friendly. Compared to traditional slip casting process, this method enables a straightforward framework for tailoring materials properties easily. Furthermore, the shaping process is much shorter compared to slip casting. Therefore, the invented process can be conveniently scaled up for high efficiency volume production.

FIG. 1 shows a schematic illustration of an exemplary setup of the invention. In one aspect, the deposition cell is divided by the deposition mold (plaster of Paris) into two chambers. The deposition cell can be made of non-conductive material, such as PTFE, PVC, and silicone rubber, etc. The pore size of the plaster mold is not critical. The plaster deposition mold confirms the shape to be formed. Part of the mold can be shielded by non-conductive and non-porous epoxy so that only the desired areas are exposed to the suspension.

In one aspect, two metallic electrodes are located in the deposition cell. The powder slurries made of desired depositing materials were poured into the slurry chamber. Through a circulating pump, the composition of the depositing slurry can be changed. Based on the kinetics of different materials' deposition, the deposited materials composition profile can be precisely controlled. The slurry is typically composed of particles, water, binders, wetting agents, particle charging agents and deflocculants. The particles have to be charged by adding particle charging agents before applying the deposition voltage. The particle charging agents can be base, acid or salt depending on the species of particle. The optimal amount of additives can be determined by DOE (Design of Experiments) methodology. In one aspect, the slurry is made homogeneous using a planetary mill. Ultrasonic vibration is also helpful to reduce the degree of particles' agglomeration.

In one aspect, the ionic solution chamber is filled with DI (De-ionized) water and polymeric base to provide a conductive path for the EPD circuit. The pH of the solution can be optimized depending on the slurry species.

In one aspect, a DC power supply is connected to the two electrodes. The voltage of deposition can be as high as desired. Higher voltage can reduce the deposition time significantly. However, the higher voltage applied, the more heat will be generated by Joule heating of slurry. Overheat of the slurry may lead to the decrease of the stability of the slurry. The temperature of the slurry can be maintained at room temperature by placing the entire deposition cell into a water bath.

The deposition time can range from several seconds to minutes depending on the thickness to be deposited.

In one aspect, after the desired shape and thickness are deposited, the plaster mold together with the deposit was dried in air. Freezing of the green deposit helps to remove the deposit from the plaster mold. The frozen green deposit can be then dried by freeze-drying.

In one aspect, the dried deposits are subject to sintering to be densified depending on their application.

Due to the inhomogeneous nature of FGM, shape change and distortion may occur during sintering of green deposits; thus, an optimization procedure of the invention, based on continuum modeling of sintering, can be used to enable net shaping.

FIG. 2 illustrates the procedure to produce the FGM components with complex geometries by the invention.

These and other advantages of the present invention will become apparent upon reference to the accompanying drawings and the following description.

The details of one or more embodiments of the invention are set forth in the accompanying drawings and the description below. Other features, objects, and advantages of the invention will be apparent from the description and drawings, and from the claims.

All publications, patents, patent applications cited herein are hereby expressly incorporated by reference for all purposes.

BRIEF DESCRIPTION OF THE DRAWINGS

Like reference symbols in the various drawings indicate like elements.

DETAILED DESCRIPTION

Figure 1:
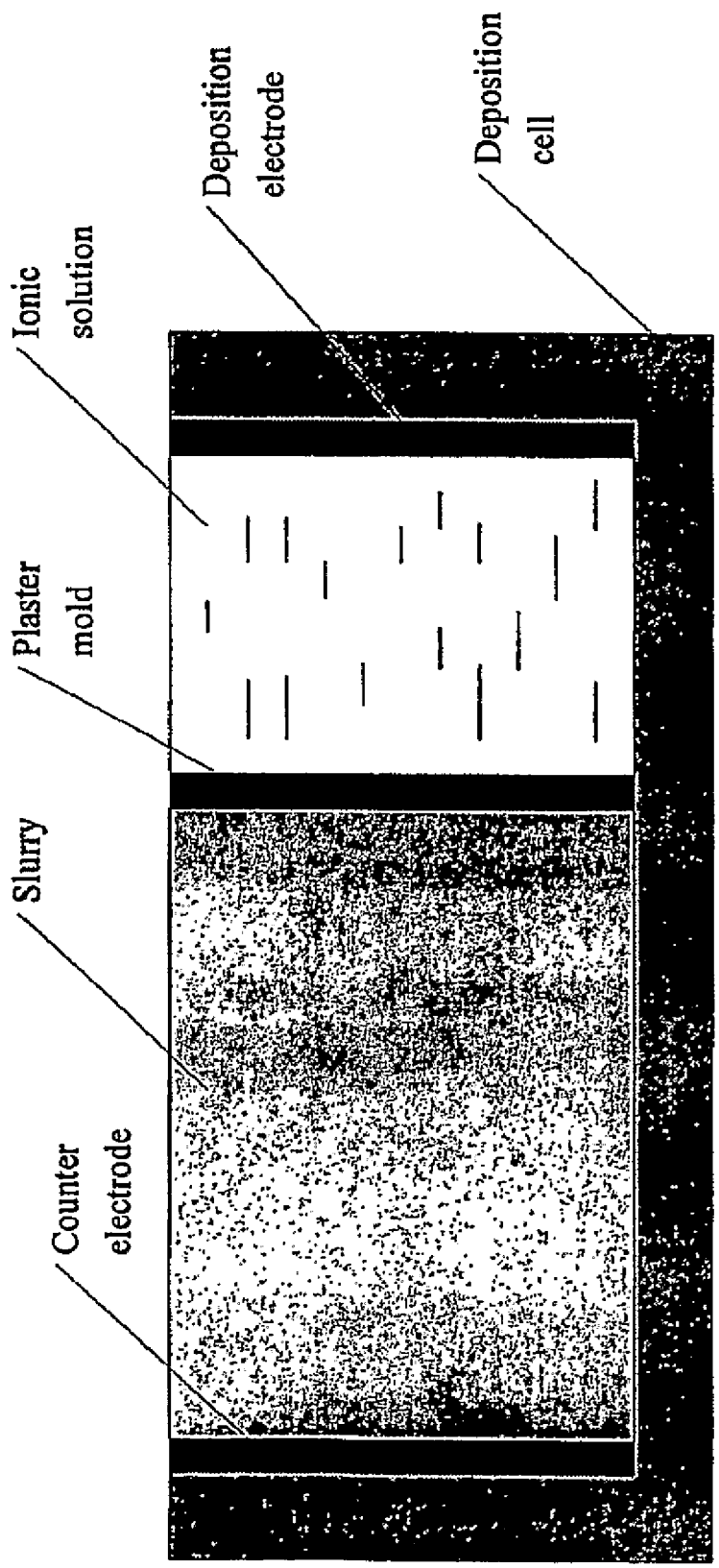
FIG. 1 shows a schematic illustration of a setup configuration of an exemplary process of the invention.

The invention provides novel, cheap, reliable and convenient methods to produce the complex-geometry Functionally Graded Materials (FGM). The materials used in this invention are similar with those used in slip casting, which is widely employed in industry. Therefore, the production line of this invention can be easily upgraded to implement this invention. Compared to slip casting, the current invention has much higher efficiency which enables the high volume production.

The invention provides processes comprising Electrophoretic Deposition (EPD) followed by slip casting. The invention enables the net shape manufacturing of arbitrary shape geometries with controlled materials properties. The shaped components can be metals, ceramics, polymers, and their combination as long as the material is in the form of powders. Through adjustment of an externally applied electric field and the shielding of electrical filed, the particles in the slurry are selectively deposited onto the porous mold which defines the desired geometry. By changing the slurries' composition, the deposited component's composition can be precisely tailored.

The invention also provides products of manufacture, or devices, to practice the methods of this invention. In one aspect, a device of the invention comprises a mold and a component that can precisely, or roughly adjust, an internal or external applied electric field. In practicing the processes of the invention, the electrical field is selectively shielded; thus, the particles in the slurry—comprising the powders of defined composition (metal, ceramic, polymer, etc.)—are selectively deposited onto the mold, e.g., a porous mold, to form deposits. By changing the slurries' composition, the deposited component's composition can be precisely controlled, including components from an aqueous suspension.

The invention can conveniently produce various Functionally Graded Materials (FGM). The process is easy to scale up for high volume production so that the cost of the production can be very low. This method is ideal for various industries which require advanced materials.

One exemplary application of the devices and Functionally Graded Materials (FGM) made by the processes of the invention is as substrates in an electronic or computer device, e.g., as in semiconductor packaging. Cooling is the bottleneck of the next generation high power computer chips. The substrate material is usually ceramics, which have poor thermal conductivity. By practicing the methods of this invention, metal-, ceramic- and/or polymer-graded substrates can be easily made. These substrate can have both high thermal conductivity and tailored thermal expansion coefficient similar to semiconductor die to minimize thermal stresses.

Another exemplary application of the devices and Functionally Graded Materials (FGM) made by the processes of the invention is to produce bio-implants with graded structure(s). The Functionally Graded Materials (FGM) made by the processes of the invention can give the outer surface of bio-implants the required high wear resistance and the inner part the required high fracture toughness. While there are no monolithic materials which can satisfy these requirements, the Functionally Graded Materials (FGM) made by the processes of the invention can meet these requirements. Bio-implants of this invention can be made with very low cost and within very short time period.

In one aspect, this invention provides a complex engineering approach. In order to make Electrophoretic Deposition (EPD) successful, the slurry has to be stable, thus, stabilization of the slurry may require a comprehensive study of the appropriate colloid chemistry. The EPD parameter, such as voltage, current density, particle concentration, particle surface charging, breaking particle agglomeration, mold material and processing, etc., are important to control the materials properties.

The present invention also can be used in advanced materials processing, e.g., near net shaping. Through the optimization algorithm of this invention, the geometry can be inversely designed to achieve near net shape. The current invention also provides for free shaping of complex geometries by controlling the electric field distribution.

The invention provides for scaled up embodiments of these processes. All the materials and procedures, such as de-flocculants, particle charging agents, particle binders, suspension characteristics, porous mold materials, ionic solution composition, pH, EPD voltage, current density, etc. have been systematically investigated and the proper parameters have been validated to ensure the best quality deposits. Various materials have been tested and validated, such as $Al_2O_3$, SiC, $ZrO_2$, zeolite 3A, zeolite 5A, $TiO_2$, Ni, Cu, etc.

In one aspect, the invention provides Functionally Graded Materials (FGMs) comprising composite materials (and methods for making them, and devices for making them) in which the composition of the material varies with respect to spatial locations; and some embodiments, these compositions of the invention do not have the abrupt transitions in materials composition and properties within a component that often result in sharp local concentrations of stresses. By mitigating the severity of abrupt transitions in composition or microstructure at both the microscopic and macroscopic scales by the introduction of a graded structure, alternative embodiments of the invention can mitigate, control and distribute damage and failure.

In one aspect, the invention provides FGM components comprising engineered gradual transitions in microstructure and/or composition, the presence of which is motivated by functional performance requirements that vary with location within the part. Thus, the invention provides a novel approach to the fabrication of components for demanding applications, which has been termed in Japan as the "inverse design procedure". For example, the invention provides a method for making an effective protecting layer for space shuttles; because of the extreme high thermal shock attack when space shuttle escape and re-enter atmosphere, this protective coating should have as small as possible thermal stress.

In one aspect, the compositions of the invention provide, in addition to aerospace applications, various civil applications that demand advanced materials, including compositions for use in bioengineering, electronic industry and traditional mechanical disciplines. For example, compositions of the invention can improve wear resistance. In one aspect, the core of a mechanical component can be "softer", so that it could increase the fracture toughness of the component; and the surface can be "hard" to prevent wearing.

FGM compositions of the invention can have the following benefits:

(1) "Smoothing" of the transitions in thermal stresses across layers comprising materials with vast thermal expansion mismatch;
(2) Flexibility to tailor the magnitude of thermal stresses, and hence the onset and spread of plastic flow and cracking, by tailoring the geometry of the graded layer as well as the gradient in composition within that layer;
(3) Minimize or even fully eliminate the deleterious effects of stress concentrations and singularities at free edges;
(4) Enabling the deposition of thick protective ceramic layers (of 1 mm thickness or higher) by thermal spraying on to metallic substrates.

The methods of the invention can incorporate the two basic requirements to evaluate a mechanical component: geometry and properties; and can incorporate two main categories to manufacture a part with designated shape: additive and subtractive processes, respectively. In an exemplary subtractive process of the invention, part of the raw material is removed by an external force so that the material is finished with a desired shape and tolerance. Subtractive processes of the invention can include regular machining, such as lathing, drilling, milling and so on.

Processes of the invention can also (further) comprise (include) "additive processes"; during these exemplary processes, materials are fabricated by "accumulation" so that in the end, a given shape is obtained. Additive processes that can be used to practice this invention (further) comprise (include) casting, powder metallurgy, laser rapid prototyping, Chemical Vapor Deposition (CVD), Physical Vapor Deposition (PVD), etc. Subtractive processes are easier to control the final shape, but it's hard to control the material's properties precisely. On the other hand, additive processes are easier to control the material properties and microstructure, but it's difficult to control the final shape precisely. As a result, additive processes are usually limited to rough manufacturing and need further subtractive processes to obtain a desired shape.

As mentioned earlier, FGMs of the invention can be "inversely designed", which means that the materials composition and properties can be tailored carefully. Processes of the invention can also (further) comprise (include) "powder metallurgy" to produce bulk FGMs. In one aspect, "sintering" is necessary to consolidate the green components (in one aspect, sintering is a method for making objects from powder, by heating the material (below its melting point) until its particles adhere to each other). However, due to the intrinsic heterogeneous nature of FGM (they are intentionally designed to be heterogeneous), shape changes during sintering are inevitable. In order to get the desired final shape after sintering, the initial shape has to be "predicted" (that is, optimized) by modeling. Thus, in one aspect of methods of this invention, initial green FGM components have to be shaped before sintering. Electrophoretic Deposition (EPD) processes of the invention can achieve this goal.

Electrophoretic Deposition (EPD) processes of the invention can comprise an additive (see above) technique; and thus provide advanced composites where both geometry and property requirements for final product are taken into account. Electrophoretic Deposition (EPD) processes of the invention also can tailor the microstructures and properties by EPD.

In some embodiments, as long as the material is in the form of powder, it can be shaped by EPD. Categories of materials which can be used for EPD processes of the invention can comprise ceramics, metals, composites, polymers or any combination thereof, e.g., metal-ceramic composites; metal-polymer composites; ceramic-polymer composite.

In some embodiments, from the viewpoint of geometry, thin and thick films are alternative applications for EPD processes of the invention; 3-D geometries are also possible to be shaped by EPD processes of the invention. The geometry of parts shaped by EPD processes of the invention depends on the configuration of the deposition electrode. Therefore, 3-D complex shapes could be shaped by EPD processes of the invention. In some embodiments, by changing the composition of suspension, FGMs can be conveniently obtained without too much difficulty. In some embodiments, an advantage of EPD to shape FGMs is that it can provide smooth transitions from one material to another without concentration steps.

FGM fabrication routes that can be used to practice this invention can be classified into two main categories: constructive processes and transport based processes, respectively. In constructive processes, the gradients are literally constructed according to the designed profiles. In transport-based processes, the gradients are achieved by natural transport phenomena to create gradients within a component. These exemplary processes utilize fluid flow, diffusion of atomic species, or the conduction of heat to create gradient in either local microstructure or macroscopic composition distribution.

Conventional Solid-State Powder Deposition

In some embodiments, to produce FGM a preform made of two powders with gradient composition profile is first fabricated. If the mutual diffusion in the subsequent processing is negligible, the initial gradient distribution is retained throughout the process. The powder preforms are then densified by pressureless sintering, hot isostatic pressing, or by hot pressing in a rigid die.

In alternative embodiments, the initial gradient preform can be fabricated by a variety of powder layering techniques, which vary from hand packing of discrete powder layers to highly automated systems adapted to various geometries. One exemplary technique is to prepare and stack discrete layers of uniform composition to obtain initial unidirectional gradient. A continuous version of this technique is the thin sheet lamination technique, which consists of the successive formation of individual layers of powder slurry between 100 and 1500 µm thick with a blade shaped container, followed by the drying of organic additives.

In alternative embodiments, several variations of powder stacking are used. For example, filtering of fine nickel particles through one side of a porous alumina powder preform can be used to create a decreasing concentration of nickel particles from the surface inwards, which was predicted by a filtration theory. In another approach, a cake is built up from a mixed suspension of nickel and alumina with the compositional gradient being formed by steady alteration of the particle volume fractions in the suspension. Automated systems can be used to produce 1-D or 2-D FGMs of the invention; they can be based on mixing of powders by continuously changing the composition. They can be either solid state or in mist.

In alternative embodiments, to consolidate the FGMs, free sintering, hot isostatic pressing, and/or pressing in a rigid die can be used, or, for consolidating FGM—underwater shock consolidation can be used.

Liquid Phase Sintering

In alternative embodiments, liquid phase sintering is used, and it differs from solid phase sintering in that one of the constitutive phases is heated up to melting. Due to the presence of the liquid phase, a very high refractory phase fraction can be achieved. Because the liquid phase can macroscopically flow, the stresses in the produced FGM are low. Liquid phase sintering can be used to densify FGM. The main drawback of liquid phase sintering of FGM is the migration of liquid phase, resulting in the homogenization of the gradient structure. Solid particles can be out of their equilibrium shape in the as sintered composites, causing an excess in capillary energy which drives fluid flow.

Infiltration

In alternative embodiments, infiltration processing is used, and it involves the production of gradient porosity preforms, followed by sintering and infiltration. In one aspect, in order to infiltrate melted metals into the refractory preforms, the pores have to be open and to have some mechanical strength to support the matrix. Therefore, there exist two volume fraction limits of the refractory phase: (1) The volume fraction at which there is sufficient continuity of refractory phase elements for the preform to have some mechanical strength; (2) The volume fraction at which most porosity is closed in the refractory preform. The second limit is, for equiaxed, equi-sized powder particles, ~90% volume fraction.

Depending on the processing route used, infiltration processing can be both a constructive and a transport-based process. In the first case, the preforms are fabricated by constructive process; while in the latter one, the preform is produced by transport-based process. Aluminum pistons locally reinforced along their crown surface can be produced using preforms containing four layers of distinct volume fraction, which are created using conventional slurry and binder method. In another approach, ceramic volume fraction variations can be created by varying the pH of the colloidal silica solution initially present within a fiber preform, time dependent pH variations causing spatial binder content gradients due to non-uniform drying rates within the preform.

In alternative embodiments, partial sintering can be used to provide sufficient preform strength during infiltration without using a binder. A body containing porosity gradients can thus be produced using spatially varying blends of refractory fibers, particles, etc., of uniform diameter, and then partially sintered free of warping, while preserving initial porosity gradients. In alternative embodiments, graded filter production is used to prepare FGM preforms for infiltration.

In alternative embodiments, the dependence of sintering rate on particle size can also be used create a tungsten preform containing four layers of particles with diameters varying from 1 to 3 µm. This approach produced, after sintering and infiltration, a composite containing layers with W volume fractions of 68, 78, 85, and 100%. To avoid problems of preform cracking due to differential sintering, each layer can be ball milled and pre-pressed separately before sintering.

Reactive Powder Processes

In alternative embodiments, combustion synthesis is used to produce FGM. In alternative combustion processes, two or more phases exothermally react; the heat that is released sustains the reaction. By spatial variation of reactant distribution, functionally graded materials can be produced. In combustion synthesis, the cooling and heating rate are extremely high; therefore, liquid phase dwelling times are rather short. Compared to liquid phase sintering, FGM fabrication by combustion synthesis is therefore somewhat less prone to gradient elimination by the homogenization of the structure.

In alternative embodiments, powder preform preparation in combustion synthesis processes are used, e.g., by layer stacking. Powder layer stacking also can be used for the production of a component having cylindrical symmetry, using a series of concentric tubes to pack the powders, followed by cold extrusion before reaction. In alternative embodiments, computer-controlled powder layering hardware is used for subsequent combustion synthesis of FGMs. Despite the short duration of this process, as with other powder based processes, the occurrence of unwanted reaction products (such as Cu—Ti intermetallics after combustion of Cu—Ti—B mixtures, or TiB and $Ni_3Ti$ in Ti—B—Ni mixtures can be a concern.

In alternative embodiments, combustion synthesis of FGM structures also can be used in the context of welding to produce gradual transitions between the two parts to be united while taking advantage of the high heat evolved to bond the structures.

Because of the high porosity in the resulting material, combustion synthesis of FGMs can be combined with hot pressing in a closed die, shock electro-magnetic force, and hot isostatic pressing. Control of the combustion temperature, which must satisfy the dual requirements of being sufficiently high everywhere to cause densification of even the most refractory layer, yet not so high as to cause evaporation of a phase present in the structure, is necessary. Thus, it can be important to maintain a uniform adiabatic reaction temperature throughout the graded structure by the addition of pre-reacted diluents made of the refractory phase. In the self-propagating process mode, with increasing inert diluent content in the powder mixture, combustion fronts can undergo a transition from stable to unstable propagation, which causes microstructural heterogeneity in the resulting product.

Plasma Spray Forming

In alternative embodiments, plasma spray forming used with the processes of the invention; it is a coating process; fabricated functionally graded layers can serve as an optimal transition between a bulk component and an outer coating that protects the remainder of the component from harsh conditions of temperature, corrosion, or erosion in the external service environment of the component. Particles with 100 µm diameter can be very rapidly heated and accelerated in the flame of plasma gun. Because it can simultaneously melt highly refractory phases and a metal, the composition profiles in FGMs can be preset by control of the relative feeding rates of the two powdered materials.

As a result of the high energy conferred by this process, even very refractory materials are melted in this exemplary process. As a consequence, the major drawback of this process is that the material should not decompose into elementary materials under such high temperatures. The high velocity, especially when the process is carried out in low pressure or vacuum environments, enables the deposition of relatively low porosity coatings, reducing the need for subsequent processing.

The deposition parameters of the two materials, such as distance between gun and substrate, carrier gas composition and feed-rate, arc voltage and current intensity, and spray chamber atmosphere, are generally different. One exemplary solution is to use a twin torch plasma deposition apparatus, allowing separate optimization of spray conditions for each constituent of the FGM.

Another exemplary approach is the single gun process. This has been accomplished by deliberately feeding the different powders separately, at individually appropriate locations within a plasma gun. In other aspects, a compromise set of values is chosen for process parameters, combined with a powder feeding arrangement designed to improve mixing of powders.

In the production of plasma sprayed FGMs, several atmospheres, such as air, low pressure gas, and vacuum can be used. A large variety of graded FGM layers can be deposited via this route. NiCrAlY interlayer can be used for $ZrO_2$ coating on metals. Other exemplary systems include: Cu—W, Cu—$B_4$C, $Al_2O_3$—$Cr_2O_3$, WC—Co, and Ni—$Al_2O_3$; these were also successfully fabricated. Resulting structures are generally somewhat layered, which may cause delamination problems in some structures. Post-deposition annealing processes can be employed to reduce porosity and altering the refractory phase morphology. Annealing in a temperature gradient can be used to sinter a deposited PSZ outer layer containing 30% porosity, without cracking of the ceramic, and without metal ingress through the ceramic, a process that was observed in uniform-temperature annealing.

Laser Cladding

Exemplary processes of the invention use (further comprise) laser cladding. A small quantity of a material A is placed on the surface of a substrate B, and melted together with a thin layer of the underlying B using a laser, a thin coating of A alloyed with some B, welded to the surface of the B substrate, is created. If this operation is then repeated, a graded succession of A layers progressively less and less alloyed with B, is created on the surface of the B substrate. Gradient profiles can be altered by controlling the number and thicknesses of initial A layers, and the melted zone depth, itself controlled by laser power and travel speed. Partial melting and dissolution of the substrate for each cladding pass implies that some evaluation of heat transport must be involved in tailoring the compositions of individual layers.

Laser cladding of Ti with Ti—Al alloys and the cladding of metals with particulate ceramic reinforcements can be used; however, there were difficulties with layer porosity and cracking in some cases. The most successful cladding was the Ti—Al system, where graded transitions containing up to four homogeneous layers from pure Ti to Ti-34.5 wt-% Al were produced.

Electroforming

Exemplary processes of the invention use (further comprise) electroplating (or "electrodeposition" in some literature), as a method of production of graded multi-component deposits of both metal-metal, and metal-ceramic types. Graded metal-metal foils of Cu—Ni and Cu—Zn deposited on to a conductive polymer have been produced using two alternative methods: (i) continuous current co-deposition, and (ii) pulsed current alternate deposition of the two components. In the second case, post-deposition annealing was used to smooth the compositional profile of the foil.

Ceramic particle reinforced metal coatings can be produced by adding ceramic particles to the electrolytic solution, and incorporating these particles into the growing metal layer during electrodeposition. Two principal methods can be used to create continuously graded layers of this type. In the former the current density is varied as a function of time, while in the latter the particle volume fraction in the suspension is varied.

By increasing the current density, the volume fraction of incorporated particles decreases. This phenomenon can be used to create graded layers of nickel and copper with a variety of ceramic particles, with the volume fraction of ceramic varying from about 5% to 22%. The obtained composite deposits can be microscopically homogeneous. To achieve further dispersion hardening of metal-metal deposits, the addition of ceramic particles to the electrolyte can be used.

Exemplary processes of the invention use (further comprise) FGM by electrodeposition to change the particle concentration in the plating bath as a function of time. The disadvantage of this method is that the plating solution must be renewed for each deposition batch, while the overall growth rates are not improved because particle volume fraction decreases with the increasing plating rate. However, a potential advantage is that instabilities in the deposit can be avoided by keeping current densities low. Functionally graded layers of nickel reinforced with fine (1.4 µm diameter) $ZrO_2$ particles can be produced by this process. The maximum volume concentration of $ZrO_2$ incorporated can be slightly above 30%. Smooth variations in ceramic concentration and microscopically homogeneous structures can be produced via this route. Particle incorporation can be influenced by the surface charge repulsion between suspended and plated particles, which explains the observation that the co-deposition increases for a given particle volume fraction in the plating solution as the specific surface area of the particle decreases (and hence as the particle diameter increases). At larger current densities, smaller particles tend to be less easily incorporated than larger ones. Another disadvantage of this processing route is the long time required to form a thick FGM layer. A total processing time can be 30 days for a coating thickness of 80 µm.

Vapor Deposition

Exemplary processes of the invention use (further comprise) vapor deposition; the principal advantage of vapor deposition is that the layers produced can be very thin. However, steep composition gradients lead to a reduced stability of the FGM in elevated temperature environments.

Partially reactive physical vapor deposition of metal-ceramic FGM can be accomplished, involving the combined deposition of one or several vaporized metal elements, with the simultaneous introduction of carbon or nitrogen atoms in the gas phase. The resultant composite is a mixture of the metals and associated carbides or nitrides. By varying in time the concentration of reactive gas that is introduced, FGM can then be produced. Ti—TiC and Ti—TiN multilayer films can be deposited on to various substrates using hollow cathode argon plasma assisted reactive physical vapor deposition. Subsequent heat treatment can be used to smooth the concentration gradient of the multilayer film.

Exemplary processes of the invention use (further comprise) a process combining metal evaporation and ion irradiation (developed at Hitachi for the production of Cu—$ZrO_2$ FGM layers on copper substrates). By altering the evaporation rate of the two phases, compositional gradients can be formed. The resultant FGM is a highly linear concentration profile across layers extending from pure copper to pure zirconia. Electron beam physical vapor deposition can be used to produce graded NiCoCrAlY bond coats on superalloy substrates by varying the deposition parameters (electron beam power, focus and pattern, and plasma assistance). Stepped variations in layer composition can be found. The performance of the graded coatings can be characterized. Magnetron sputtering can be used to produce graded transitions in multilayer coatings between an outer ceramic layer and an intermediate Ti—(C, N) layer.

Lamination Processes

Exemplary processes of the invention use (further comprise) lamination processes; this process can include the stacking of a large number of foils, followed by diffusion bonding and cold rolling. By varying the relative thicknesses of foils used across the structure, variations in phase volume fractions and layer widths, and hence in local properties, it is possible to produce FGMs. Individual layers of TiC/Ni—Mo cermets with TiC varying from 95 to 86 vol.-% were brazed together to produce cutting tools by this process.

Transport Based Processes

Mass Transport Processes

Exemplary processes of the invention use (further comprise) mass transport processes, which are old technologies to produce surface hardening coatings, such as carburization and nitriding. Most mass transport surface hardening processes in steel are based on diffusion of interstitial carbon and nitrogen atoms, which can be from gas (methane, propane, ammonia), solid compounds, and salt baths. Some other approaches include glow discharge or plasma, carburization, and nitriding (by which a plasma is created around the part). This approach can enhance the diffusion from the environment to the part.

Exemplary processes of the invention use (further comprise) carburizing and in carbonitriding, where the part is heated to the austenite temperature range (~900° C. for carbon steel). During subsequent quenching and tempering, the outer layer, being rich in carbon, is transformed to martensite. The outer layer transforms last, so that its expansion during the phase transformation is resisted by the remainder of the component. The resultant compressive surface stresses improve the fatigue resistance of the part. Boron is also at least partially interstitial in austenite. So it can also be used to create hard surface layers in steel by diffusion at temperatures above 800° C.

Exemplary processes of the invention use (further comprise) nitriding, which can be conducted below the austenite formation temperature. The component is therefore heat treated before nitriding. The surface processed by nitriding has an surface nitride. Because nitrogen diffuses into the steel beneath the growing nitride outer layer, graded layers can thus also be formed by nitriding.

Exemplary processes of the invention use (further comprise) ion implantation, which also can be used to introduce nitrogen into steel. Ions of high energy (a few to a few hundred keV) are driven into a substrate material under high vacuum. Ion implantation is a widely used process in the electronics industry, and can be used for surface enrichment of narrow layers ('~100 nm wide) in a very broad spectrum of materials combinations. The concentration gradients initially produced by the implantation process have a concentration distribution of near Gaussian form. Because the substrate need not be heated, the final concentration profile deviation is minimal. An alternate technique is ion beam mixing, whereby a thin coating is bombarded with high-energy ions.

Exemplary processes of the invention use (further comprise) interdiffusion, which can also be used to create graded composition transitions at the junction between two phases having the appropriate range of intermediate solubilities or phases. This process has been used in steel. Interdiffusion can be used create FGM transitions between different superalloy components used in rotating jet engine components and bonded by solid state diffusion bonding. Diffusion also can be used in the fabrication of a functionally graded piezoelectric actuator, whereby interdiffusion of species during sintering caused by gradual titanium and nickel concentration changes across the middle third of an 800 μm thick actuator. A cylindrical diffusion-generated graded transition between pure nickel and Ni-20 at.-% Al can be created in a different study by hot isostatic pressing followed by a diffusion treatment. In using bonding via a combustion synthesis, graded transition layers can also be formed by interdiffusion, driven by the elevated temperatures generated in the process. This can be used to produce graded coatings and weldments using combustion synthesis.

Thermal Processes

Exemplary processes of the invention use (further comprise) thermal processes, which can be used to process steels in order to enhance surface hardness. Variations in thermal treatment cause variations in microstructure and local properties. One example is the heat treatment of steel. When it is quenched from a uniform elevated temperature in the austenite range under non-Newtonian conditions (of corresponding Riot number ~0.2), it contains a graded transition from a hard outer layer to a softer core. The location of the transition from hard to softer regions can be calculated to a fair degree of precision for many steels using the Grossman method of hardenability prediction. By insulating surface layers to restrict heat flow along some surfaces, the gradients can also be created.

Exemplary processes of the invention use (further comprise) surface hardening by localized heating and quenching, as is commercially practiced in steel. These methods include flame hardening, induction hardening, and laser hardening. Exemplary processes of the invention use (further comprise) induction heating, where heating is generated by currents circulating in the component within a skin layer of finite width, this width varying as the inverse square root of magnetic field frequency. Exemplary processes of the invention use (further comprise) laser heating, where the temperature gradients are steeper and heated zones are thinner. The heat conduction rate is extremely high, resulting self-quenching in the surface layer.

Exemplary processes of the invention use (further comprise) a heat transport controlled FGM processing comprising tempering of ductile cast irons using salt baths specially designed to create a temperature gradient across a part quenched from the austenitic temperature range. The resulting 100 K temperature difference existing across the part at the time of the phase transformation causes the formation of a gradient of structures and corresponding (but relatively shallow) hardness gradients in the component across its width.

Setting and Centrifugal Separation

Exemplary processes of the invention use (further comprise) setting and centrifugal separation processes, including a class of FGM processes that comprise the production of a suspension of particles of one phase in a liquid matrix of the other, followed by separation of solid and liquid, by holding the slurry in gravity, or using applied centrifugal force. A developed processing route is metal matrix composite slurries produced by stir casting techniques, typically of SiC particles in molten aluminum.

The migration of the particles in the melt before solidification is the first crucial step of producing FGM. This process can be modeled for centrifugal casting; the trajectory of a solid particle in the liquid over the duration of the process must be considered from the moment it enters the segregative force field to the moment it is trapped in place by the moving solidification front. Modeling of the process thus combines the modeling of solidification in the casting, and a calculation of the time dependent particle distribution by the integration of the trajectories of all particles present. The passage of the solidification front 'freezes' the particles in place during the migration process, and it is this interruption of migration which is used to create gradients in particle concentration. Another exemplary approach of the control of the particle distribution is the sequential pouring of slurries of variable particle concentrations.

Cooling conditions influence the solidification and, hence, the particle trapping rate in centrifugal casting. Study of gravity settling coupled with the consideration of particle pushing by an advancing solidification front of pure metal has concluded that the solidification front could conceivably push particles against the settling direction. Alloyed matrixes generally solidify dendritically and trap the particles between growing dendrite arms; particle pushing is therefore not expected to be a major mechanism for the engineered segregation of particles in castings. Some other studies have considered the case where particles are lighter than the liquid, and therefore settle in the direction opposite to the gravity or centrifugal acceleration.

Sintering of FGMs

Exemplary processes of the invention use (further comprise) FGM sintering. Prediction of the densification rate of an FOM structure is a critical issue in the fabrication of FGM by sintering. It requires the understanding of the densification rate of all the composites over the range of ceramic volume fractions present in the structure. Different theories have been proposed to address this question; their suitability varies with the volume and size ratios of the two present phases. In particular, this requires uniform initial powder density distributions within a green body. Otherwise, a subsequent densification will cause uneven shrinkage, resulting in warping of FGM.

At low volume fractions of one phase in the other, the densification rate of the composite is primarily controlled by the single percolating (matrix) phase; this is generally the metal phase in the meal-ceramic FGM. In this situation, matrix can density at a temperature, which is lower than the sintering temperature of the inclusion phase. Therefore, the inclusion phase still influences the local densification rate.

Exemplary processes of the invention comprise making a metal-ceramic FGM, a single-phase densification usually occurs. Densification rate of a powder matrix can be reduced; by taking into account the fact that the inclusions alter both the initial packing density and the evolution of inter-particle neck geometries, this can be modeled using the ratio of the matrix particle/inclusion particle radii $R(r_{matrix}/r_{inclusion})$ of the order of 1. Therefore, greater deformation of the matrix particles is required to reach a given compact density.

Exemplary processes of the invention further comprise use of equiaxed powder blends, adjoining inclusions begin resisting global powder compact densification when the inclusions make contact with an average of three neighboring inclusions. Therefore, there is an upper limit to the refractory phase volume fraction that can be incorporated if there is no sintering of this phase. Thus, in some studies, non-densifying ceramic particle volume fractions were found to be restricted to values <=30-40% of ceramic volume fractions; above these values, pores were observed. The matrix can be coated uniformly on the refractory particles, thus preventing to the greatest extent possible the formation of contacts between refractory powder particles. This regime has been used to speed the densification of ceramic composites, and was used successfully to produce a functionally graded transition from 0 to 80% TiN in nickel.

Exemplary processes of the invention use (further comprise) two-phase sintering of FGMs, where two phases must have the same or similar densification rate. Even slight difference in local sintering rates on sample morphology is clearly shown by studies. Achieving the same densification rate in a wide span of volume fractions of the two phases is not easy in practice, since sintering rates vary significantly with the nature and properties of each phase; in particular, ceramics generally densify much slower than metals. Some nonoxides are not suitable for this purpose, such as SiC, because their sintering temperatures are too high.

To match the sintering rate of two phases under same pressure and temperature conditions, particle size is one of the parameters, which can be controlled. Particle size control in 304 stainless steel and partially stabilized zirconia (PSZ) powders can be used to control the sintering rate; or alternatively, another strategy is to adjust the sintering rate is to densify the FGM in a temperature gradient. This can be realized by means of laser beam surface heating, microwave sintering, and using the electric discharge heating through a stepped or tapered die.

The mismatch between two-phase sintering rates can be reduced by sinter-forging in a rigid die when the sample is in simple configuration and geometry. Deformation and failure can be resisted by the die material, while the applied pressure can drive macroscopic flow to compensate the shrinkage discrepancy. This technique can be used to fabricate one-dimensional FGM disks. For complex geometries, such as metal core with a ceramic shell, this technique is not much better than hot isostatic pressing.

Exemplary Electrophoretic Deposition (EPD) Processes

Exemplary processes of the invention use (further comprise) any EPD process; which is a convenient method to fabricate both graded coatings and 3-D parts. By in-process changing the concentration of constituents in the deposition suspension, smooth (step-less) FGM can be conveniently obtained by EPD. The thickness of an EPD deposit can be easily controlled. Electrophoretic deposition can comprise three steps: particle surface charging in solvent, particle migration under external electric filed, and particle coagulation at an electrode.

Solvents

Processes of the invention can incorporate the use of any solvent; including both water and organic solvents. However, use of water can lead to several problems, such as the faster kinetics, that makes the control of the deposit thickness difficult, and the hydrolysis of water at low voltage (~5V), which promotes bubbling and pin holes. Current density is higher in aqueous systems so that Joule heating can lead to the instability of suspensions. Therefore, in most embodiments, an organic solvent is preferred. However, the most important advantage of aqueous suspensions is their environment benefits. Also there are a lot of industrial manufacturers of binders, dispersants and stabilizers which target aqueous slip casting. These additives can be transferred without difficulties to aqueous EPD. Another advantage of aqueous EPD is the avoidance of inflammable, often hazardous organic solvents. Adding binders can increase the deposition rate and thickness, but cracks are formed during drying process. Thus, in most embodiments, for coating purposes, it is preferred to use organic solvents instead of water.

Exemplary processes of the invention can incorporate methods to prevent the bubble formation for aqueous EPD. Exemplary processes of the invention can incorporate methods the shaping of complex silica glass and zirconia components, like tubes or structured parts by means of a membrane method. In this method, a dialysis membrane separates the cathode and anode. The hydrogen ions were reduced on the electrode forming bubbles, while the particles coagulate onto the membrane without bubbles. Porous polymer moulds were used as an ion-permeable deposition surface in order to fabricate 3-D objects. Another exemplary processes of the invention uses a palladium substrate, which can adsorb hydrogen.

An important parameter to evaluate the charging ability of a suspension media is the donor power. To measure the donor power of a solvent, the enthalpy of the coordination of the donor solvent toward a standard reference acceptor ($SbCl_5$) in a reference solvent of low donor power, such as 1,2-dichloroethane, can be determined. Donor numbers (DN) of some organic solvents that are used to practice this invention are:

| Solvent | DN |
|---|---|
| 1,2-Dichloroethane | — |
| Nitromethane | 2.7 |
| Nitrobenzene | 4.4 |
| Acetic anhydride | 10.5 |
| Benzonitrile | 11.9 |
| Propylene carbonate | 15.1 |
| Acetone | 17.0 |
| Water | 18.0 |
| Tributylphosphate | 23.7 |
| Hexamethylphosphoramide | 38.8 |

In aqueous solvents, the charging mechanism is due to the donation of protons or OH— depending on the pH value. Metal oxides have a surface layer of the metal hydroxide, which is amphoteric. The charging can become either positive or negative, depending on the pH.

The pH at which zeta potential is zero is called isoelectric point (i.e.p.). Due to the high dielectric constant of water ($\epsilon_r \approx 80$), much higher deposition rate can be achieved in aqueous suspensions. The electro mobility of particles is directly proportional to the dielectric constant. By Coulomb's law, the potential energy of ion pair can be described as:

$$U_{ion\text{-}pr} = -\frac{q_1 q_2}{\varepsilon_r r_{12}}$$

The dielectric constant expresses the dissociating ability of the solvent. Organic liquids generally have a lower dielectric constant, which is a disadvantage because it limits the charging on the particles. Some dielectric constants of solvents that can be used to practice this invention are:

| Solvent | $\epsilon_r$ |
|---|---|
| Acetone | 20.7 |
| Water | 78.4 |
| Ethanol | 24.55 |
| Methanol | 32.7 |
| Acetic | 6.15 |
| Butylamine | 4.88 |

Besides the above-mentioned solvents, other solvent with other properties can be used, which can be very critical for specific applications. For example, the resistivity of solvent and suspension is very important for thick film coating and shaping.

During deposition of thick coatings and 3-D objects, as the deposition proceeds, the thickness of deposition increases. As a result, the potential drop in the suspension is very large. Due to the potential drop, the deposition rate decreases significantly (down to zero in some cases). Consequently, the thickness of the deposition is limited. A good example is the alumina-ethanol system stabilized by hydrochloric acid. The deposit resistivity is extremely high in this case and it is nearly impossible to fabricate millimeters-thick deposits. In the case of alumina ethanol system stabilized by acetatic acid, the resistivity of the deposition is only marginally higher than the suspension and therefore, thick deposits can be formed without any problem.

Surfactants

Processes of the invention can incorporate the use of any surfactant, including chemical components such as dispersants, electrosteric stabilizers, electrostatic dispersants and/or binders. In order to perform EPD, particles should be charged sufficiently. Some additives are found successful in helping charging particles. Phosphate ester (PE) can be used to deposit a variety of particles. Other polyelectrolytes can be formulated to enhance particle charging and hence increase colloid stability.

Many manufacturers produce surfactants. These surfactants are focused on slip casting, gel casting, and injection molding, thus they are designed to be employed in aqueous solutions. Generally the selection of a binder and a dispersant depends on the suspension being used. Some of the examples of EPD surfactant and deposited materials used to practice this invention are:

| Additives | Concentration | Material system | Manufacturer |
|---|---|---|---|
| Polydiallyl dimethyl ammonium chloride PDADMAC 20% wt, solution in water | 150 ul/100 ml | $BaTiO_3$/Ethanol + water(30:70% vol) | Aldrich Chemical Company Inc. |
| Polyethylene imine (PEI) | same | same | same |
| Polyethylenimine epychlorohydrin modified (co-polymer), 17% wt solution in water | same | same | same |
| Poly[bis(2-chloroethyl)ether-alt-1, 3-bis[3-(dimethylamino)propyl]urea], quaternized (Polyquaternium-2), 62% wt solution in water | same | same | same |
| Poly acrylic acid, PAA | same | same | same |
| Orotan's | same | same | Rohm and Haas UK limited OROTAN-681 ™ (Na salt of Polyacrylic acid), 850E (NH4 salt) and 731K(K salt) |

| Additives | Concentration | Material system | Manufacturer |
|---|---|---|---|
| Polyethylene glycol-400, PEG-400 | Same(Binder) | same | Aldrich Chemical Company Inc. |
| Aliphatic acid | 0~10% vol | Ethanol + Alumina | |
| HCl, KOH, polyacrylic acid | same | 1% vol Alumina/Y-TZP + water | |

As mentioned above, pH can influence the i.e. p. significantly. In some aspects, it is very important to control the pH in a certain range. This can be realized by adding acid, alkaline, and salt. Polyelectrolytes are preferred since their pH is easier to control than the one of simple inorganic acids or alkaline. For aqueous solution, pH is easily defined as the negative of the logarithm (to the base 10) of the hydrogen ion concentration. For non-aqueous solution, however, it is defined as following:

$$_w\mu_H = _w\mu_H^0 + RT \ln a_H$$

In summary, the surfactants species and concentration have to be selected carefully according to the suspension medium, the particles used, and the pH requirements.

Cracking Phenomenon Associated with Post-EPD Drying Process

Processes of the invention can incorporate (further comprise) drying processes; drying can be one of the most important steps following EPD before sintering. Due to the non-uniformity of green samples, stresses are developed during non-uniform drying. The tensile stresses lead to cracking. Cracks in EPD can include both micro and macro cracks. They are harmful for final properties. The drying process can be quite complex. Some mechanisms are not very clear.

In some embodiments, the surface condition of the electrodes is the first important factor. Due to friction between the electrode and the deposit, when the green deposit is being dried, it tends to shrink. The friction causes tensile stresses and finally leads to cracks. Therefore, to eliminate cracks, some pre-coating is essential. Graphite coating is a choice; it can help both the ejection of green parts from electrode and the reduction of cracks.

In some embodiments, the addition of binders doesn't necessarily increase green strength or reduce cracks. An addition of binders will increase adherence between deposits and a substrate as well. As a result, the deposit can shrink freely whereas the interface between the deposit and the substrate is fixed and constrained by zero displacement boundary conditions. This can lead to the heterogeneous shrinkage, which can cause the formation of cracks. Another special drying technique, such as freeze-drying, may be employed to reduce cracks instead of adding binders.

Processes of the Invention

In alternative embodiments, practicing the processes of this invention can generate and/or create:

(1) 3-D shaping of FGM by EPD;

(2) optimization of the initial shape of green parts followed by EPD shaping;

(3) In fabrication of 2-D FGMs (i.e. thin films), low temperature processing, (high temperature processing is not desirable in some cases, such as electronic packaging).

In one aspect, the invention provides a solution of this inverse sintering problem; it was based on a detailed analysis of the evolution of mesoscopically inhomogeneous material structures during sintering. If the kinetics of sintering is known, then the prediction of the initial shape and the structure of a green body can be conducted through an iteration procedure based on the idea of the "backward movie", where the directions of all physical processes during modeling are changed to the opposite ones.

For heterogeneous materials, the solution of the inverse sintering problem can allow generation of a complex shape functionally structured (in particular, graded) initial green specimen. In one aspect, the invention provides use of a green pre-sintering specimen's assembly approach: an electrophoretic deposition (EPD) by assembling powder particles from suspensions under the influence of an electric field. As a result of this assembly of the invention, 3-D net-shaped components with pre-supposed internal structures can be fabricated, in addition to use of EPD for the formation of coatings. Thus, in one aspect, the invention provides for the shaping of 3-D freestanding objects.

In alternative embodiments, the assembly processes are controlled through the manipulation of an electric field and the composition of a suspension. The invention provides for control of these processes by adjustment of the material structure of an assembled component in accordance with its desired applications.

In alternative embodiments, the processes of this invention comprise: (1) Net-shape manufacturing by sintering→inverse sintering: green specimen with special shape and with special (composite) structure; (2) Fabrication of a special shape functionally structured (graded) green specimen→EPD; (3) An ambient temperature technological sequence for FGM fabrication, including EPD and electroplating (EP). The EPD-EP approach can be useful for the production of FGM for the usage in thermal sinks in electronic circuitry; in some aspects, high temperature (sintering) stages of FGM fabrication can be avoided.

In alternative embodiments, both EPD and sintering-related "backward predictions" are needed for the practical implementation of a net-shape assembly. For these processing approaches, a modeling is a desirable appendix aimed at the clarification of physical processes behind the technology. In both the electrophoretic assembly of 3-D bodies and coatings and in net-shape sintering processes of this invention, modeling can be essential part of the fabrication approach.

In one embodiment, the processes of the invention comprise a 2-D FGM (e.g., thin films), and can provide applications in electronic packaging materials, for example, in the Thermal Interface Materials (TIM). Theoretical modeling, which optimizes the initial pre-sintering after-EPD shape can be incorporated. The shape determined by the inverse sintering modeling as the EPD processing target can also be used. In one aspect, the combination of EPD with electroplating is used to produce thermal interface materials for electronic packaging. In one embodiment, the processes of the invention comprise fabrication of zeolite FGM.

In alternative embodiments, the processes of the invention comprise: (1) Shaping of $Al_2O_3/ZrO_2$ FGM by EPD; this exemplary EPD shaping is based on the inverse sintering geometry determined by the continuum modeling; (2) production of 3-D objects by EPD, including the mixing sequence, optimal concentration of additives and the deposition kinetics; (3) a process combining EPD and electroplating to produce composite films; $Al_2O_3/Cu$ composite films have been successfully fabricated by this technique; (4) FORTRAN™ code can be linked to a commercial FEM package ABAQUS™; (5) The inverse sintering modeling methodology can be used to optimize the initial shape of FGM components; the determined initial shape can be used for shaping by EPD, for which it is obtained as the final shape; (6) the ceramic preforms with aligned porosity can be fabricated using unidirectional freezing and freeze-drying; in one aspect, the consecutive infiltration of brushing gold and annealing in air generated gold wires in the preform; in one aspect, the diameters of the gold wires range from several hundreds of nanometers to several microns in one aspect, this approach provides a method to synthesize gold wires; (7) the application of EPD to deposit FGM zeolite; zeolite FGM made from 3A and 5A was deposited using an acetone suspension.

Fabrication of FGM Objects by Electrophoretic Deposition (EPD) and Sintering

In alternative embodiments, the processes of the invention comprise the fabrication of FGM objects by EPD.

Material Systems for EPD $Al_2O_3$ and 3 mol % $Y_2O_3$—$ZrO_2$ powders can be used. The composite of $Al_2O_3$ and $ZrO_2$ has good mechanic properties, which make it suitable for many applications. The traditional alumina ceramics are not suitable for high-temperature structural applications. Therefore, toughened alumina has been developed in the past decades for such applications. One of them is achieved by addition of $ZrO_2$ dispersoids. $ZrO_2$ has 3 allotropes: the cubic form is stable above 2370° C., the tetragonal form is stable between 2370 and 1170° C., and the monoclinic form below 1170° C. The transformation from tetragonal to monoclinic form with decreasing temperature at approximately 1170° C. is quite disruptive. This disruption is caused by a 6.5 percent volume expansion upon transformation from tetragonal to monoclinic form. The addition of certain stabilizing oxides suppresses the disruptive phase transformation of zirconia. TZPs are fine-grained single-phase materials stabilized by $Y_2O_3$ (Y-TZP). The constraint imposed by grains on each other allows the retention of the tetragonal phase. Sintering takes place in the tetragonal field (1300~1500° C.). Y-TZP ceramics are presently the toughest and strongest ceramics and are most likely the toughest and strongest of all polycrystalline ceramics yet developed.

The composition of TZ3YS powders used in the EPD processes of the invention are listed below. The alumina powders used are from Alcoa (A 16-SG, with typical size of 0.5 μm) and Leco (with typical size of 5.0 μm).

| Items | Value |
| --- | --- |
| $ZrO_2$ % | >89 |
| $Y_2O_3$ % | 5.17 |
| $Al_2O_3$ % | Max 0.005 |
| $SiO_2$ % | 0.005 |
| $Fe_2O_3$ % | 0.003 |
| $Na_2O$ % | 0.004 |
| Specific surface area (m²/g) | 6.6 |
| Crystallite size (Å) | 380 |

Suspension Characteristics

In one aspect, preparation of suspension is the first step for an EPD process of this invention. The quality of suspension will influence the subsequent deposition process and the final properties of the deposits.

Stable suspension can be a vital issue for EPD. If the suspension is not stable, particles will fully or partially sediment which disrupts the EPD process. The stability of suspension is a complex problem, which includes many interacting parameters. Generally, particle size, additives, suspension media and fluid conditions will all influence the stability of suspension. For example, the particles should not be too large; otherwise gravity will render rapid sedimentation.

Particle agglomeration can be another major problem. First, agglomeration will cause the instability of the suspension. Secondly, particles' agglomeration could result in undesirable sintered microstructures (especially grain growth). This is especially important for nano particles. Finally, agglomerated particles can also cause sintering anisotropy and lead to defects in the final product. It was found that ultrasonic vibration could effectively break particle agglomeration. An ultrasonicator can be, e.g., an L & R Manufacturing, Q650™. The suspension was mixed by magnetic stirrer and then put into the ultrasonicator for further processing. 15 minutes of vibration was found to be enough to break agglomerates.

Additives can be used in making suspensions to enhance particle charging and to increase the stability of the suspensions. In our studies, acetone was used as suspending media. It donates electrons to particles. N-butylamine was selected as an additive. In order to obtain an optimal concentration of n-butylamine, viscosity measurements were conducted. In some cases, such as when dealing with large particle sizes, chemical additives are not able to suspend particles, thus stirring was usually adopted. However, it was found by the studies that excessive stirring might cause the particle's agglomeration.

For colloidal processing, the viscosity measurements are widely used to characterize the rheological properties of concentrated suspensions utilized in ceramic processing. They can be employed as a method of analysis for determining the optimal concentration of additives required to stabilize a suspension. Viscosity measurements are also used in quality control in order to minimize the batch-to-batch variation of suspensions used in industrial production (e.g., spray drying, slip casting and tape casting).

A Brookfield DV II PRO™ viscometer was used; it has a spin head, which can measure both the shear strain rate and shear stress. Since viscosity is sensitive to temperature, in this study, temperature was maintained at 25° C. To evaluate the optimum concentration of n-butylamine, a series of studies have been conducted. $Al_2O_3$ (0.5 μm, Alcoa A-16 SG™) was dispersed in acetone with concentration of 100 g/liter. By adding different amount of n-butylamine, viscosity was measured. The viscosity achieved minimum at about 8% vol. concentration of n-butylamine. In the following studies, this additive concentration was used.

EPD Kinetics

In practicing the methods of this invention, control of the deposition thickness can be one of the most crucial factors for both thin film and EPD shaping. Although the deposition kinetics can be determined by numerical modeling, it's advantageous to determine the kinetics by pre-testing. This is due to the complexity of colloidal systems: it involves surface chemistry, electrode's surface condition, suspension condition, and stirring condition etc. In this section, three series of studies have been conducted to determine the deposition kinetics: (1) The deposition of $Al_2O_3$ powder with particle size of 0.5 μm, this result was used for the thin film deposition; (2) the deposition of $Al_2O_3$ powder with particle size of 5.0 μm, this result was used for FGM deposition; (3) the deposition of $ZrO_2$ powder with particle size of 0.5 μm, this result was used for FGM deposition.

Under fixed conditions (voltage, stirring rate, particle concentration), EPD was carried out for various time periods. After EPD, the deposits were dried in air for at least 24 hours and then the weight was measured. This way the EPD yield ("yield" to designate the weight of deposit) has been obtained. For the thin film deposition, the thickness of the deposits was analyzed by both white-light profilometry and the cross-section analysis by SEM.

The EPD studies were conducted by a self-made setup: a DC power supply was employed to provide the external electric field. Because of the higher voltage, a high voltage DC power supply was used (Dankar Inc., DK22-4™) to ensure high deposition rate; this is especially useful for thick film deposition. It is capable of providing up to 2000 V DC and the current is able to achieve 500 mA.

EPD Kinetics of $Al_2O_3$ Powder with Particle Size of 0.5 μm

Figure 3:
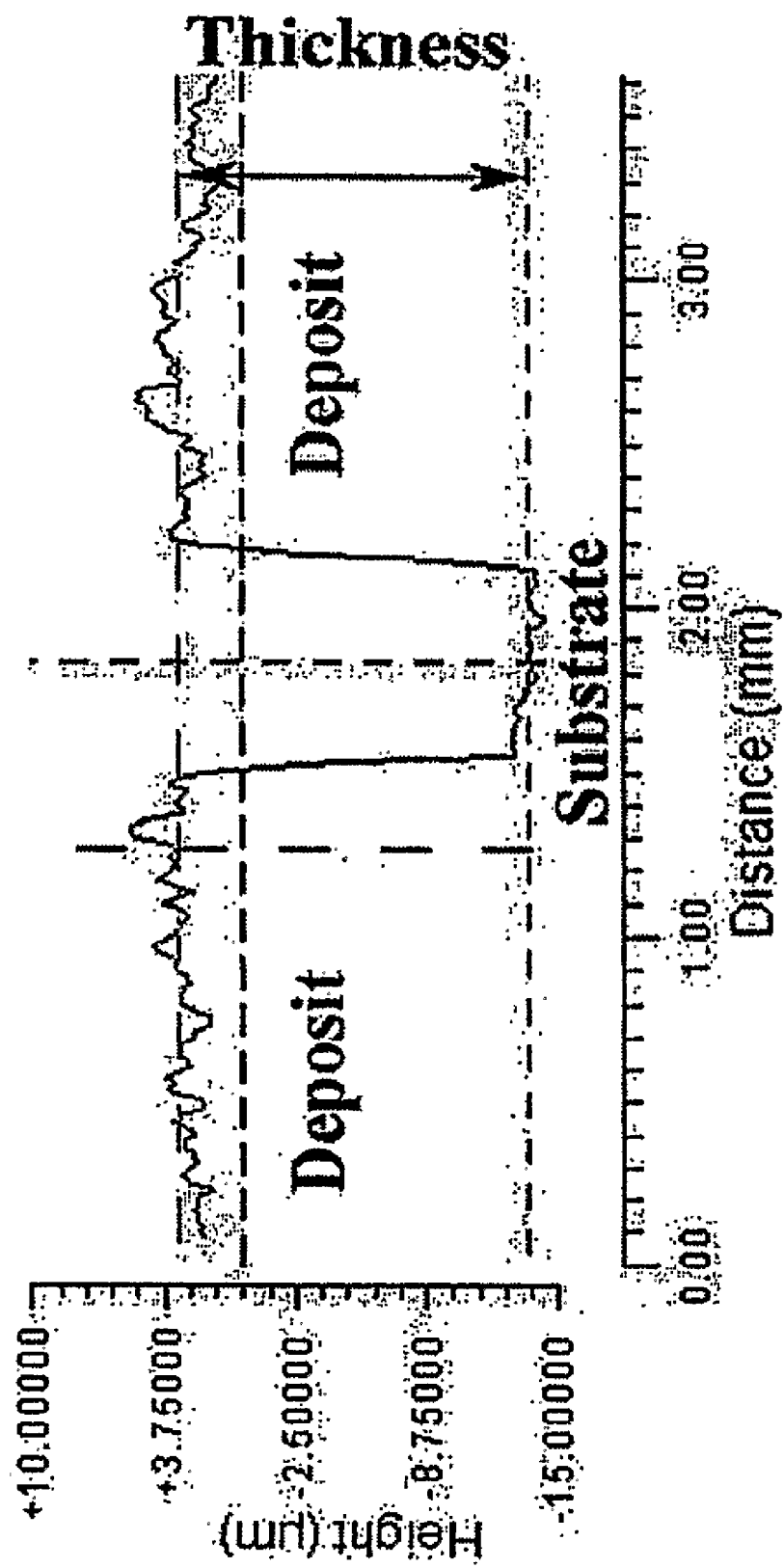
FIG. 3 illustrates thickness of thin film deposition measured by white-light profilometer, as described in detail, below.

To measure the results of the EPD kinetics assessment of thin film deposition, the thickness was measured by white-light profilometer (Zygo Newview 5000™). A scratch was made in the coatings at the half height of the deposit to enable the thickness measurement. The deposit thickness was measured by this method of the sample after 15 seconds of deposition time. The corresponding surface morphology of the deposit was measured. The thickness was also measured from the cross-section SEM micrographs. An SEM micrograph of a deposit cross section located at the distance 30 μm from the substrate after 15 seconds of deposition time; FIG. 3 illustrates thickness of thin film deposition measured by white-light profilometer (the corresponding electrophoretic deposition is 15 s). Studyal parameters to determine $Al_2O_3$ and $ZrO_2$ EPD kinetics were:

| Voltage (V) | Distance between electrodes (mm) | Electrode material | Particle loading (g/l) | Stirring method | Suspension composition |
|---|---|---|---|---|---|
| 200 | 30 | Stainless Steel | 200 | Magnetic | 125 ml acetone + 24 g particle + 10.5 ml n-butylamine |

Kinetics study results of $Al_2O_3$ with particle size of 5.0 μm

| Time (s) | Yield (g) | Current (mA) |
|---|---|---|
| 60 | 1.825 | 1 |
| 120 | 2.930 | 5 |
| 180 | 2.283 | 5 |
| 240 | 2.869 | 6 |
| 300 | 1.523 | 8 |

Kinetics study results of $ZrO_2$ with particle size of 0.5 μm

| Time (s) | Yield (g) | Current (mA) |
|---|---|---|
| 60 | 1.233 | 10 |
| 120 | 2.020 | 18 |
| 180 | 2.626 | 20 |
| 240 | 2.674 | 19 |
| 300 | 2.519 | 20 |

Figure 4:
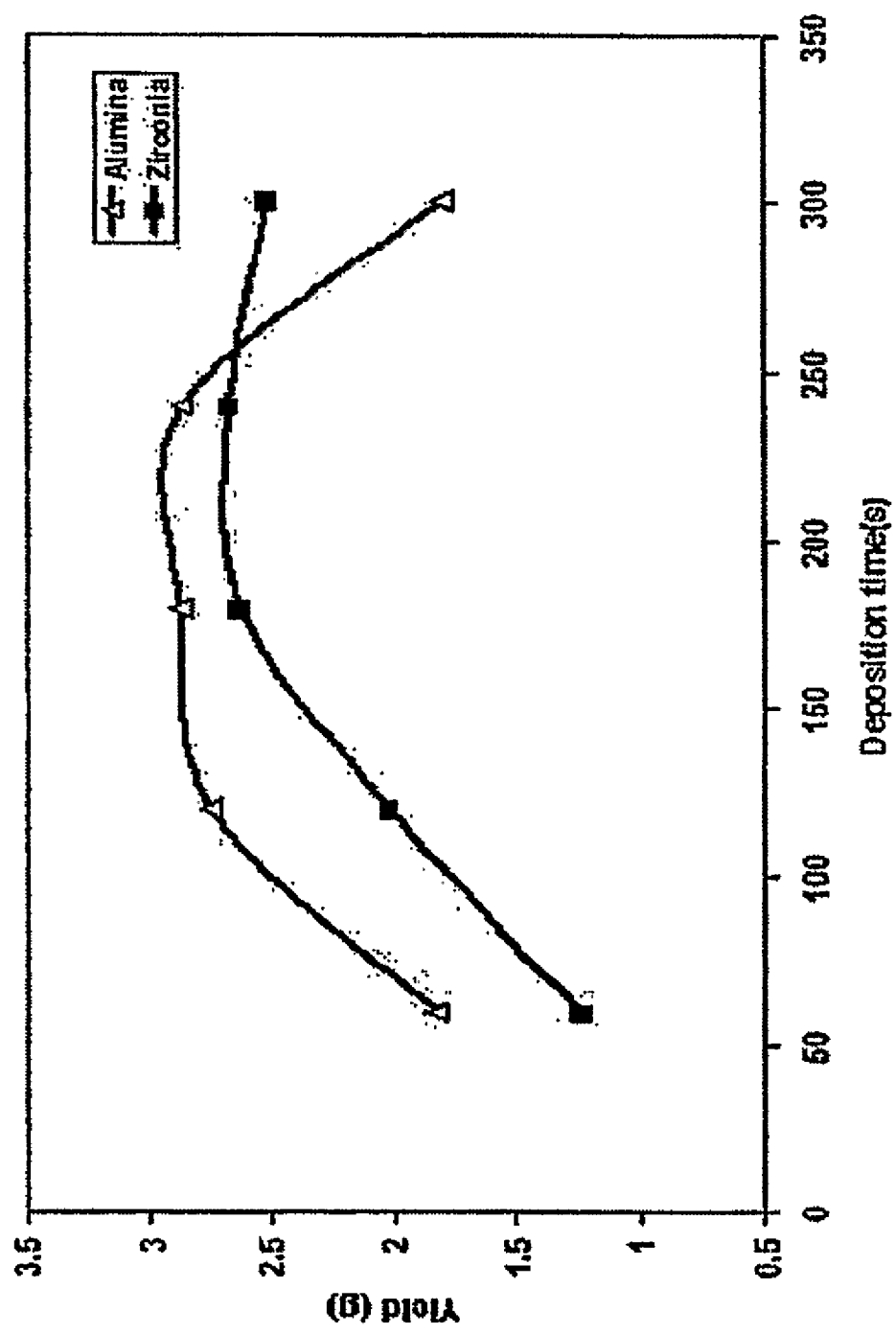
FIG. 4 illustrates the deposition yield vs. time of $Al_2O_3$ and $ZrO_2$, as described in detail, below.

FIG. 4 illustrates the deposition yield vs. time of $Al_2O_3$ and $ZrO_2$.

Alumina Coating on Stainless Steel Cylinder

The geometry of the deposit obtained by EPD depends on the shape of the deposition electrode. For example, if the electrode is a cylinder, the deposit assumes the cylindrical shape as well. As an example, a cylindrical steel part, has been coated with alumina by EPD; in this coating deposition, the to-be-coated stainless steel cylinder served as the deposition electrode, while a copper ring serves as the counter-electrode. The suspension had a particle loading of 100 g/l $Al_2O_3$ was used in EPD coating. The voltage was 80 V, and the deposition time was 3 min. The deposited coating was uniform and no cracks have been observed after drying in air. This also confirms that thin film deposition is less likely to have cracks because the thinner the layer, the more uniform the drying is.

Peristaltic pump used to circulate suspension to produce FGM: Alumina powder with particle size of 5.0 μm and $ZrO_2$ powder with particle size of 0.5 μm were selected as materials used in this study. This material system has been widely studied by researchers so that comparisons can be made. The deposition procedures can be extended to other materials without too much difficulty.

The first study was on the fabrication of a cylindrical 3-D FGM. The composition profile was designed to vary along the radial direction. In order to obtain the FGM, two suspensions were prepared. The suspension compositions for this deposition of cylindrical FGMs are:

| Suspension number | Particle and size(μm) | Particle loading (g/l) | Solvent | Additives |
|---|---|---|---|---|
| #x2 | $ZrO_2$ (Tosoh) | 100 | Acetone | n-butylamine |
| #x4 | $Al_2O_3$ (Leco), 5.0 μm | 100 | Acetone | n-butylamine |

Figure 5:
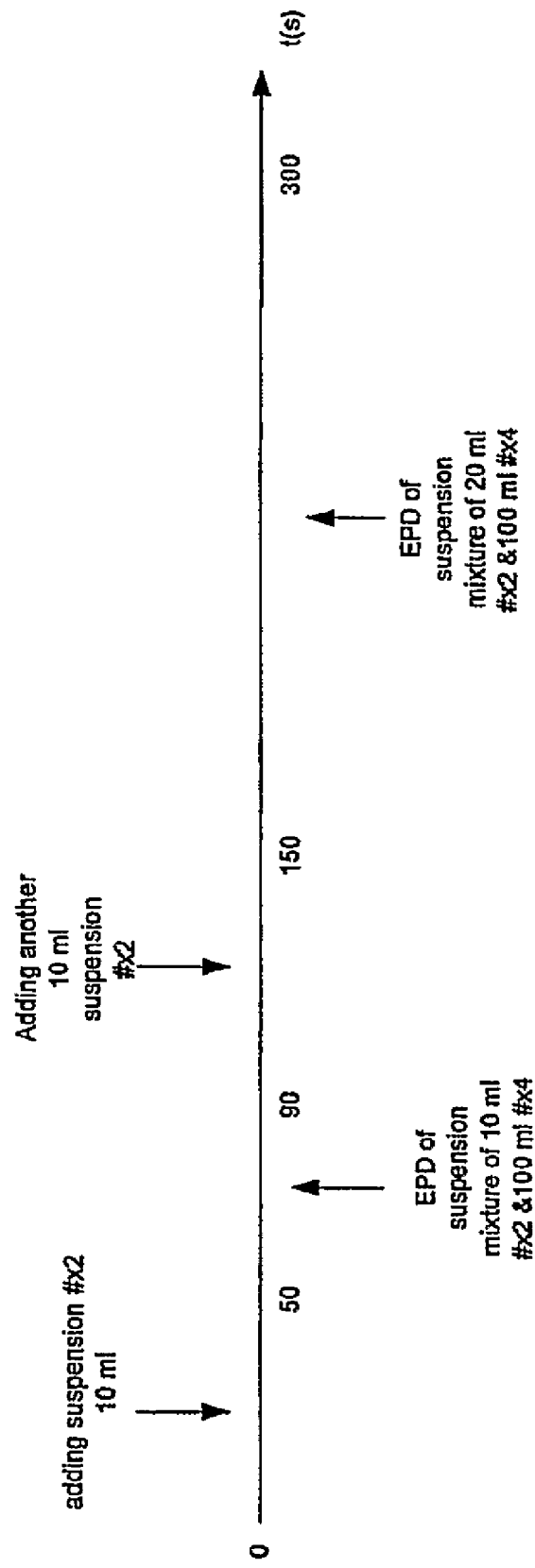
FIG. 5 illustrates an exemplary powder deposition regime of a process of the invention, as described in detail, below.
Figure 6:
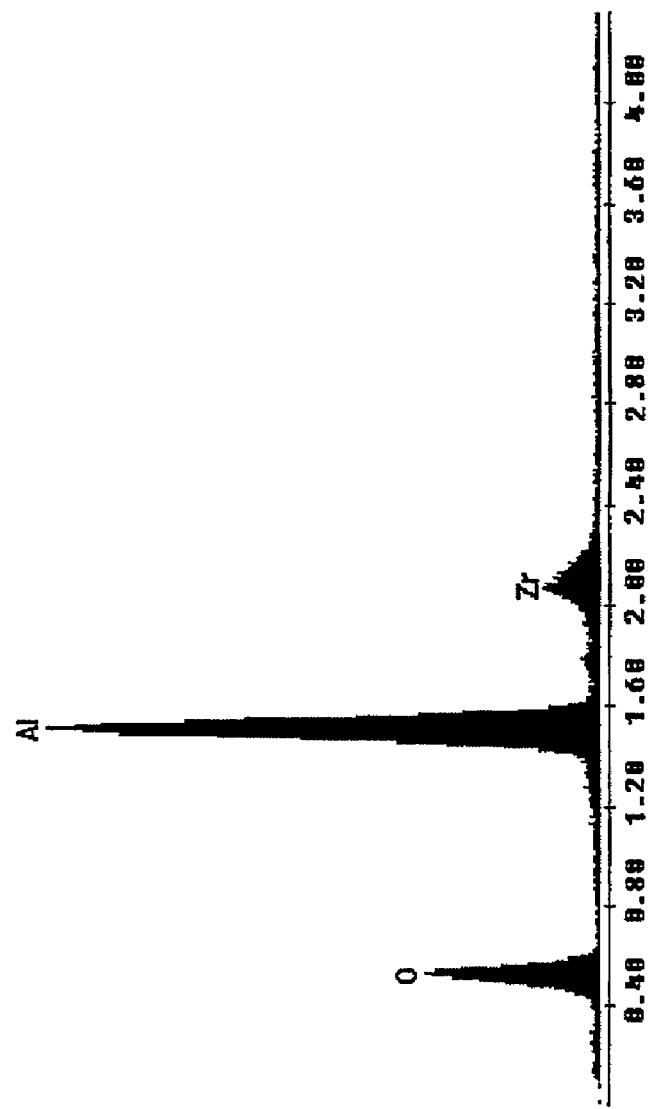
FIG. 6 illustrates the EDAX-SEM micrograph results of an exemplary process of the invention, as described in detail, below.

The study was performed in a glass beaker. A copper ring with diameter of 45 mm was used as counter electrode. A graphite wire with diameter of 0.5 mm was used as anode. Since graphite was burned out during sequential sintering process, the removal of the deposit from the electrode was avoided. The deposition regime is illustrated in FIG. 5.

After EPD, the green part was dried in air and then sintered in a Theta tube furnace. Sintering was performed in air. The heating rate was 5° C./min and the sintering temperature was 1500° C. The specimen was sintered for 2 hours. Pictures before and after sintering were taken respectively in order to compare the shape change and distortion during sintering.

Comparison of specimen before and after sintering: gray contour is specimen before sintering, white contour is specimen after sintering: after sintering, the specimen was cross-sectioned, mounted and mechanically polished. The microstructure was analyzed by SEM (EDAX Inc.). An SEM micrograph of the sintered FGM was taken at different positions along the radial direction of the specimen; from the micrograph, one can see that the sintered specimen has graded structure as designed. The concentration of zirconia increases from inner core to outer surface. From the EDAX-SEM micrograph results of the specimen is illustrated in FIG.

6, the peak of zirconia, alumina has been clearly identified; the necking between two alumina particles, and the necking between alumina and zirconia particles, was identified. It was seen clearly that the bonding is good between particles.

Contact between $Al_2O_3$ and $ZrO_2$ particles: An interesting phenomenon observed in the sintered part is cracks. The cracks have two orientations: one is parallel to the centerline of the cylinder; the other is perpendicular to the centerline. The first category of cracks could be formed during the sintering process, in which thermal mismatch between different materials (here is alumina and zirconia, respectively) caused thermal stresses. The cracks, which are perpendicular to the centerline of the cylinder, were formed to release strain energy.

Figure 7:
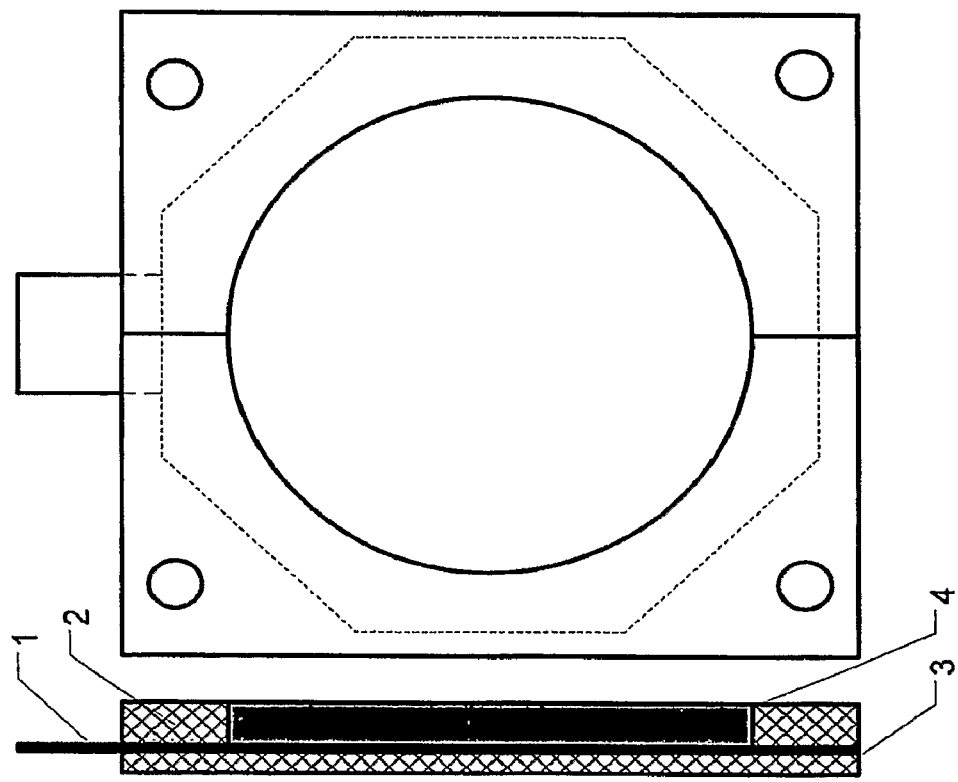
FIG. 7 illustrates an exemplary Teflon fixture to aid in specimen removal after drying when practicing an exemplary process of the invention, as described in detail, below.

Cracks in the sintered FGM cylindrical specimen: The second example was an FGM disk, in which the composition varied along the thickness direction. The EPD was carried out in a glass beaker with magnetic stirrer to avoid settlement of heavier zirconia particles. To help the specimen removal after drying, a Teflon fixture has been designed. It was made of two parts, which can be separated easily so that specimen can be taken out. A graphite coating was applied on the surface of the stainless steel electrode to decrease the friction of specimen with the substrate. The schematic illustration of the fixture is shown in FIG. 7; the diameter of the fixture is 35 mm and the thickness is 5 mm.

Assembly of deposition electrode: the EPD was carried out at constant voltage of 175 V, the distance between the two electrodes was 1.5 cm, and the current was 2 mA. A magnetic stirrer was used to enhance the particle floating. It was observed in the study that magnetic stirring enabled smooth surface of the deposit. The reason is probably that near the electrode, particle coagulation occurs, which leads to large agglomeration and rough surface. Magnetic stirring can break agglomeration. EPD has been conducted for 30 minutes to accumulate 5 mm thickness.

FGM disk produced by EPD: A microwave-sintering furnace (Autowave Microwave System™, CPI Inc., MA) was used to sinter the deposited FGM disks. The microwave furnace consists of a stainless steel chamber, a magnetron as a microwave generator, a chiller to cool the system, and a computer controller to control the power and temperature. In order to monitor the temperature, a two-color pyrometer with measuring range from 750° C. to 2000° C. has been mounted outside the microwave furnace. The power is 3.0 kW and can be controlled by computer. The microwave sintering is a new approach investigated by many researchers. The advantages of microwave sintering include grain growth control, high efficiency, low energy consumption, etc. It is interesting that the microwave furnace can also be used to sinter metallic powders. Cu, Ni and W have all been successfully sintered using this furnace. In this study, the Cu specimen was only sintered 20 minutes at 1.2 kW power.

Micrograph of microwave sintered Cu: in the microwave furnace chamber, there is a highly porous insulation box made of alumina (Zircar Inc, USA). This insulator can provide protection for the stainless steel chamber. At low temperature, the ability of alumina to absorb microwave is low, thus susceptors were employed. During low temperature, the susceptors absorb microwave and then irradiate heat to heat up the specimen. In this study, porous SiC pieces (Ceralink Inc., USA) were used as susceptors. Two pieces were located around the sample. When the sample reaches high temperature, its ability to absorb microwave increases. In order to measure the temperature and in the future, to control it, a two-color infrared pyrometer was used.

Figure 8:
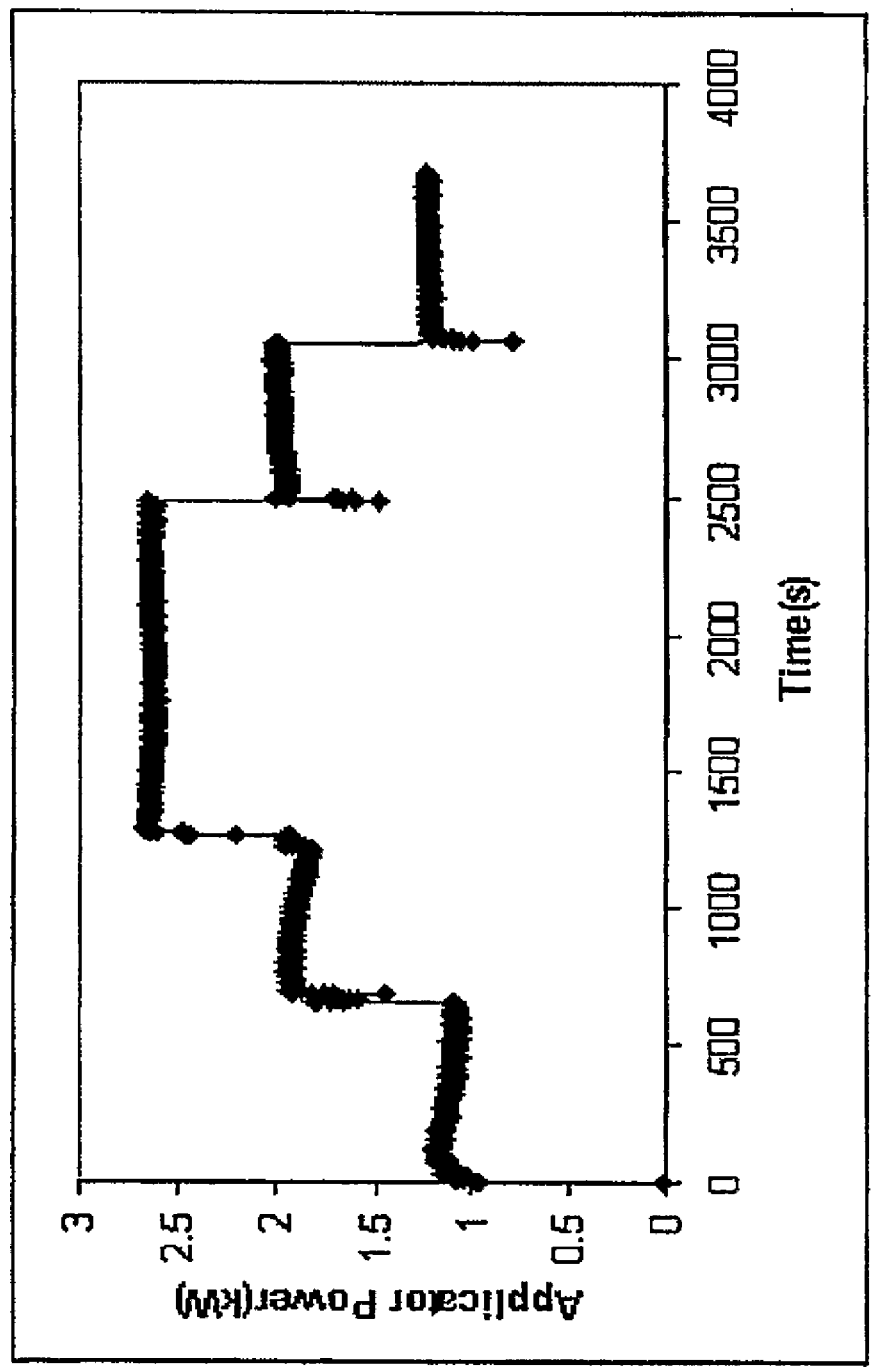
FIG. 8 illustrates an exemplary applicator power chart employed when sintering of FGM parts in practicing an exemplary process of the invention, as described in detail, below.

Configuration of SiC susceptors and sample in the alumina insulator box: to avoid rapid heating and cooling, stepwise power strategy was employed. The scheme is shown in the table below ("Power control regime to sinter $Al_2O_3/ZrO_2$ FGM"). A water chiller was used to cool down the microwave furnace. It should be noted that not all the power generated by the microwave generator was applied to the specimen; some of the "reverse power" was reflected by the specimen. Accordingly, the energy absorbed by the specimen is called the "applicator power". The reverse power should be adjusted to minimum by adjusting the position of the microwave generator. In the sintering of FGM parts, the applicator power chart employed is shown in FIG. 8. Power control regime to sinter $Al_2O_3/ZrO_2$ FGM:

| Power Percentage | Sintering Time (min) | Applicator Power (kW) | Reverse Power (kW) | Cooling Water Temperature (° C.) |
|---|---|---|---|---|
| 40% | 10 | 1.25 | 0.10 | 20 |
| 60% | 10 | 2.00 | 0.10 | 22 |
| 80% | 20 | 2.75 | 0.10 | 30 |
| 60% | 10 | 2.00 | 0.05 | 29 |
| 40% | 10 | 1.25 | 0.05 | 28 |

Three FGM disks with different composition profiles were deposited using EPD. The study's conditions are summarized in the table, below ("Parameters for fabrication of FGM disks through EPD"). After sintering, the specimens were cut, mounted and characterized by SEM. Parameters for fabrication of FGM disks through EPD are:

| Number | Starting suspension | Adding suspension | Time (S) | Voltage (V) |
|---|---|---|---|---|
| FGM01 | 120 ml solution + 24 g $Al_2O_3$ | 30 ml solution + 12 g $ZrO_2$ | 180 | 200 |
| FGM02 | Residual suspension from FGM 01 | 20 ml solution + 10 g $ZrO_2$ | 180 | 200 |
| FGM03 | Residual suspension from FGM02 | 20 ml solution + 10 g $ZrO_2$ | 180 | 200 |

Figure 9:
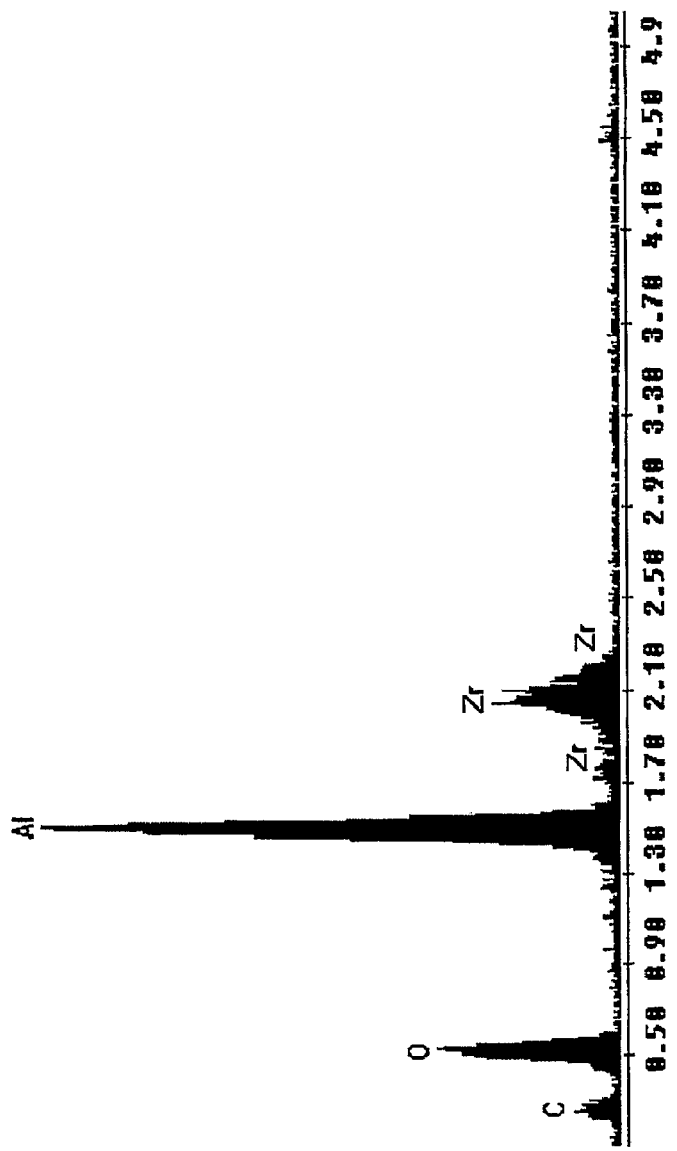
FIG. 9 illustrates EDX (energy dispersive X-ray) results for specimens of FGM disks having different composition profiles as deposited using an exemplary EPD of the invention, as described in detail, below.

The sintered FGM disks have graded structures. The EDX results for the specimen are shown in FIG. 9. The peaks of both alumina and zirconia were identified.

EPD of Zeolite 3A/5A FGM

Zeolites have good gas adsorption capability. Zeolites have been well recognized for their unique ability to adsorb and separate gases, catalyze chemical reactions and selectively exchange cations in solutions. These properties not only result from their uniform, well-defined pore structure but also from the chemical interactions that occur at discrete sites within their lattice. Because these chemical interactions (in adsorptive or catalytic processes) either generate or require heat, the application of zeolites for exo- or endothermic processes is often limited by heat transfer into or from these insulator-like aluminosilicates.

FGM composites provide a new and unique approach in managing heat transfer and maintaining temperature uniformity in either adsorptive or catalytic applications of these molecular sieves. In addition, the layering of different zeolites' types may provide unique opportunities to perform selective separation and catalysis in the same reaction. Layering of other adsorbents/catalysts such as alumina or silicas may also be possible using EPD technology, although this work is beyond the scope of this initial investigation.

EPD of zeolite thin films has been investigated by several researchers. Water and organic solvents, such as isopropyl alcohol (IPA), acetylacetone (Acac), have been investigated. Due to the hydrolysis of water, gas bubbles were formed in the deposit if water is used as the suspension media. Therefore, organic solvent was preferred. In contrast with previous studies, in this study, acetone and n-butylamine were used as solvent to deposit zeolite particles. Moreover, it has been demonstrated that it is possible to fabricate zeolite FGM by EPD, which is the first attempt of this kind.

Molecular sieves Type 3A (0.6 $K_2O$: 0.40 $Na_2O$: 1 $Al_2O_3$: 2.0±0.1 $SiO_2$: $xH_2O$) and 5A (0.80 CaO: 0.20 $Na_2O$: 1 $Al_2O_3$: 2.0±0.1 $SiO_2$:$xH_2O$) (both from Sigma-Aldrich, USA) were used to deposit FGM by EPD. The powder was first baked for 24 hours in a vacuum-baking furnace (Precision Inc.), and then heated to 100° C. to remove the adsorbed water. It has been found by other researchers that even <1% of water in zeolite could lead poor deposition rate. Our studies also confirmed this. Then the powders were mixed with acetone and 8% vol. concentration n-butylamine in a planetary ball mill for 2 hours to make the suspension homogeneous. After that, the suspension was further dispersed in an ultrasonic cleaner.

Conductivity meter for measuring suspension conductivity: In order to control the deposition of zeolite FGM, the kinetics has to be determined. The voltage was 200 V, and particle loading was 20 g/l for both 3A and 5A kinetics studies. The EPD was first conducted at different time with different deposition parameters, and then the deposits were dried and weighted. At the same time, the conductivity of the suspension also influences the deposition rate significantly since the deposit will increase the resistivity of the entire suspension-electrode circuit. The conductivity was measured by using a conductivity meter (Fisher Scientific Inc.).

Figure 10:
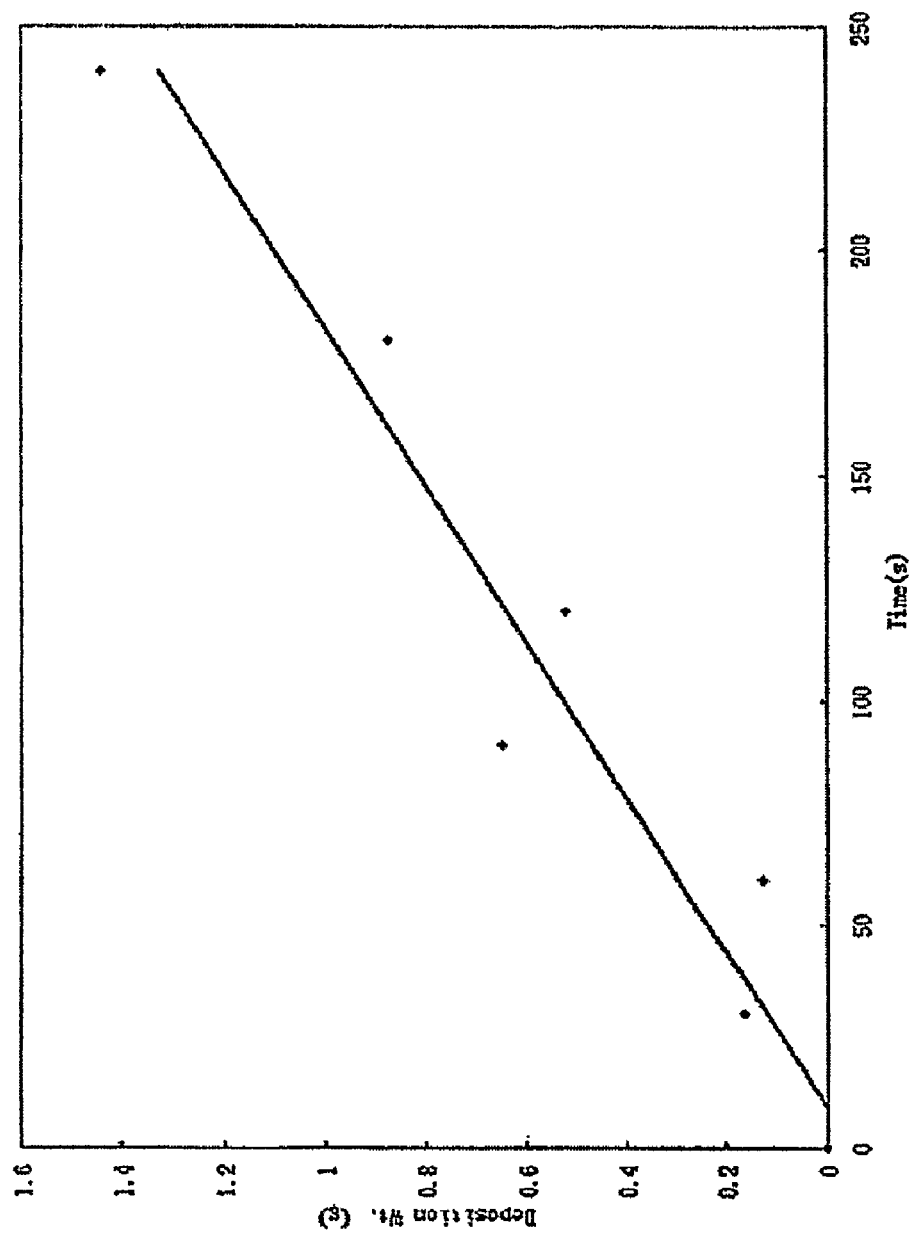
FIG. 10 illustrates EPD kinetics of zeolite 5A using an exemplary process of the invention, as described in detail, below.
Figure 11:
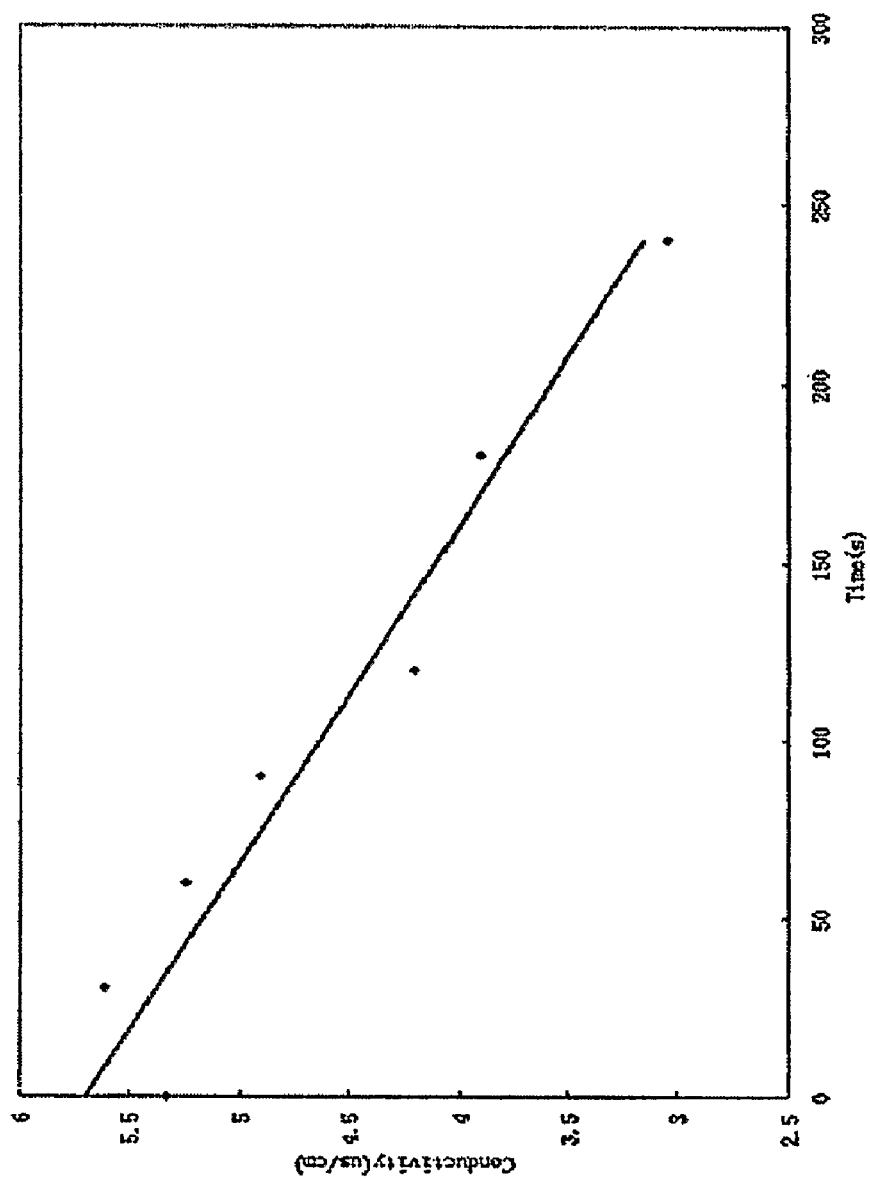
FIG. 11 illustrates the change in the conductivity of the suspension for EPD kinetics of zeolite 5A, as described in detail, below.
Figure 12:
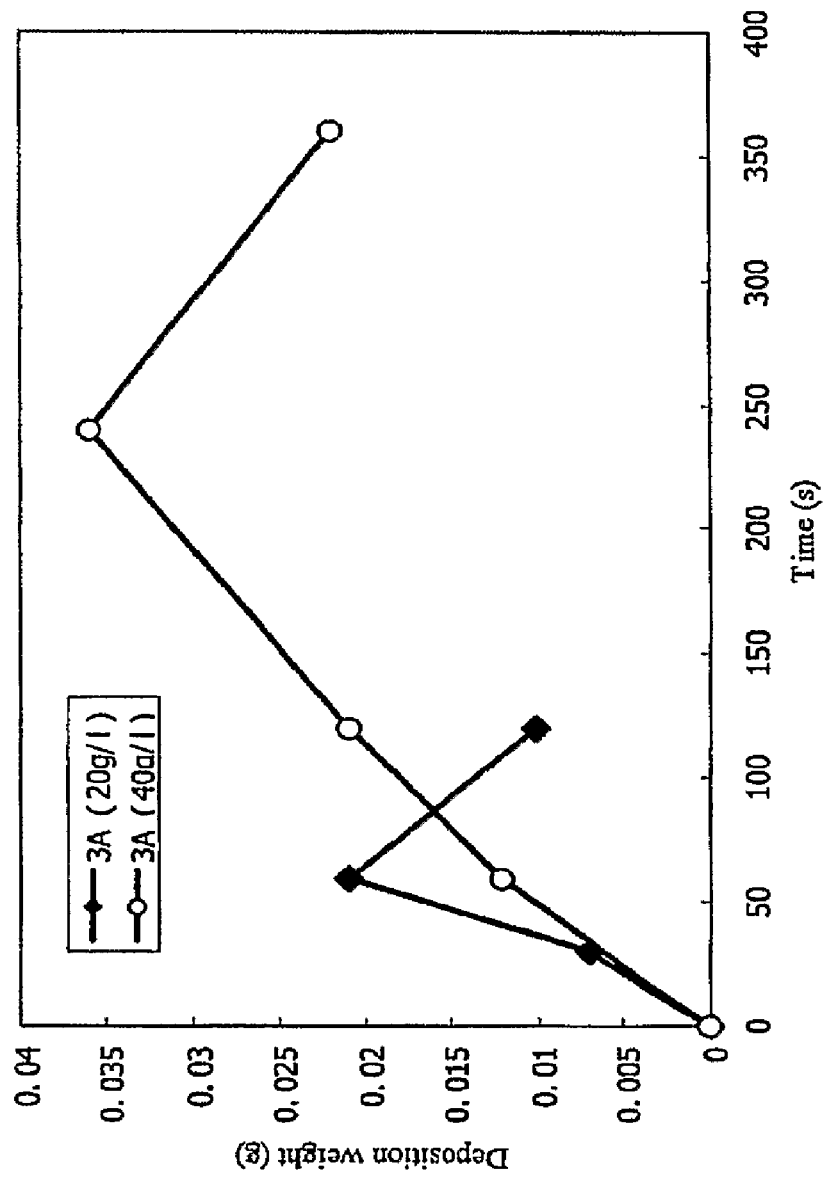
FIG. 12 illustrates the kinetics of zeolite 3A depositing with two particle loadings using an exemplary process of the invention, as described in detail, below.
Figure 13:
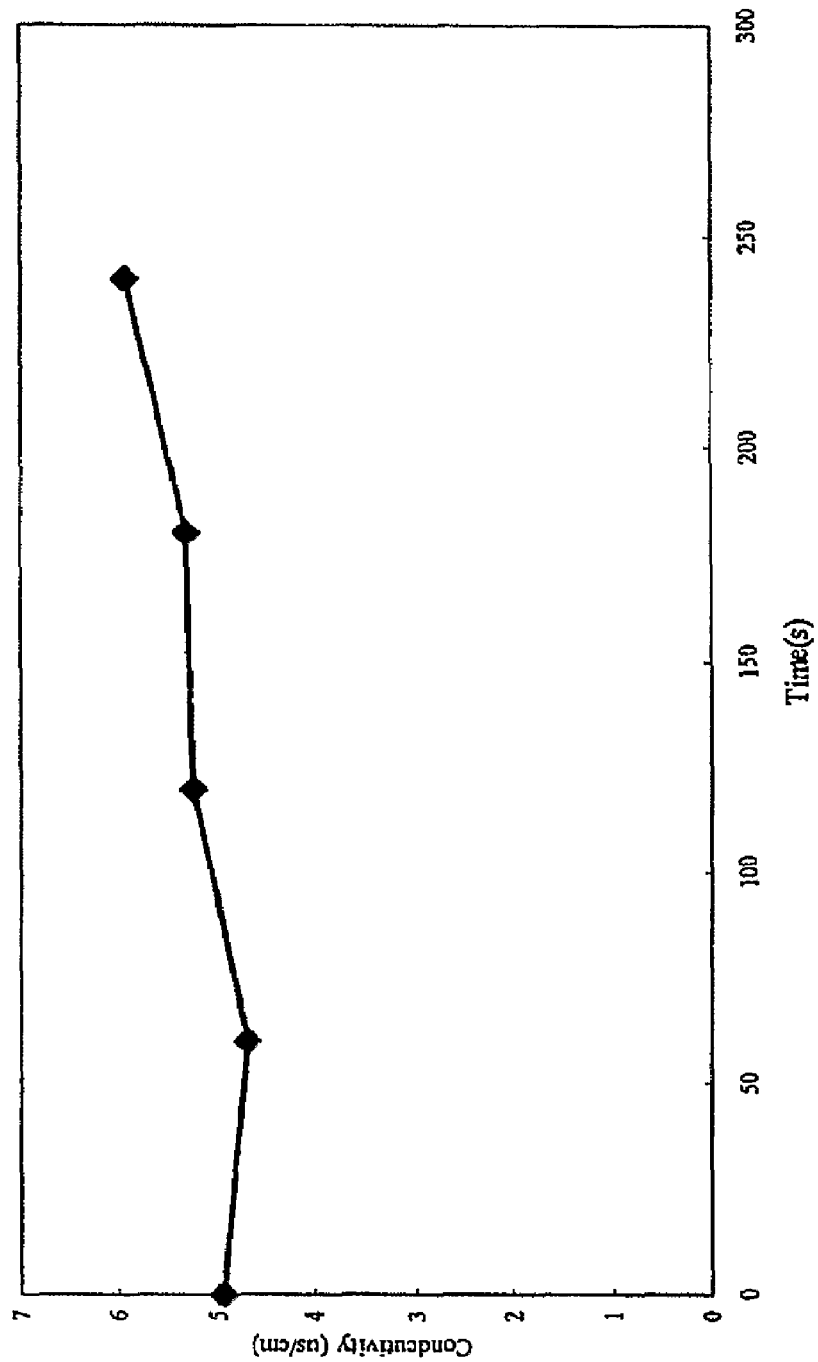
FIG. 13 illustrates the conductivity of suspension during an exemplary process of the invention, EPD of zeolite 3A, as described in detail, below.

The EPD kinetics of zeolite 5A is shown in FIG. 10. The results indicate that the deposition kinetics of zeolite 5A agrees with Hamaker's law. The change in the conductivity of the suspension is shown in FIG. 11. It indicates that the conductivity dropped as the deposition proceeded. The reason is that during the deposition the particles' concentration drops (since they deposit on the electrode). Since particles are the electron-carrying medium, the decrease of the particle concentration resulted in the diminished conductivity of the suspension. The kinetics of zeolite 3A with two particle loadings, which are 20 g/l and 40 g/l respectively, has also been conducted. The results are plotted in FIG. 12. The kinetics results of zeolite 3A show that there was a peak value of the deposition weight; after that, the deposition rate drops. The reason is that in the progress of the deposition, the particle loading decreased. Therefore, from Hamaker's law, the deposition yield also dropped. The conductivity of suspension during EPD of zeolite 3A is shown in FIG. 13. The conductivity of zeolite 3A didn't change too much compared to zeolite 5A. The structure difference between these two particle species might be the reason of the different kinetics and the conductivity change during EPD.

Figure 14:
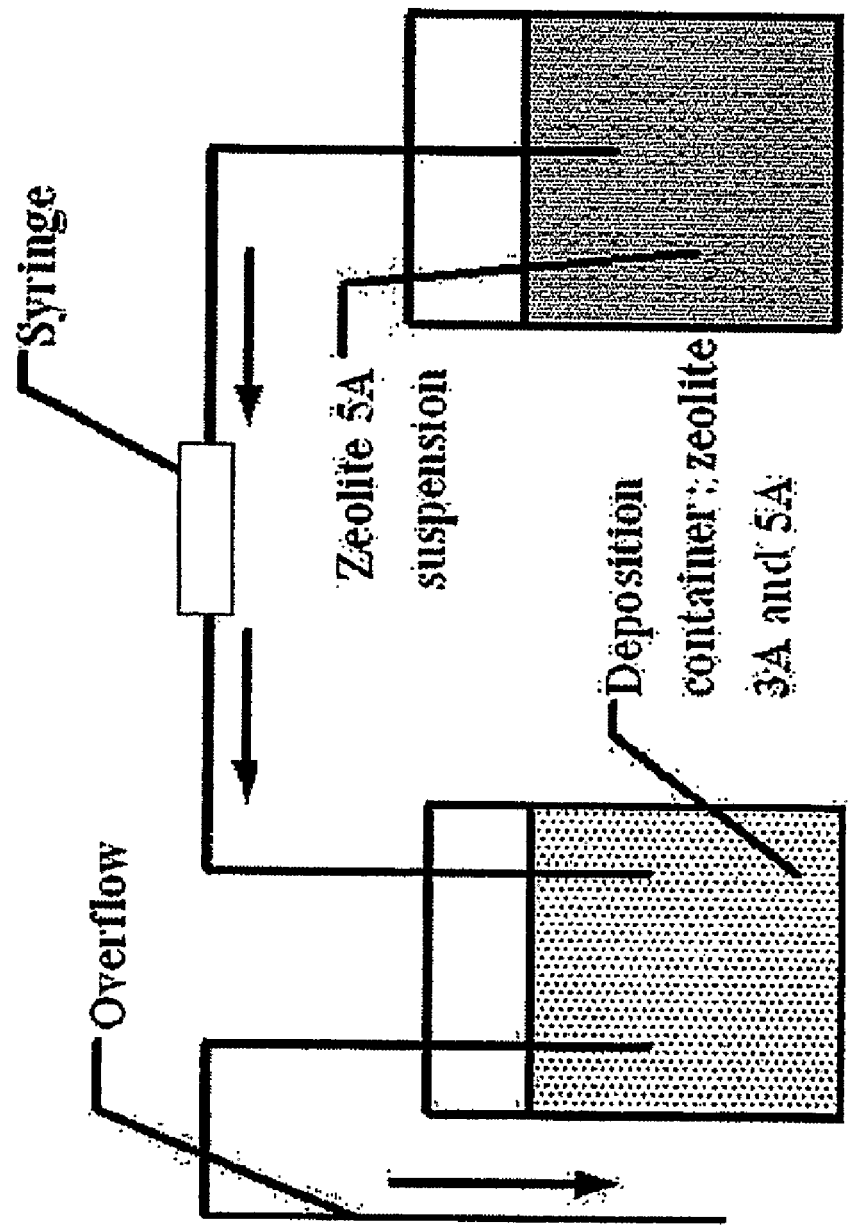
FIG. 14 illustrates an exemplary EPD co-deposition process of the invention, as described in detail, below.

EPD co-deposition studies were conducted in a glass beaker with magnetic stirring. Two vertically arranged stainless steel electrodes with 4 $cm^2$ surface area were separated at a fixed 20 mm distance. The electrodes were cleaned in acetone and then dried under air gun. A DC power supply (Dankar DK-22-4) was connected to the electrodes. The constant voltage of 200 V was used in EPD. The study setup was shown in FIG. 14. A magnetic stirrer was used to stir the suspension during EPD. Two suspensions of zeolite type 3A and 5A were prepared as described above. The particle concentration in both suspensions was 20 g/l. In order to obtain FGM, 30 ml suspension containing zeolite type 5A was added into the initial zeolite 3A suspension continuously during EPD process by a syringe. The total deposition time was 5 minutes. After the co-deposition, the deposits have been dried at room temperature for 24 hours in air.

After drying, the deposits thickness and microstructure have been characterized by optical microscopy and Scanning Electron Microscopy (SEM). The graded composition was analyzed by Energy Dispersive X-ray Dispersion (EDX) along the thickness direction of the deposit. The thickness of the deposit was measured by the cross section micrograph.

Figure 15:
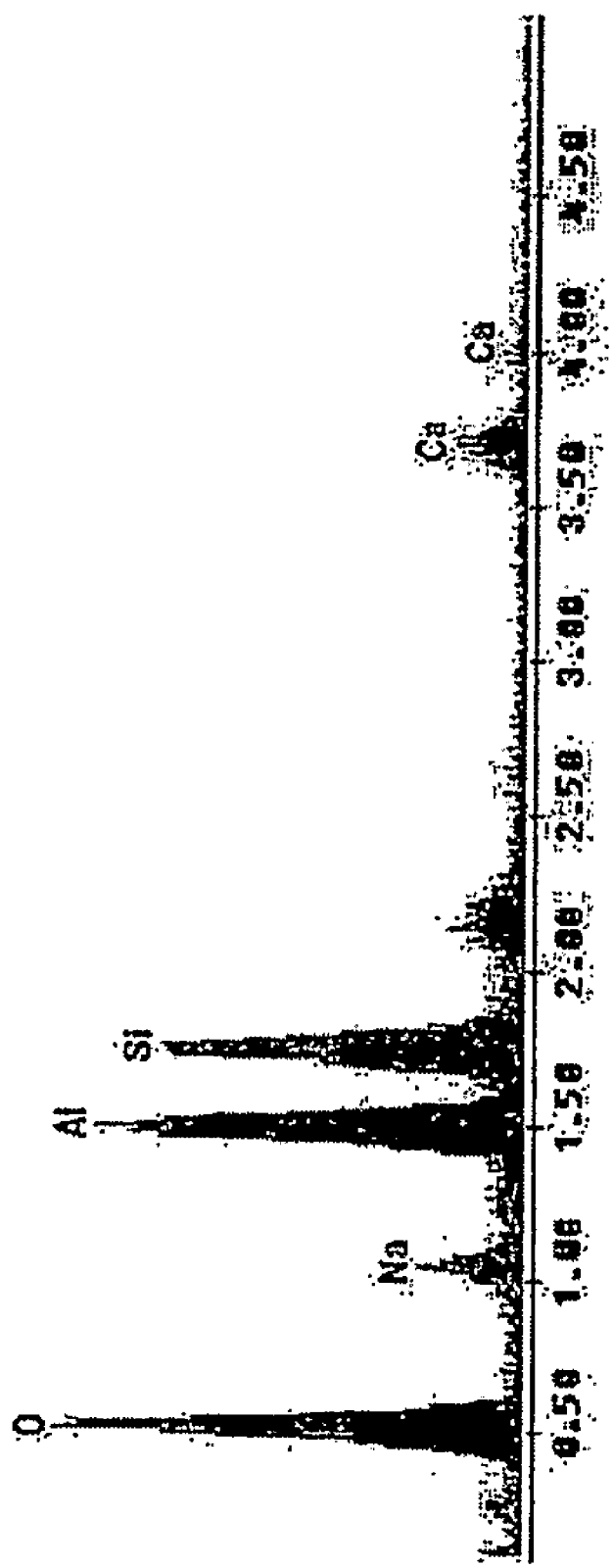
FIG. 15 illustrates an EDX (energy dispersive X-ray) analysis of deposited zeolite FGM made by a process of the invention, as described in detail, below.
Figure 16:
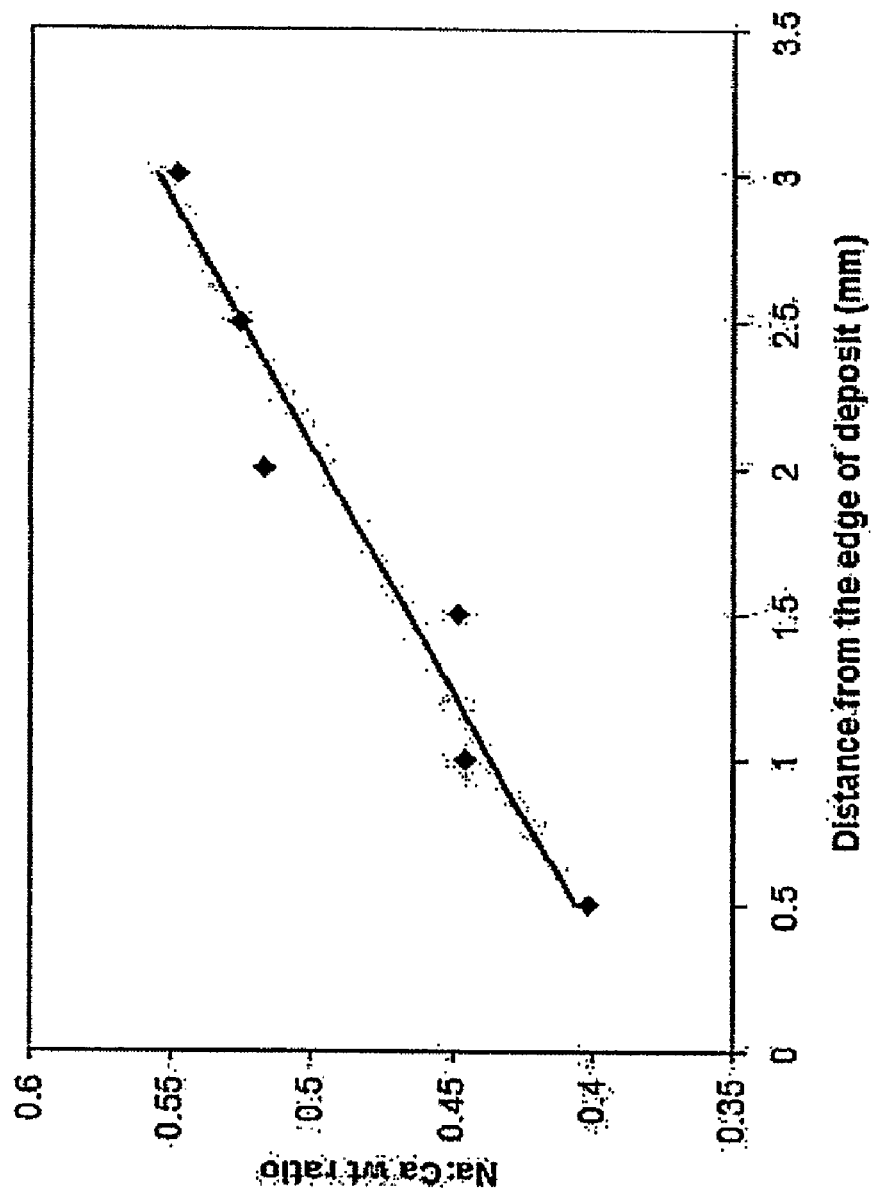
FIG. 16 illustrates the ratio of Na and Ca wt concentration along the thickness direction of a deposit made by a process of the invention, as described in detail, below.

The deposits were smooth and uniform. Deposited zeolite FGM on stainless steel substrate was observed; there is no crack observed in the deposit after drying. A cross section SEM micrograph of the deposited FGM was taken. FIG. 15, an energy dispersive X-ray Spectrometry analysis of the deposited structure, shows the EDX analysis results to confirm the composition of the deposit. The ratio of Na and Ca concentration is shown in FIG. 16 (the ratio of Na and Ca wt concentration along the thickness direction of the deposit). From FIG. 16, it is clear that the concentration of Ca increased along the thickness direction, which means that the concentration of 5A increased. Therefore, the composition of resultant deposit is a graded structure.

The studies conducted in this study indicated that acetone and n-butylamine render satisfactory deposition rates. The 3 mm thick zeolite 3A deposit in our studies was obtained within 5 minutes. The studies also indicated that the addition of n-butylamine couldn't suspend the zeolite particles effectively. Particles have been partially sedimented. Therefore, magnetic stirring was necessary.

Figure 17:
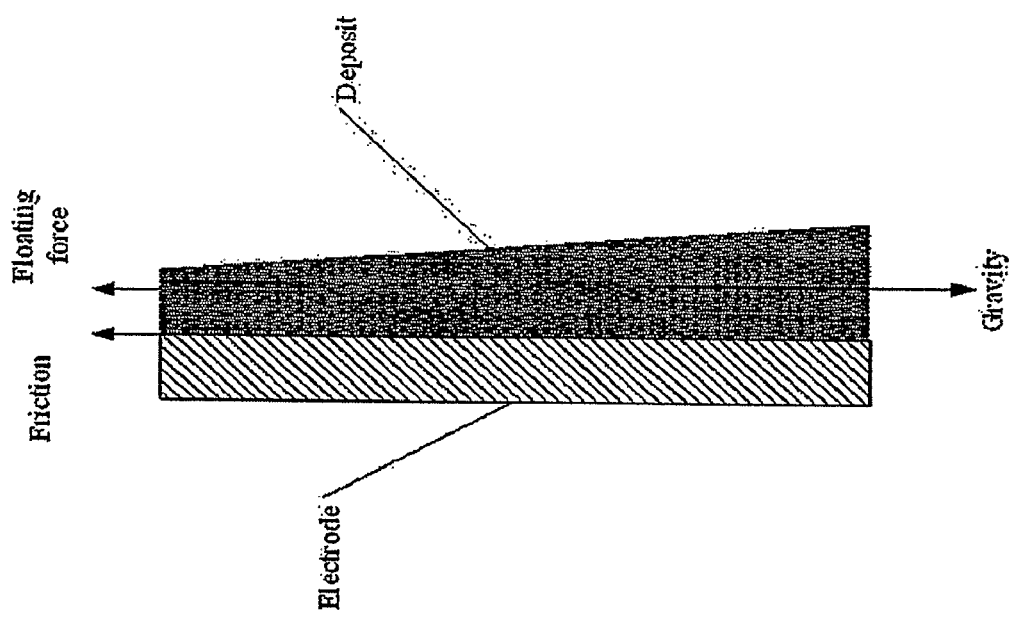
FIG. 17 schematically illustrates force acting on a deposit during EPD during a process of the invention, as described in detail, below.

It was observed in the studies that as the deposition proceeds, the thickness of the deposit became more non-uniform: the upper portion of the deposit is thinner than the lower portion of the deposit. This is because the deposits slid towards bottom of the electrode. This phenomenon was illustrated in FIG. 17 (force acting on the deposit during EPD). For thin deposits, the friction between the deposit and the electrode plus the floating force from the suspension is enough to hold the deposit. However, as the increase of the deposit thickness, the gravity is higher than the friction and floating force. As a result, the deposit was deformed and the thickness became non-uniform. If the deposit time is shorter, the deposit doesn't have enough time to deform. Therefore, in order to deposit thick deposits uniformly, large voltage was preferred to reduce the EPD time. However, our studies indicated that large voltage caused the roughness of the deposit surface.

One alternative approach to avoid cracks during drying is to use freeze-drying. The green sample was first frozen to solidify the liquid, and then it was subject to the freeze-drying process utilizing the sublimation of solidified liquid. Since there is no liquid phase in the freeze-drying process, the cracking problem was avoided.

Cracking Problems Associated with Drying

Drying is one of the most important steps of the entire EPD process. It is preferred to control drying rate to provide both quick drying (can increase productivity) and good quality without cracking. However, organic solvents used in EPD, such as ethanol and acetone, are easy to evaporate and to cause extremely fast drying rate. The FGM specimen shaped by EPD can be dried within a couple of seconds in the air. The fast drying unavoidably generates cracks because non-uniform drying causes capillary forces in the specimen. The macro cracks cannot be "healed" during the following sintering process. Cracks can develop in a deposit of zirconia with particle size of about 0.6 micron. The thickness of the disk is 5 mm and the diameter is 30 mm. In order to lower the drying rate, cotton wool (3M, C-FL 550DD) was used in the studies to keep the specimen wet. Acetone was first sprinkled onto the cotton and then applied to the top of the specimen.

It was observed that the smaller the particle size, the easier to generate cracks. This is analogous to sintering: smaller particles have larger sintering stress.

Additions of binders improve the strength of the green deposit and prevent the crack's formation in EPD deposits. However, the amount of binders added should be carefully considered. According to our studies, an excessive binder amount is harmful for crack prevention.

Another effort that was taken to prevent cracks is to try to reduce the edge effect. In our studies, it was observed that cracks always initiate near edges and corners of the electrode before they are developed across the entire deposit. The reason is probably that at edges and corners, a stress concentration exists. In order to reduce the stress concentration, a circular shape TEFLON™ cover was designed, which can effectively reduce the stress concentration. Correspondingly, an electrode with an octagon shape was designed to fit the fixture. The reason to choose TEFLON™ is the following: first, it has good chemical resistance; secondly, it has low surface friction. The second advantage makes TEFLON™ a good lubricant (one good example is non-sticking cooking pans).

Fabrication of Composite Thin Films by Sequential Deposition

Processes of this invention comprise use of sequential deposition, including EPD, and in some aspects is followed by electroplating. Processes of this invention comprise fabrication of FGMs by EPD. Processes of this invention comprise FGM shaping by EPD, including the fabrication of thin films made of ceramic/metal composites. These thin films have potential applications in electronic packaging industry. The sequential deposition technique may be used for the thermal management of electronic circuitry.

Figure 18:
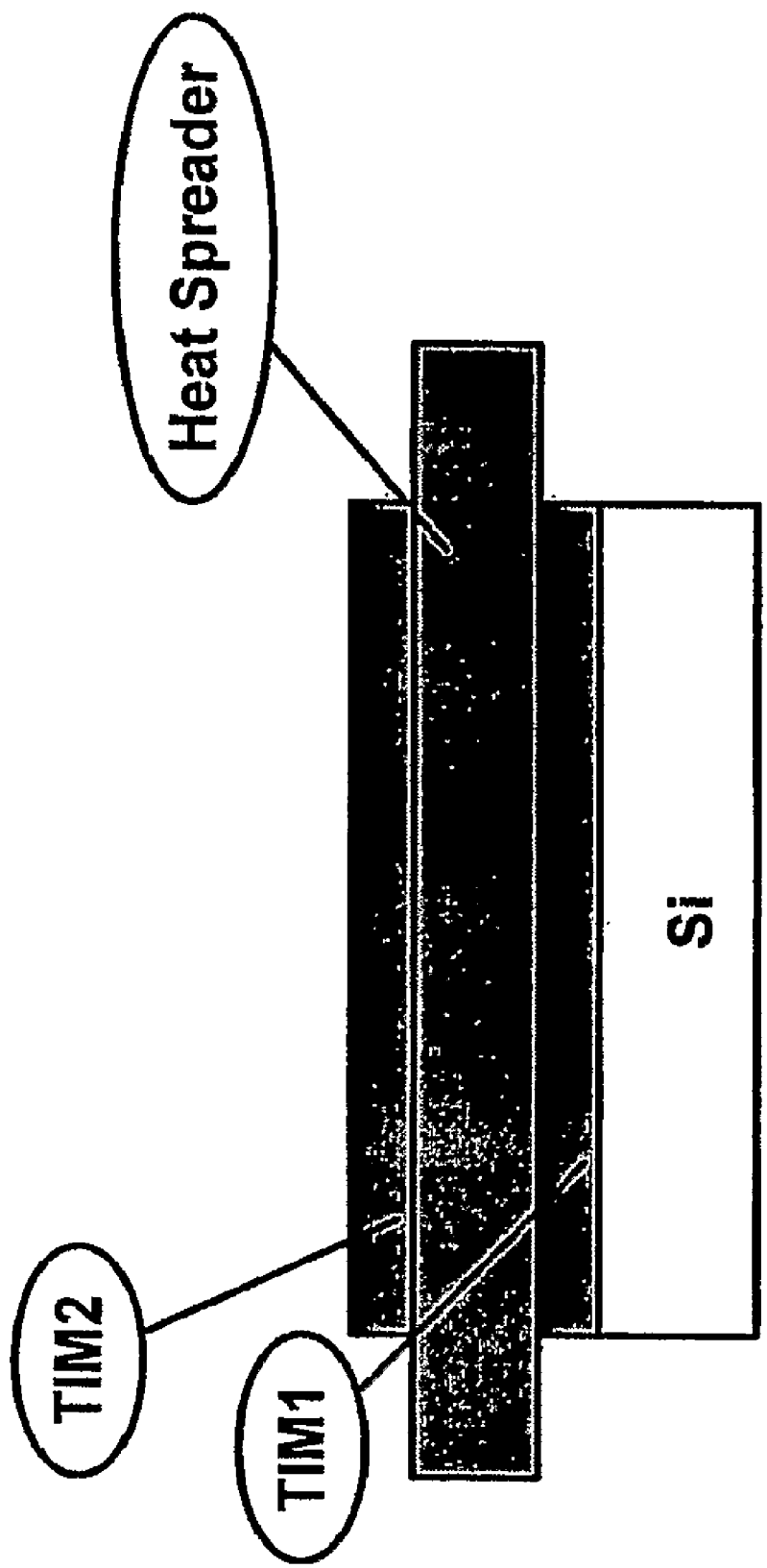
FIG. 18 schematically illustrates a typical layout of chip packaging, which can be applied to practicing the methods of this invention, as described in detail, below.

As the requirements for computer capabilities increase, the smaller IC chips are demanded. However, cooling is a significant problem of VLSI chips. Heat sinks are widely used in thermal management structures. The heat sinks are usually made of metals such as copper. A heat sink has to be attached to the silicon chip to spread heat out. In the packaging industry, a thermal interface material (TIM) is used to achieve this purpose. FIG. 18 is a typical layout of chip packaging, which can be applied to practicing the methods of this invention. The table below lists the thermal properties of several materials that can be incorporated into the processes, and products, of this invention, and which are widely used in electronic packaging. The commercial TIMs are in the form of thermal pastes, which are polymeric materials. These polymers have low thermal conductivity. Moreover, due to the mismatch of the coefficients of thermal expansion (CTE) between the heat sink and silicon, large thermal stresses develop in TIMs.

One approach to compensate, and to some extent, alleviate the thermal expansion coefficient mismatch is to use a composite material which is made of copper and ceramics to serve as a TIM. However, the FGM and composites produced by co-deposition regime, which are mentioned in the previous sections, have low mechanical strength; they have to be thermo-treated to increase the strength. Because a high temperature processing is not desirable in the fabrication of electronic circuitry, the EPD combined with electroplating was employed. Since EPD deposits are porous, it enables the incorporation of copper into the ceramic matrix by subsequent electroplating. Thermal properties of commonly used electronic packaging materials that can be incorporated into the processes, and products, of this invention:

| Material | CTE (ppm/K) | Thermal conductivity (W m$^{-1}$ K$^{-1}$) | Density (g/cm$^3$) |
|---|---|---|---|
| Silicon | 2.6 | 150 | 2.33 |
| Copper | 16.5 | 400 | 8.9 |
| Diamond | 1.2 | 2300 | |
| SiC | 3.5~4.6 | 120~270 | 3.1 |
| Zirconia | 8.2~10.3 | 2.2 | 5.68 |
| Alumina | 4.3~7.4 | 15~33 | 4.0 |
| Mullite | 4.0~4.2 | 6 | 2.8 |
| Polymer adhesive | | 1~2 | |

Exemplary EPD parameters to deposit thin $Al_2O_3$ films:

| Parameter | Value |
|---|---|
| Voltage | 50 V |
| Distance between Electrodes | 30 mm |
| Particle loading | 100 g/l |
| Drying time | 10 min |
| Mixing time before EPD | 5 min |

The parameters for EPD deposition are summarized above. After the EPD coating had dried completely in air, it was plated in a copper FB plating bath (Technic Inc., USA) to impregnate copper into the alumina matrix. The composition of the plating bath was determined by titration. The results for the electroplating bath composition are:

| Composition | Concentration |
|---|---|
| $Cu^{2+}$ | 25~29 g/l |
| $Cl^-$ | 45~75 ppm |
| $H_2SO_4$ | 12~15 vol. % |

Figure 19:
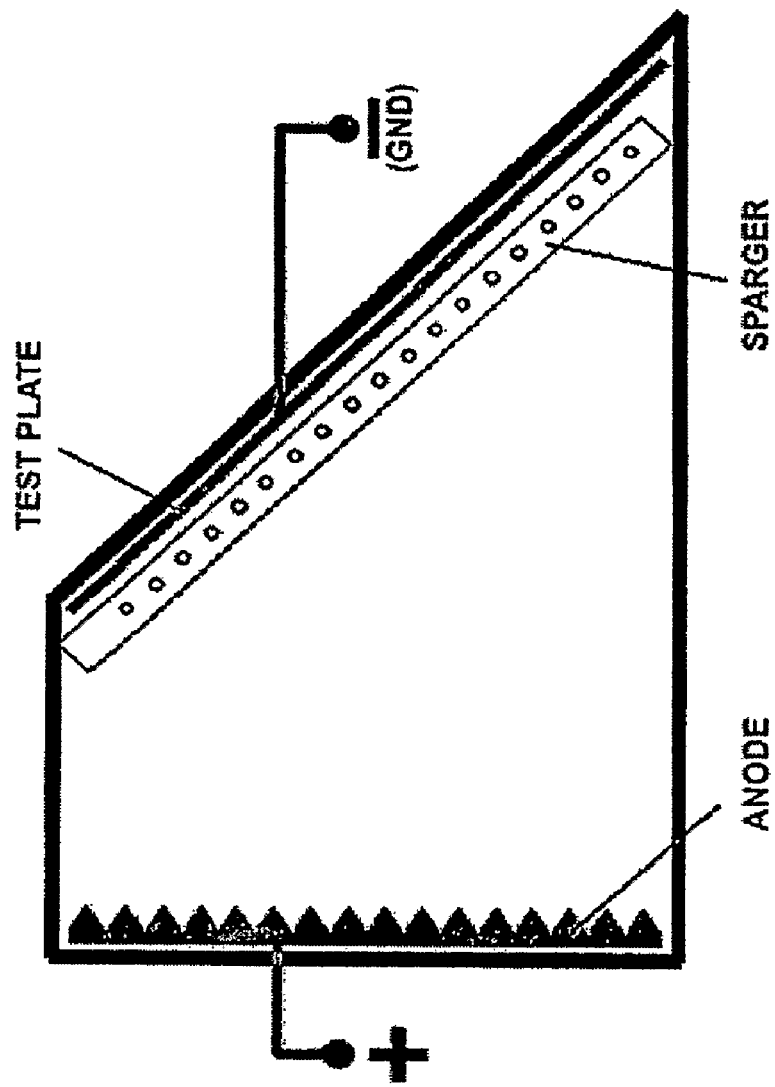
FIG. 19, which schematically illustrates an exemplary Hull Cell, which can be applied to practicing the methods of this invention, as described in detail, below.

A piece of copper served as the anode. The bright current density was determined to be 20~60 mA/cm$^2$ from Hull cell studies, see FIG. 19, which illustrates an exemplary Hull Cell. When the initial EPD deposits were dipped into the plating bath, they could be peeled off from the electrode by the external water pressure. This phenomenon was caused by the permeation of water into micro-cracks. To solve this problem, polyvinylbutyral (PVB) was added as a binder to increase the deposit's green strength. The amount of PVB added was 0.0004 g/l. A magnetic stirrer was used to make the plating bath homogeneous. From the Hull cell studies, the current density was determined to be 20 mA/cm$^2$. If the current density is too high, it causes the so-called "burning" surfaces, in which the plated copper was a layer of loose powders. Basically, the current density can be determined by Hull cell studies. A piece of brass serves as the cathode and a piece of pure copper with grooves on it serves as the anode (the anode will be consumed during electroplating). The grooves in the anode can make the electric field uniformly distributed in the plating bath therefore the edge effect, which has localized current density concentration, can be avoided. Since the cathode is not parallel with the anode, the current density on the cathode changes from one end to the other. Therefore, a wide range of current density can be available with only a single test piece. After electroplating, the cathode was compared with a standard chart to obtain the bright current density.

Figure 20A:
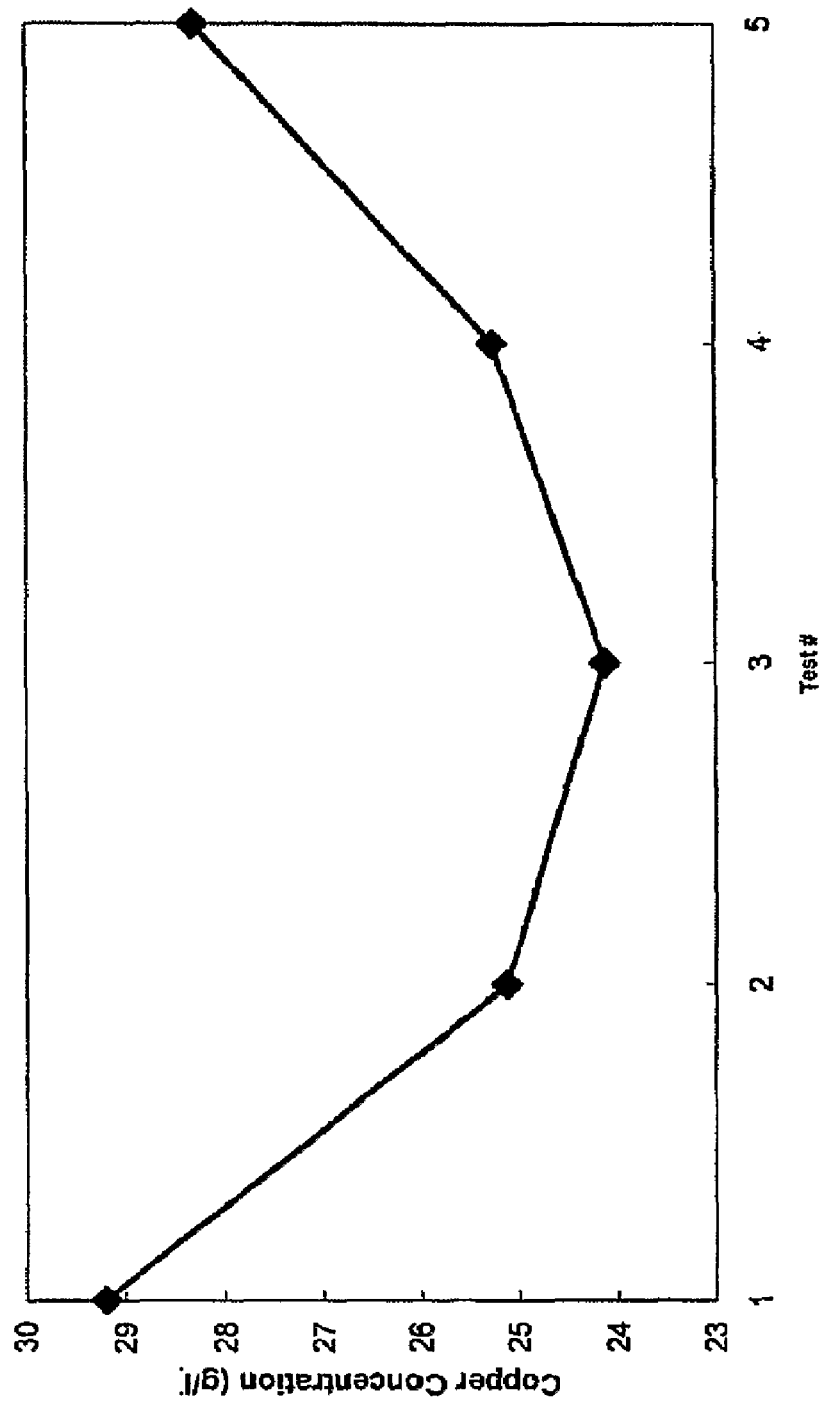
FIG. 20A (copper), FIG. 20B (sulfuric acid) and FIG. 20C (chloride).
Figure 20B:
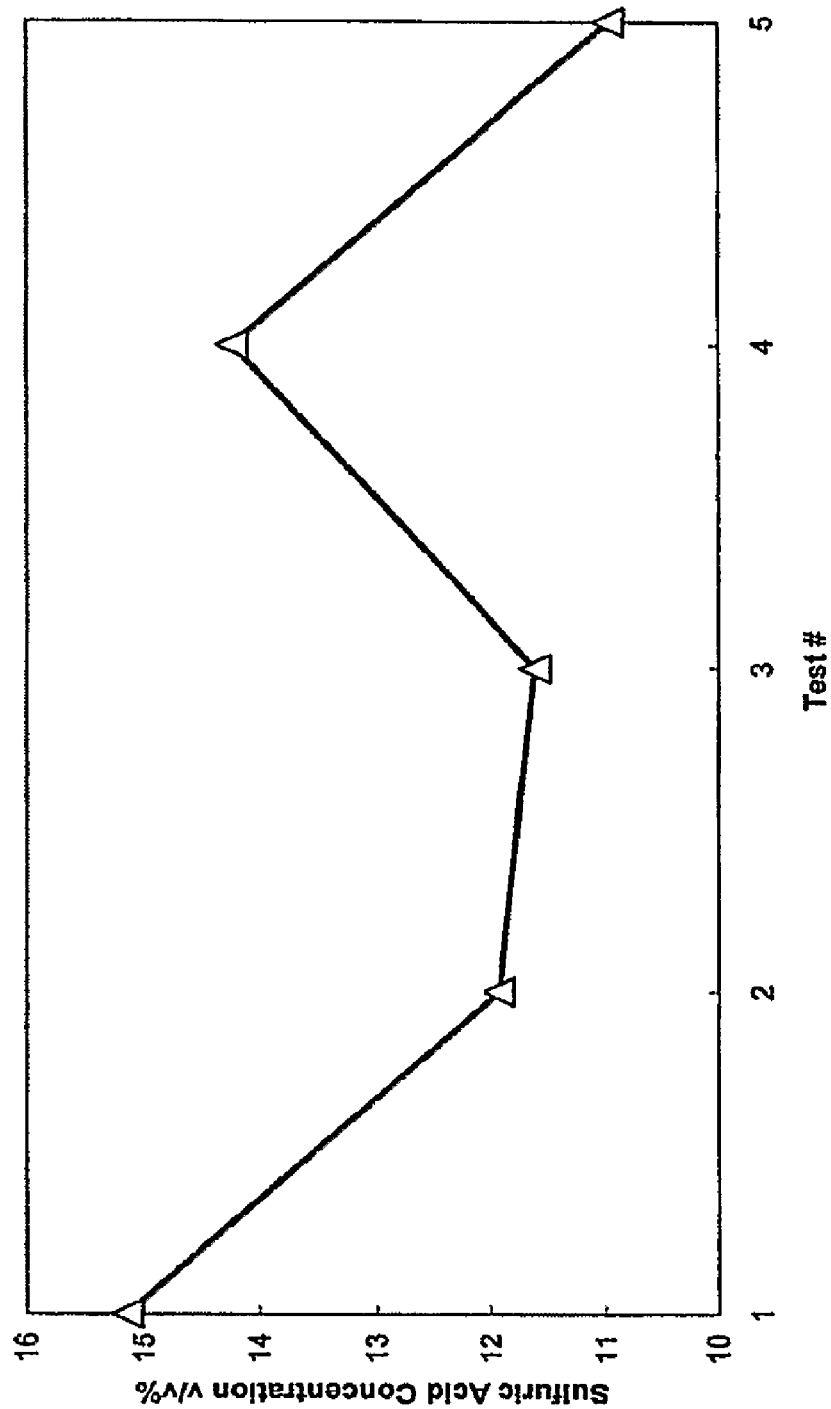
FIG. 20 illustrates the consumption rate of main constituents of an exemplary process of the invention, as described in detail, below, as determined by titration.
Figure 20C:
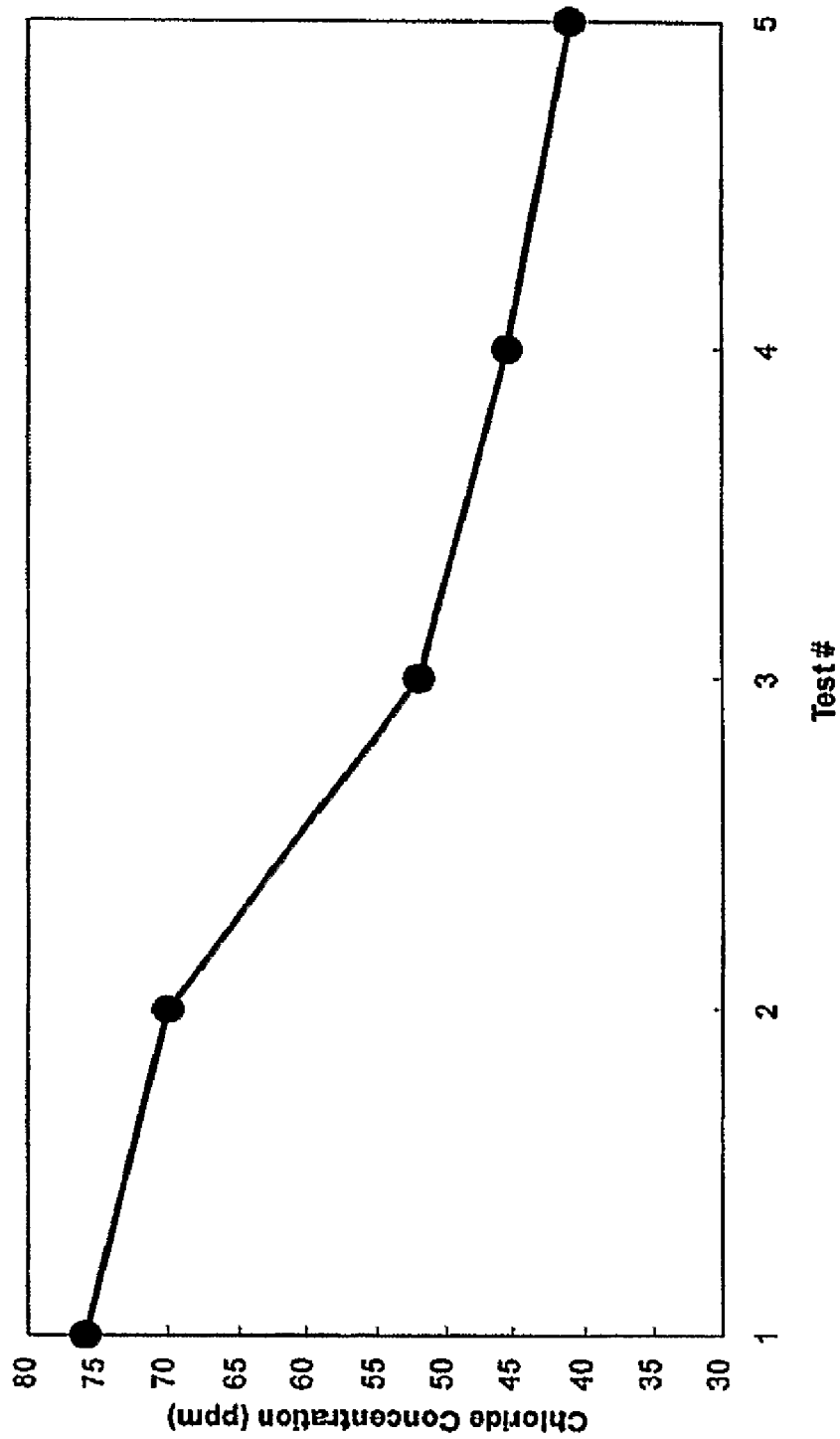

The consumption rate of main constituents listed in the Table, above, has been determined by titration, and the results were plotted, as illustrated in FIGS. 20A (copper), 20B (sulfuric acid) and 20C (chloride).

Following 27 hours of electroplating, the coating was cross-sectioned and polished. After the polishing process, the alumina particles were covered by soft copper, making it impossible to observe the alumina particles. To remove the copper, the sample was chemically etched in the etchant (20 ml $NH_4OH$, 8 ml $H_2O_2$ and 10 ml water) after mechanical polishing. After 1 minute of etching, the alumina particles were exposed A top view (perpendicular to the substrate) of the EPD deposit before electroplating showed that there are many pores in the deposit which provide channels for the following electroplating impregnation.

The results of the SEM analysis for the composite coating obtained by EPD-EP sequence were observed: $Al_2O_3$ particles are uniformly embedded and distributed inside the copper matrix. The small white dots in the picture correspond to $Al_2O_3$ particles of about 0.5 micron. The pores in the $Al_2O_3$ skeleton provide channels for copper ions to impregnate. Copper ions deposited quite well during the impregnation process.

The EPD coatings have to be dried prior to electroplating. Cracks are formed due to the non-uniform drying of a green deposit. Thicker EPD coatings produce more cracks during the drying process. When the coating is completely dried, it is dipped into an electroplating bath for impregnation. However, the water pressure can delaminate the coating from the electrode. We found that adding PVB as a binder can solve this problem. However, adding too much PVB can significantly decrease the EPD rate. The sequence in which the suspension is mixed is also very important. If PVB, acetone, n-butylamine and alumina powders are mixed at the same time, the EPD rate decreases down to zero. This is caused apparently by the attraction of the PVB to the surface of ceramic particles. As a result, the particles' charging is not sufficient. If acetone, n-butylamine and particles are mixed together, and then PVB is added, the EPD rate stabilizes.

A second problem can occur during electroplating following EPD, where air bubbles form on the surface of the EPD coating. This is due to the residual n-butylamine reacting with the electroplating bath. In our studies, after drying the EPD coating is first dipped into deionized water and then rinsed for 10 minutes. This solved the problem of the air bubble formation.

These studies indicate that on top of the composite ceramic-metal coating there is always a layer of an alumina coating obtained from the previous EPD step. Since the copper impregnates pores of the alumina skeleton during electroplating, stresses develop in the composite layer. Due to the low strength of the obtained EPD coating, as the composite layer grows, the surface EPD coating, which is free of copper, was separated from the composite coating.

Freeze Drying, Sintering and Impregnation

As discussed above, in some embodiments, the material design requirements include composition and microstructure. The composition control is discussed above, including tailored FGM structures. The control of microstructure can also be through freeze-drying techniques.

Aligned porous structures made by the processes of this invention have many potential applications, such as in heat sinks for electronic packaging, and filters. Therefore, this description will demonstrate how to fabricate aligned porous structures of the invention through freeze-drying.

The invention can use any freeze-drying process, e.g., including any process comprising the directional formation of ice crystals, e.g., in a ceramic slurry, and their following sublimation. As a result, a capillary-porous structure is formed which can be subjected to infiltration by metal at the next stage. The purpose of this process is to "lock" the composition and structure of the materials by drying them without applying heat necessary for evaporation process. The most important advantage of this process is that the materials geometry and structure remain intact after freeze-drying without damage. This process has been widely utilized by food dehydration and biology sample preparation.

Figure 21:
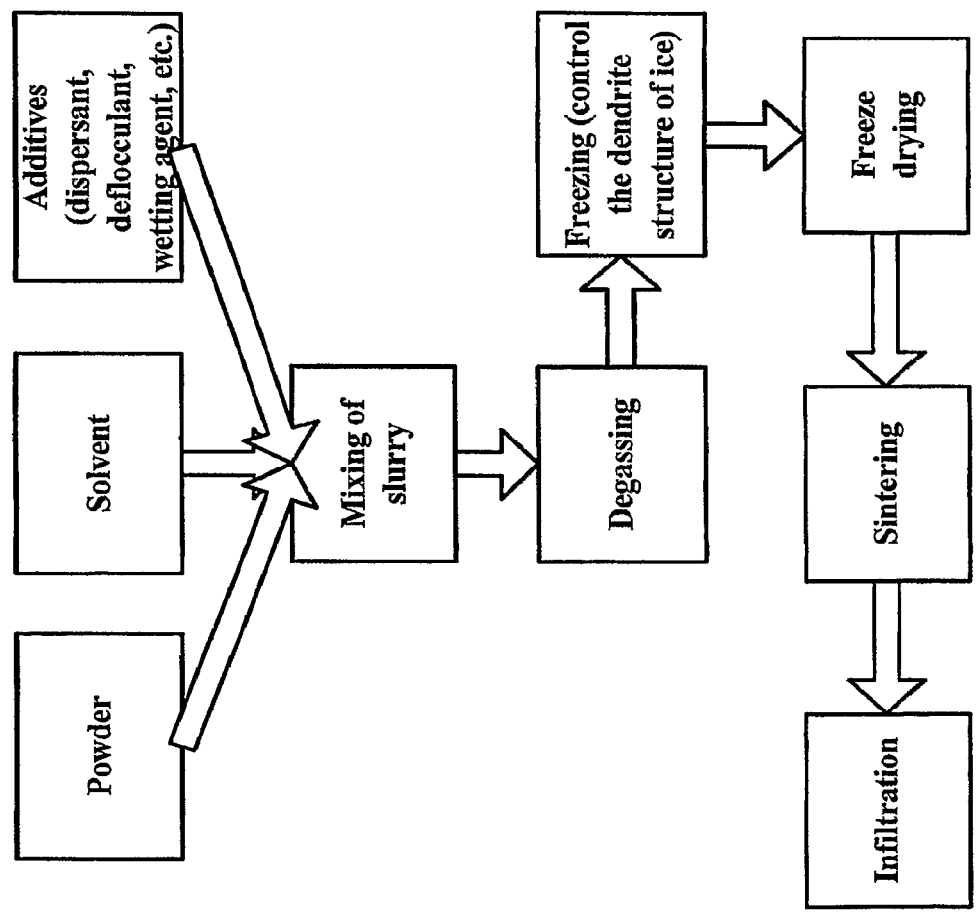
FIG. 21 schematically illustrates alternative freeze-drying processing steps used to practice the methods of this invention, as described in detail, below.

In practicing the methods of this invention, freeze-drying provides a convenient way to shape green compacts from powder slurries. Alternative freeze-drying processing steps are summarized in FIG. 21. In alternative embodiments, advantages of freeze-drying to process powder materials include: (1) Since freeze-drying starts with colloid suspension, the agglomeration of particles can be relieved by adding electrostatic dispersant, such as acid or base. The suspension can also be further processed by ball milling or ultrasonic vibration to eliminate particle agglomeration. The study's results have proved that the powders processed by freeze-drying have a finer grain structure after sintering; (2) Compared to cold pressing of powders in a rigid die, the freezing of well-dispersed powder slurry generates a homogeneous structure. The porosity distribution is uniform through the entire green body; (3) The microstructure of the green body can be controlled by controlling the ice dendrite growth during the freezing step. The parameters which influence the ice dendrite structure include temperature gradient, grain refinement additives, slurry composition, etc.; (4) It can be used basically to any materials as long as they are in the form of powder, i.e. metallic, ceramic, polymeric, and their combinations can be shaped by freeze drying; (5) The process involves only water and very tiny amount of organic additives. The environmental impact can be minimized (degradable organic additives for particle dispersing are commercially available).

In light of the above-mentioned alternative advantages of freeze-drying, the processes of the invention technique comprise use of unidirectional freezing to obtain the aligned porous structure for the following infiltration of a second phase material.

Unidirectional Freezing and Freeze Drying to Fabricate Aligned Porosity

Figure 22:
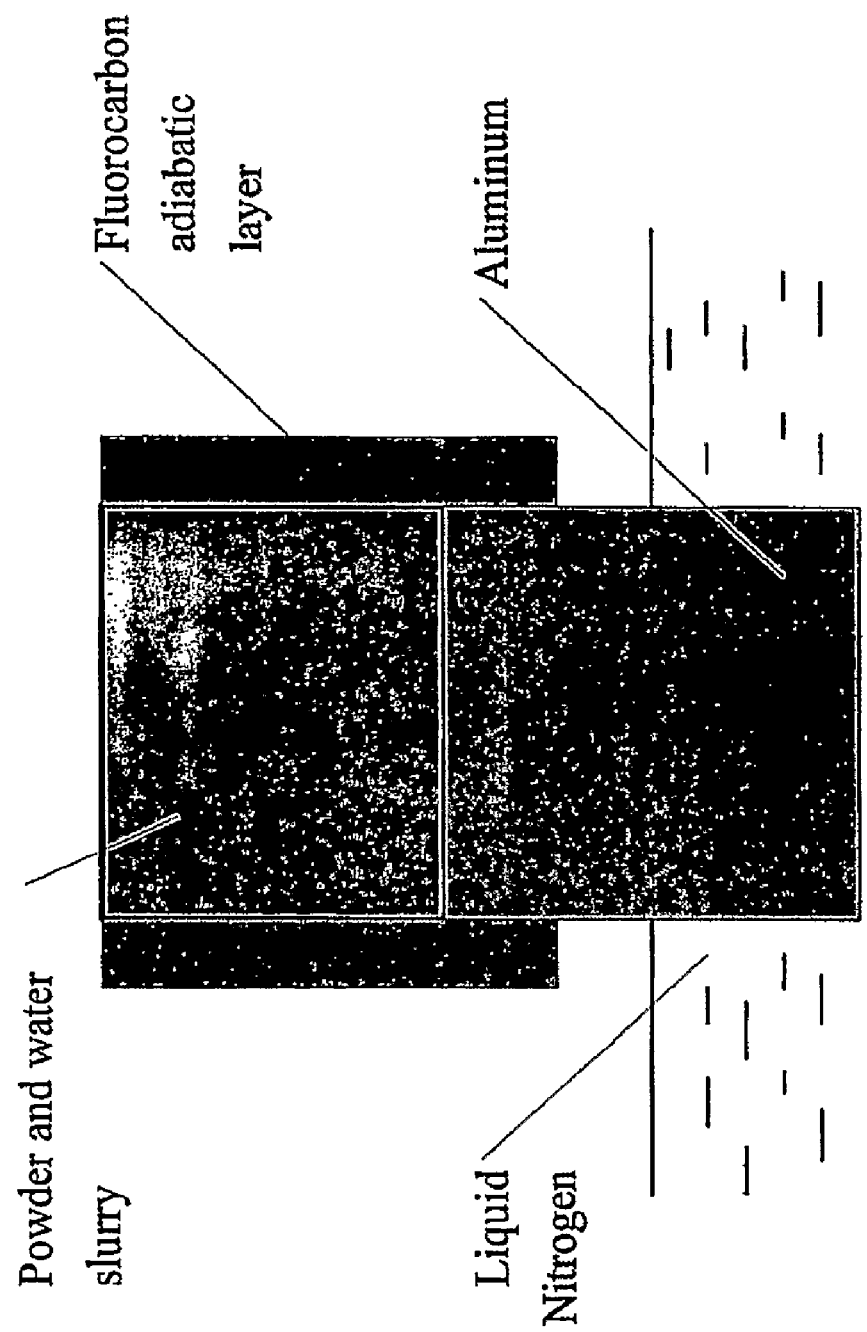
FIG. 22 schematically illustrates the configuration of $ZrO_2$ preforms with aligned channels used to practice the methods of this invention, as described in detail, below.

The $ZrO_2$ preforms with aligned channels used in this work were prepared based on the process introduced by Fukasawa. The configuration is shown in FIG. 22. The slurry was poured into a cylindrical mold made of fluorocarbon. The diameter of the cylindrical mold is 12.5 mm and the height is 12.5 mm. There was an aluminum rod under the slurry with the other end dipping into liquid nitrogen. The $ZrO_2$ slurry was poured into the mold smoothly. After the entire slurry was frozen, it was removed from the mold and dried in a freeze-dryer (Labconco FreeZone 1) for 24 hours to sublimate the ice.

The 35% vol. concentration $ZrO_2$ slurry was made by dispersing $ZrO_2$ powders (TZ-3YS Tosoh, Japan, specific surface area 6.6 $m^2/g$) in deionized water. Commercial dispersant (Duramax D-3005, Rohm and Hass, USA) was added at the ratio of 2.2 mg per square meter of total particle surface area. The slurry was milled in a planetary ball mill (Fritsch LC-106A) for 30 minutes prior to freezing. The slurry was further deaerated in a vacuum chamber before freezing. After the above-mentioned processing, the slurry was stable and homogeneous based on visual inspection.

The dried sample was sintered in a tube furnace in air at 1400° C. for 2 hours. The heating rate was 10° C./min. After sintering, the preform was cooled at the rate of 10° C./min down to room temperature.

The sintered $ZrO_2$ has aligned channels parallel to the direction of solidification of ice. An image of the results shows the sintered specimen with aligned porosity. The white area is the ZrO2 skeleton; while the black area is the epoxy for mounting. The specimens are 0.5 inch in diameter and 0.5 inch in height. The sintered specimen was highly porous because of the presence of aligned channels. The aligned pores are opened extending along the solidification direction. The aligned open pores enable the infiltration of liquid phase such as brushing gold. The unidirectional solidification generates temperature gradient in the slurry. As a result, the ice dendrite grows along the temperature gradient direction. Because $ZrO_2$ particle is insoluble in water, it was repelled from the ice dendrites and trapped in between the columnar ice dendrites to form the aligned porous structure. It was observed there were some protruded ceramic agglomerates on the walls of the pores. These ceramic agglomerates could be formed because they were trapped by the second dendrite arms during freezing.

In order to analyze the influence of the temperature gradient, another study has been done using the same slurry. However, the slurry was poured into another mold which has an aluminum mold ring instead of fluorocarbon. The mold with slurry poured in was frozen in a regular freezer without dipping the "cold end" into the liquid nitrogen. Therefore, no unidirectional temperature gradient was present. After freeze-drying, the sample was sintered in air. The randomly distributed pore structure indicates the lack of oriented crystal growth because of the absence of the temperature gradient.

Impregnation of Brushing Gold and Annealing

The sintered $ZrO_2$ specimen was cut perpendicular to the axis into 2 mm thick slices for brushing gold infiltration. The $ZrO_2$ preform was dipped into brushing gold solution (Alfa Aesar, USA) for infiltration. Then it was dried in air for 1 hour. The dried sample was annealed in a furnace (Ney 2-1350, USA) in air at 600° C. for 1 hour. The heating rate was 5° C./min. When the sample was completely cooled down to room temperature, it was dipped into brushing gold again for the second infiltration. This process was repeated four times in order to increase the yield of gold wires. After annealing, the sample was characterized by Scanning Electron Microscopy (SEM).

Figure 23:
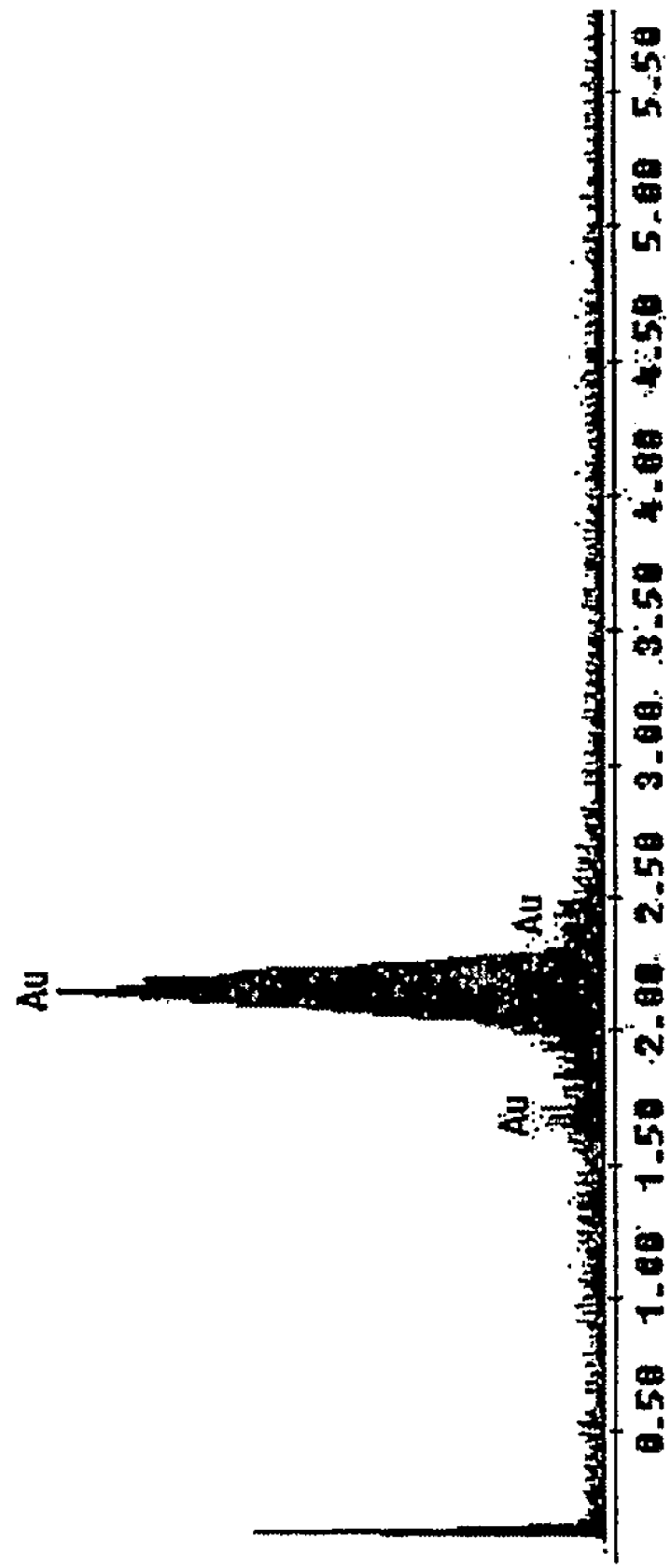
FIG. 23 illustrates Energy Dispersive X-ray (EDX) results from a $ZrO_2$ preform after infiltration of brushing gold on gold wires, as described in detail, below.
Figure 24:
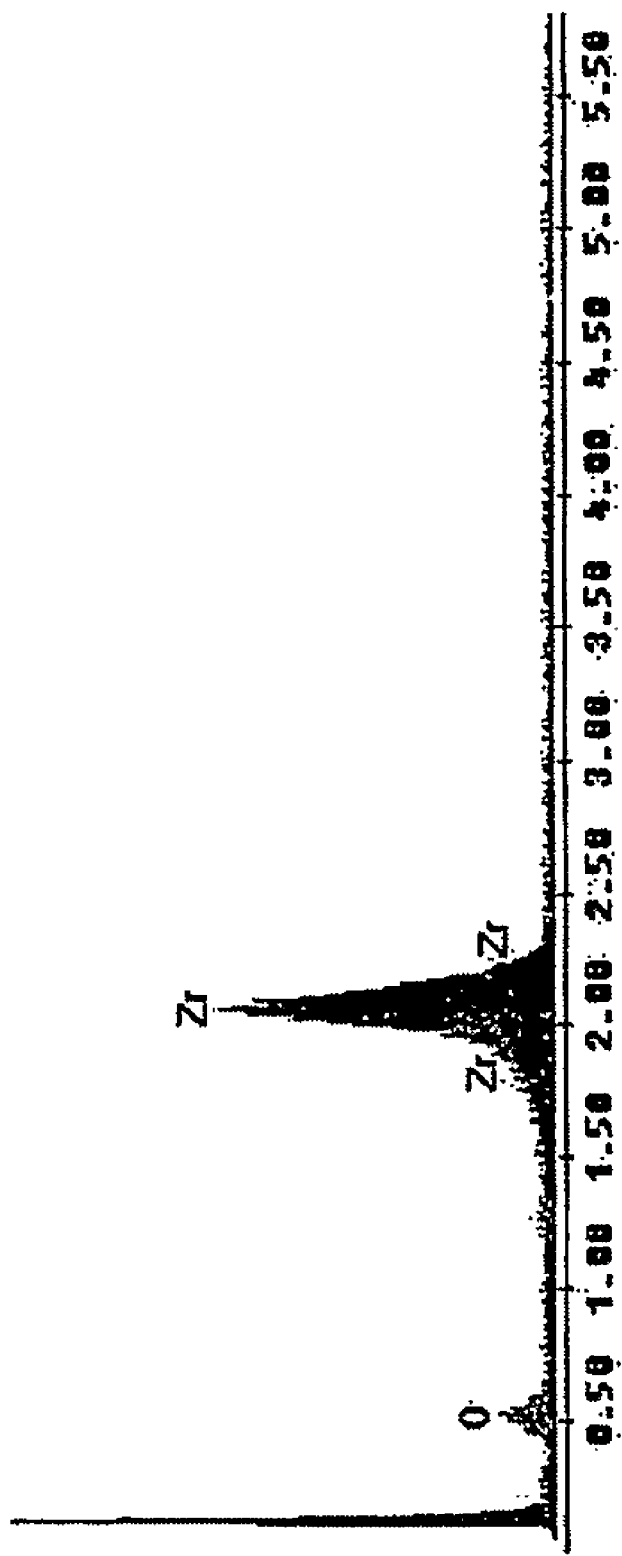
FIG. 24 illustrates Energy Dispersive X-ray (EDX) results from a $ZrO_2$ preform, as described in detail, below.

A cross section of the $ZrO_2$ preform after infiltration of brushing gold shows the macroscopic structure of the preform after annealing. Gold wires were found to grow in the pores of the preform. The pores are still mostly hollow; the gold wires only occupy a portion of the pore. Some of the gold wires are straight; some of them are bent. The bent gold wires indicate that they are ductile rather than brittle. The diameter of the wires varies from several hundreds of nano meters to several microns. The end of the gold wires was flat. The maximum length of the wires is larger than 50 μm. The recrystallization condition may influence the diameter of the wires. The micrographs also indicate that the diameter of each wire is uniform throughout its length. The Energy Dispersive X-ray (EDX) results for the gold wires, illustrated in FIG. 23, confirmed the composition of the obtained gold wires. The EDX result of surrounding $ZrO_2$ preform was also recorded, as shown in FIG. 24. A top view of the infiltrated specimen after annealing shows that the pores have been filled by brushing gold.

The pore diameter in the studies are in the range of ~25 μm, which is much larger than the size of the gold wires. This means that the gold wires didn't replicate the pore size and morphology. There may be growth of fibrous $Si_3N_4$ grains on the aligned channels after sintering. The fibrous grains may be formed by the evaporation-condensation mechanism.

In this work, the gold wires were formed during the annealing process while the recrystallization occurs. It seemed that during the recrystallization process, the wetting conditions between the brushing gold and the $ZrO_2$ preform controlled the gold wires' growth.

The processes of this invention can also (further) comprise the use of alternative approaches, such as vapor phase routes, solution-based methods, and template-directed synthesis, and the like, to synthesize nano wires. For example, the template method is a straightforward approach known in the art. In this approach, porous alumina membrane with nano sized pores provided the template to replicate nano wires when the pores were infiltrated by gold. The templates used in the approach are either polymer films containing track-etched channels or alumina films containing anodically etched pores. One of the most important benefits of template method is that the diameter of the nano wires can be controlled at will by varying the diameter of the pores in the template membrane. By depositing two materials into the template simultaneously, composite nano wires can be synthesized. A one step approach to synthesize carbon/gold by impregnation of gold solutions followed by annealing as described by Göring, et. al., Nano Letters, 4 (6), 1121, 2004, can also be used.

The preform with aligned channels as the template for gold wire growth can be used. An alternative embodiment, the method used in this study, differs from the template method because the size of pores in this research was much bigger than that of wires. So the grown gold wires were not replication of the pores.

In order to identify the influence of the template on gold wire growth, another comparison study was conducted by dropping brush gold on the surface of a piece of transparent glass. The same annealing procedure as used for the porous $ZrO_2$ preform was applied. The micrograph of the result shows that there is no gold wire present. The gold wire network was formed during the annealing process.

Net Shaping by EPD and Sintering

In one aspect of the processes of the invention—as manufacturing cycles—when designing FGM parts for manufacturing, one should start from the determination of the initial shape of a green FGM component before sintering, which is the final shape of this component after EPD. The initial shape can be determined by the inverse modeling of sintering. This requires the usage of sintering modeling tools.

Shape distortion and change during sintering is crucial to the properties of the final products. The porous green samples undergo shrinkage during sintering. However, due to the non-uniformity of a green specimen, anisotropy of shrinkage and shape distortions occur. It is very important to quantify the shape changes during sintering to ensure its net-shape capabilities. Fortunately, the continuum modeling of sintering provides a powerful tool to solve this problem.

In one embodiment, the processes of the invention comprise use of a constitutive model of sintering of functionally graded composites. In one embodiment, the processes of the invention comprise use of a FORTRAN™ code based on the developed constitutive model of sintering; in another aspect, this can be incorporated as a user-subroutine in a commercial finite-element program, e.g., ABAQUS™. The sintering of a functionally graded FGM disk was modeled and it was compared with the study results, as discussed above. The inverse problem was solved to optimize the initial specimen's shape (after EPD and before sintering). The optimized initial shape should render the near-net disk shape after sintering.

Formulation of Constitutive Equations Based on Continuum Modeling Theory of Sintering Continuum Modeling of Sintering Macroscopic deformation of porous and powder materials has been considered by various researchers during the last two decades. Among the successful approaches in this area, continuum theories of sintering should be mentioned. Recently, along with the refinement and the creation of new constitutive models, the research focus was on the solution of certain boundary-value problems associated with industrial treatment of porous and powder products.

For hot deformation processes, as experimental practice indicates, the dominant mechanism is the power-law creep which is usually described by Ashby relationship:

$$\frac{\sigma}{\sigma_0} = A\left(\frac{\dot{\varepsilon}}{\dot{\varepsilon}_0}\right)^m$$

where $\sigma$ and $\dot{\varepsilon}$ are the stress and strain rate, respectively; A, $\sigma_0$, $\dot{\varepsilon}_0$, and m are material parameters.

The mechanical response of a porous body with power-law creep behavior is described by a Theological (constitutive) relation that inter-relates the components of a stress tensor $\sigma_{ij}$ and a strain rate tensor $\varepsilon_{ij}$:

$$\sigma_{ij} = \frac{\sigma(W)}{W}\left[\varphi\dot{\varepsilon}_{ij} + \left(\psi - \frac{1}{3}\varphi\right)\dot{e}\delta_{ij}\right] + P_L$$

where $\varphi$ and $\psi$ are the normalized shear and bulk viscosity moduli, which depend on porosity $\theta$ (for example, Skorohod model, see table, below), $\delta_{ij}$ is a Kronecker symbol; $\dot{e}\dot{e}$ is the first invariant of the strain rate tensor, i.e. sum of tensor diagonal components: $\dot{e}\dot{e}=\dot{\varepsilon}_{11}+\dot{\varepsilon}_{22}+\dot{\varepsilon}_{33}$. Physically, $\dot{e}\dot{e}$ represents the local volume change rate of a porous body.

Normalized shear and bulk moduli for four different models

| Model / Parameter | $\varphi$ | $\psi$ |
|---|---|---|
| Skorohod | $(1-\theta)^2$ | $\frac{2}{3}\frac{(1-\theta)^3}{\theta}$ |
| Castaneda-Duva-Crow | $\frac{(1-\theta)^{\frac{2}{1+m}}}{1+\frac{2}{3}\theta}$ | $\frac{2}{3}\left(\frac{1-\theta^m}{m\theta^m}\right)^{\frac{2}{m+1}}$ |
| McMeeking-Sofronis | $\left(\frac{1-\theta}{1+\theta}\right)^{\frac{2}{1+m}}$ | $\frac{2}{3}\left(\frac{1-\theta^m}{m\theta^m}\right)^{\frac{2}{m+1}}$ |
| Cocks | $\frac{(1-\theta)^{\frac{2}{1+m}}}{1+\frac{2}{3}\theta}$ | $\frac{m+1}{3}\frac{(1+\theta)(1-\theta)^{\frac{2}{m+1}}}{\theta}$ |

The porosity $\theta$ is defined as $$\theta = 1 - \frac{\rho}{\rho_T},$$

where $\rho$ and $\rho_T$ are volumetric mass and theoretical density (volumetric mass of a fully-dense material), respectively.

The effective equivalent strain rate W is connected with the current porosity and with the invariants of the strain rate tensor:

$$W = \frac{1}{\sqrt{1-\theta}}\sqrt{\varphi\dot{\gamma}^2 + \psi\dot{e}^2}$$

where $\dot{\gamma}$ is the second invariant of the strain rate tensor deviator:

$$\dot{\gamma} = \left[\left(\dot{\varepsilon}_{ij} - \frac{1}{3}\dot{e}\delta_{ij}\right)\left(\dot{\varepsilon}_{ij} - \frac{1}{3}\dot{e}\delta_{ij}\right)\right]^{1/2}$$

Physically, $\dot{\gamma}$ represents the shape change rate of a porous body.

The evolution law of porosity is given by:

$$\dot{e} = \frac{\dot{\theta}}{1-\theta}$$

For linear viscous material, the relationship between stress and equivalent strain rate is the following:

$$\sigma(W) = 2\eta_0 W$$

In this case eqn Error! Reference source not found. is reduced to the following:

$$\sigma_{ij} = 2\eta_0\left[\varphi\dot{\varepsilon}_{ij} + \left(\psi - \frac{1}{3}\varphi\right)\dot{e}\delta_{ij}\right] + P_L$$

For free sintering, the external applied stress is zero, the equation is the following:

$$\dot{e} = -\frac{P_L}{2\eta_0\psi} \quad (0.1)$$

where $$\dot{e} = \frac{\dot{\theta}}{1-\theta}$$

$P_L$ is the sintering stress or Laplace stress, which can be represented as:

$$P_L = \frac{3\alpha}{r}(1-\theta)^2 \quad (0.2)$$

where $\alpha$ is the surface tension, and r is the particle radius. By substituting eqn. (0.1) and (0.2) into Error! Reference source not found, the following is obtained:

$$\dot{\theta} = \frac{-9\alpha}{4\eta_0 r}\theta \quad (0.3)$$

Eqn. (0.3) is an ODE with respect to porosity. Solving this equation, the kinetics can be modeled as follows:

$$\theta = \theta_0 \exp(-3\tau_s) \quad (0.4)$$

where $\theta_0$ is the initial porosity, and $\tau_s$ is a dimensionless parameter which is called "specific sintering time". It is expressed as:

$$\tau_s = \frac{3\alpha}{4\eta_0 r}(t-t_0) \quad (0.5)$$

Until recently, the constitutive equations of sintering, which are adopted in various FEM codes, were only suitable for monophase materials. In one aspect, a useful formulation, which can be used to model functionally graded materials, is based on Eqns (0.6) to (0.13).

Figure 25:
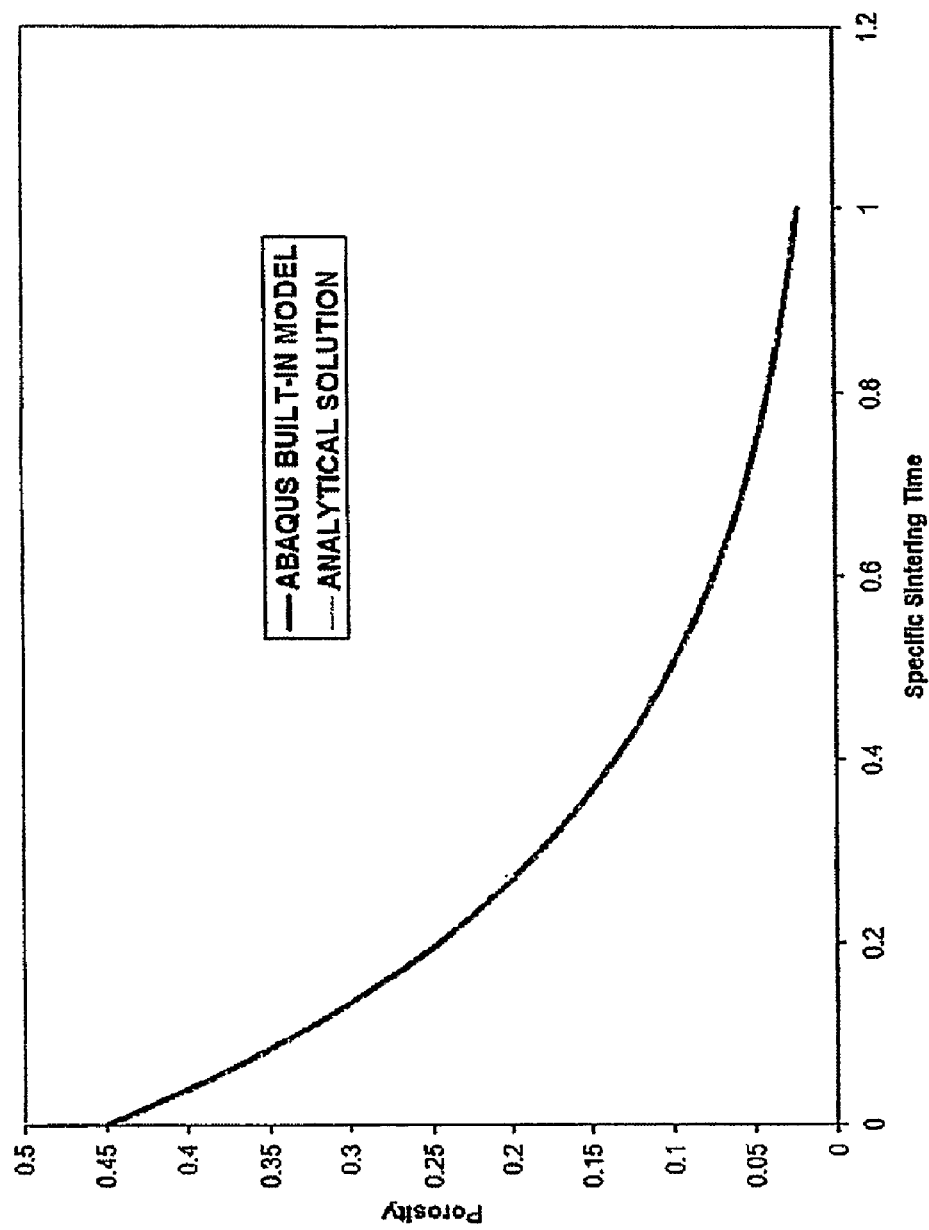
FIG. 25 illustrates a comparison plot of equations of sintering to model functionally graded materials, comparing benchmark "computer experiments": using CREEP subroutine in ABAQUS; and "computer experiments", or calculations of the porosity evolution during free sintering, as described in detail, below.

In order to ensure the correctness of the formulation, benchmark "computer experiments" were performed using CREEP subroutine in ABAQUS. The benchmark "computer experiments" are calculations of the porosity evolution during free sintering. The comparison is between the analytical solution and the solution calculated by the developed subroutine "CREEP". The analytical solution is provided by Eqn. (0.4). The comparisons are plotted in FIG. 25 (comparison of porosity evolution from the analytical solution and from the results computed by "CREEP" subroutine). The comparison indicates that the two solutions are identical.

Constitutive Formulation of Sintering of Composite Materials

In one aspect, the model describing sintering stress for composite developed by Maximenko and Olevsky is used; the sintering stress is given by:

$$P_L = \frac{\alpha\gamma(1-\theta)N_c}{4}\left\{\frac{\phi_s c_{ls}}{R_s(\phi_l + c_{ls}\phi_s)}\left[\phi_s + \frac{\left(1-\frac{\sqrt{3}}{2}\right)\phi_l(1+c_{ls})}{1+c_{ls}-\sqrt{1+2c_{ls}}}\right] + \frac{\phi_l c_{sl}}{R_l(\phi_s + c_{sl}\phi_l)}\left[\phi_l + \frac{\left(1-\frac{\sqrt{3}}{2}\right)\phi_s(1+c_{sl})}{1+c_{sl}-\sqrt{1+2c_{sl}}}\right]\right\} \quad (0.6)$$

where $\alpha$ is a constant (here $\alpha=10$), $\gamma$ is the specific surface energy Here $\gamma=1.75$ J/m$^2$), $\theta$ is porosity y, $N_c$ is the average coordination number for a packing of spheres of the same size (here is taken as 6), $\phi_s$ and $\phi_l$ are the volume concentrations of small and large particles, respectively, $R_s$ and $R_l$ are particle radius of small and large particles, respectively, $c_{ls}=R_l/R_s$, $c_{sl}=R_s/R_l$.

From eqn. (0.6) and eqn. (0.1), if surface energy $\gamma$, viscosity $\eta_0$ is known, the sintering process can be simulated. However, in practice, it is not always possible to obtain these parameters for a composite powder. If the properties of the elementary powders are known, then, according to the experimental results, the densification rate of mixture of alumina and zirconia can be approximated as:

$$\dot{\rho} = A\frac{\exp(-Q/R_g T)}{T}\frac{f(\rho)}{R^4} \quad (0.7)$$

where $\rho$ is the relative density, A is a constant, T is the temperature, $R_g$ is the gas constant, $f(\rho)$ is the function of density, which is taken as:

$$f(\rho) = \frac{1-\rho}{\rho} \quad (0.8)$$

Q is the activation energy, which is approximated by:

$$Q = \begin{matrix} 440+5200\phi_{ZrO_2} \\ 700, 0.05 \le \phi_{ZrO_2} \le 0.95 \\ 615+1700(1-\phi_{ZrO_2}), \phi_{ZrO_2} > 0.95 \end{matrix} \quad (0.9)$$

kJ/mol

The activation energy given in (described by) J. Wang, R. Raj, Activation energy for the sintering of two-phase alumina/zirconia ceramics, J. Am. Ceram. Soc., 74 (1991) 1959 ("Raj"), was measured by experiments. In Raj's experiments, the particle size of Al$_2$O$_3$ were 0.27, 0.45, and 0.48 µm; the particle size of ZrO$_2$ were 0.025 µm with an agglomeration size of 0.3 µm. The particle size used in this research was different from that of Raj. (Al$_2$O$_3$ 5 µm, ZrO$_2$ 0.5 µm respectively in this research). Therefore, it is necessary to measure the activation energy by dilatometry experiments, which will be addressed in section 5.4.1.

The particle size R can be represented as:

$$R = \frac{R_l}{\chi(c_{sl}, \phi_s)} \quad (0.10)$$

$$\text{where } \chi = \frac{c_{sl}^3(1-\phi_s)^2 + \phi_s(1-\phi_s)(1+c_{sl})c_{sl} + \phi_s^3}{c_{sl}^3(1-\phi_s)^2 + 0.5\phi_s(1-\phi_s)(1+c_{sl})^2 c_{sl} + \phi_s^2 c_{sl}} \quad (0.11)$$

Substituting eqn. (0.8), (0.9), (0.10) and (0.11) into (0.7), the densification rate can be obtained. The constant A in the equation was obtained by regression of data from Raj. Here, A=1.0 e−4.

The bulk viscosity $K_v$ can be obtained as:

$$K_v = -\frac{P_L\rho}{\dot{\rho}} \quad (0.12)$$

The shear viscosity can be obtained from the bulk viscosity from:

$$S = 1.5f(\rho)K_v = \frac{3(1-\rho)}{2\rho} \quad (0.13)$$

ABAQUS Implementations

In one aspect, ABAQUS™, the user subroutine CREEP™ is employed to model the sintering process. The CREEP™ subroutine is a FORTRAN™ file, which has interface with ABAQUS™. In the CREEP™ file, the user can define various material constitutive behaviors and calculate the swelling (or shrinkage) using certain time scale. It is suitable for the calculation of viscous flow of materials. The geometry is defined by ABAQUS™ CAE module.

In the CREEP™ file, two variables, which are called deswa and decra(1) are required to compute. Parameter deswa is the volume strain incremental with respect to time, while decra (1) is the shear strain incremental with respect to time:

$$\text{deswa}=\Delta e; \text{decra}(1)=\Delta\gamma \quad (0.14)$$

Through the CREEP.FOR file, they are defined as:

$$\Delta\gamma = \frac{\tilde{q}}{S}\Delta t; \Delta e = \frac{P+P_L}{K_v}\Delta t \quad (0.15)$$

where q̃ is Mise's stress, and P is external stress (in free sintering, P=0). The shear and volume strain increments are calculated in the subroutine "CREEP" in ABAQUS. From the two calculated strain increments, the porosity evolution can be updated from Eqn. (0.1).

Modeling Results and Comparison with Experimental Results

The sintering of an FGM disk, which is made of $Al_2O_3$ and $ZrO_2$, was simulated. Due to symmetry, only a quarter of the specimen was calculated. Accordingly, there are two symmetry boundary conditions along two cutting planes. The center point is fixed for all the 6 degrees of freedom. The disk is partitioned into four layers; each layer was assigned a material property. It was assumed that the porosity remains the same at each layer, only the composition changes along the thickness direction. From eqn. (0.10), the equivalent particle size can be determined. In the simulation, the alumina and zirconia particle sizes were taken as 5.0 and 0.5 micron respectively.

From the ABAQUS simulation results, it is clear that the upper layer, which contains more zirconia, densifies faster than the bottom layer. The initial porosity of the specimen was set to be θ=0.35. In the end of sintering, the top layer has a porosity of 0.09, while the bottom layer has a porosity of 0.5. This is because the top layer has more zirconia powder, whose particle size is ten times smaller than that of alumina powder. Smaller particles cause higher densification rates.

There is a shape change during sintering. The FEM simulation indicates that the disk warps towards the top surface, which contains more zirconia particles. The reason is that the top layer generates larger compressive stress than the bottom layer. The non-uniform stress distribution causes the warpage. The results also indicate that the disk undergoes shrinkage during sintering.

Figure 26:
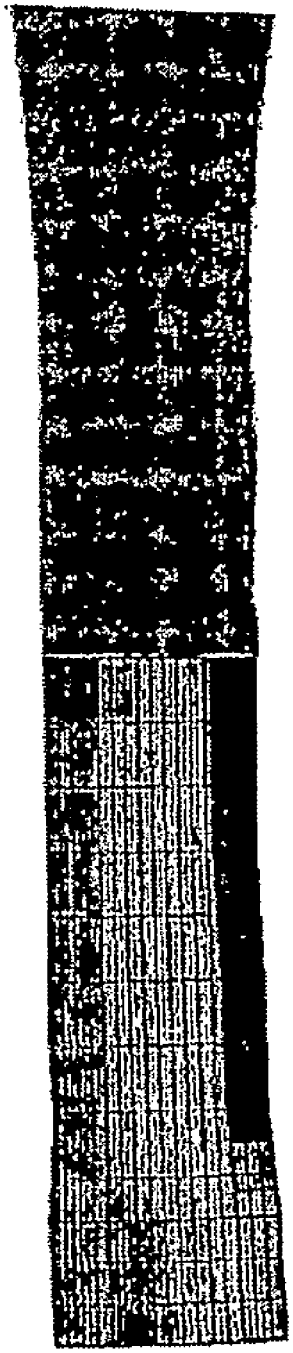
FIG. 26 illustrates the calculated shape distortion and relative density distribution of exemplary sintered $Al_2O_3/ZrO_2$ FGM of the invention, as described in detail, below.

The comparison of the shape change predicted by the finite element calculations and the experimental results of a sintered FGM disks represented in FIG. 26 (the calculated shape distortion and relative density distribution of sintered $Al_2O_3$/$ZrO_2$ FGM). In the finite element calculation, the FGM disk is assumed to have various porosity along the radial direction, changing from 0.50 to 0.35 from the center to the perimeter of the FGM disk. This assumption is based on the following fact: during drying of the green sample in air, the specimen shrunk; because the perimeter boundary of the disk was adherent to the TEFLON™ fixture and therefore constrained, the center has larger porosity.

Theoretical Solution of Inverse Problem of Sintering

In alternative embodiments for practicing the processes of this invention, two approaches can be used to solve inverse problems of sintering. The first is to change the sign of sintering stress, which allows the specimen to swell after "inverse sintering". However, this method has some limitations. For example, in some commercial software, if the stresses are tensile stresses for porous bodies, the porosity of the specimen increases during "inverse sintering". However, the excessive increase of porosity leads to the divergence problem in the finite element calculation using ABAQUS.

Figure 27:
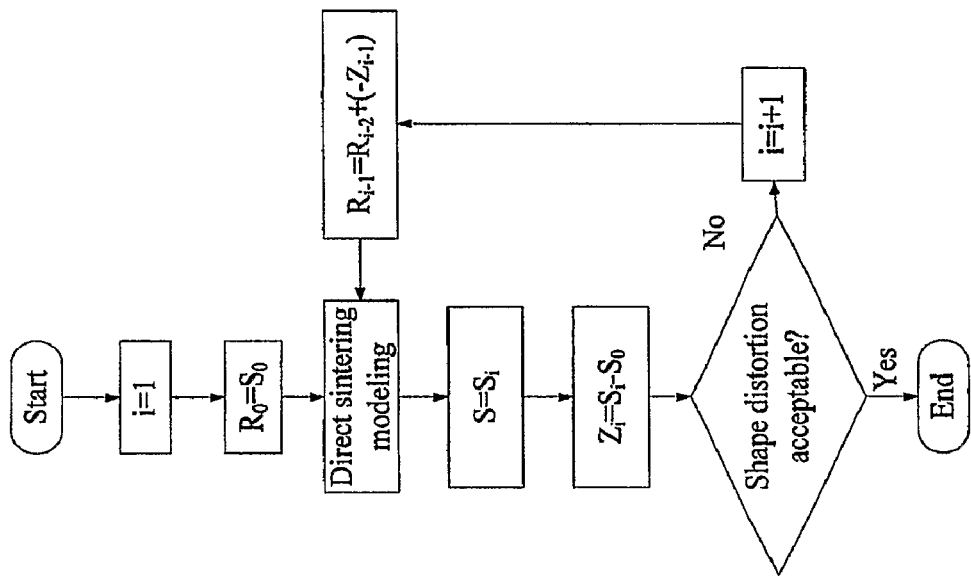
FIG. 27 illustrates an exemplary iteration process that can be used in practicing the methods of this invention to solve the inverse problem of sintering, as described in detail, below.

Another approach is to inverse the shape instead of inversing the sintering stresses. This can be realized by an iteration process described in FIG. 27 (iteration process to solve the inverse problem of sintering). For each iteration, the calculated shape was compared with the initial shape, that is, the displacement of every node was computed. A qualitative parameter—the shape distortion factor was used to define the tolerance of the convergence:

$$\Delta = \left[1 - \left(\frac{h_0}{\hat{h}} \cdot \frac{\hat{R}}{R_0}\right)^{sgn(\hat{h}/h_0 - \hat{R}/R_0)} \exp\left(\frac{\Delta_R}{\hat{R}} + \frac{\Delta_h}{\hat{h}}\right)\right] \times 100\% \quad (0.16)$$

where $h_0$ and $R_0$ are the initial height and radius respectively, $\hat{h}$ and $\hat{R}$ are the average height and radius of the distorted specimen:

$$\hat{R} = \frac{1}{n}\sum_{i=1}^{n} R_i, \quad \hat{h} = \frac{1}{k}\sum_{i=1}^{k} h_i \quad (0.17)$$

$\Delta_h$ and $\Delta_R$ are the height and radius standard deviation of the distorted specimen:

$$\Delta_R = \sqrt{\frac{1}{n-1}\sum_{i=1}^{n}(R_i - \hat{R})^2}, \quad (0.18)$$

$$\Delta_h = \sqrt{\frac{1}{k-1}\sum_{i=1}^{k}(h_i - \hat{h})^2}$$

After each iteration, the shape distortion was computed to determine the convergence. In this calculation, it was found that 3 iterations were sufficient to provide the satisfactory results.

An optimized initial shape after the $3^{rd}$ iteration was pictures; then, "modeling experiments" were performed starting from this optimized initial shape. The sintered FGM disk was imaged, and it was clear that the final shape is almost identical to the desired disk-like shape. The shape distortion factor is Δ=0.29% after sintering. It was found that at the first iteration, the shape converges very quickly to the final shape. During the second and third iterations, the improvements were not significant.

Solutions for the Inverse Sintering Problem

Dilatometry Data of Sintering

In the FEM modeling section, the activation energy in eqn. (0.9) has to be determined experimentally. In this section, dilatometry experiments have been conducted to obtain the activation energy.

The $Al_2O_3$/$ZrO_2$ composite powders with different concentrations have been sintered for dilatometry experiments. The powders were first baked in a vacuum furnace (Precision Inc.) at 200° C. for 24 hours to get rid of moisture. After baking, the powders with different concentrations were mixed in a sealed bottle using a rotary blender machine. The compositions of the powder mixtures are listed in this table:

Composition of $Al_2O_3$/$ZrO_2$ Powder Mixtures for Dilatometry

| Specimen Number | Volume concentration of $ZrO_2$ (%) | Volume concentration of $Al_2O_3$ (%) | Weight of specimen (g) |
|---|---|---|---|
| 10-25 | 50 | 50 | 4.317 |
| 10-31 | 25 | 75 | 4.230 |

| Specimen Number | Volume concentration of $ZrO_2$ (%) | Volume concentration of $Al_2O_3$ (%) | Weight of specimen (g) |
|---|---|---|---|
| 11-02 | 75 | 25 | 4.720 |
| 11-07 | 90 | 10 | 4.424 |
| 11-08 | 10 | 90 | 4.32 |

Figure 28:
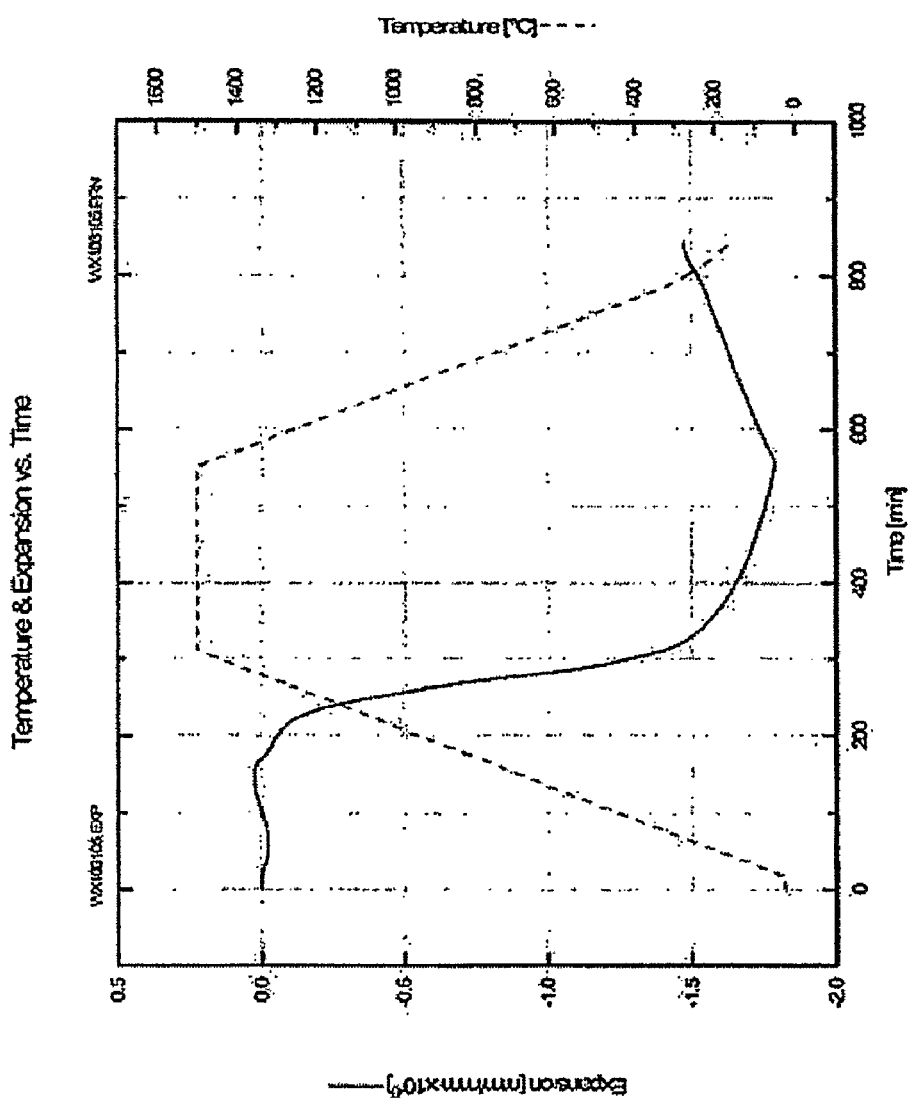
FIG. 28 illustrates a shrinkage and temperature curve for an exemplary composition of the invention, a specimen with 50% vol. concentration of $Al_2O_3$, as described in detail, below.

After mixing of powders, they were cold pressed in a steel rigid die which has a diameter of 0.5 inch. The pressing of powder was achieved by a hydraulic press shown in Error! Reference source not found. The dilatometry was conducted using a Theta dilatometer with a mechanical push rod and micrometer to measure the shrinkage of specimen. The heating rate was 10° C./min. The specimens were sintered at 1500° C. for 4 hours. The shrinkage data was converted by LVDT to be analyzed by a computer program. The shrinkage curve was recorded for each specimen and the corresponding temperature. FIG. 28 shows one shrinkage and temperature curve for the specimen with 50% vol. concentration of $Al_2O_3$ (Shrinkage and temperature curve of 50% vol. concentration $Al_2O_3$ specimen).

Figure 29:
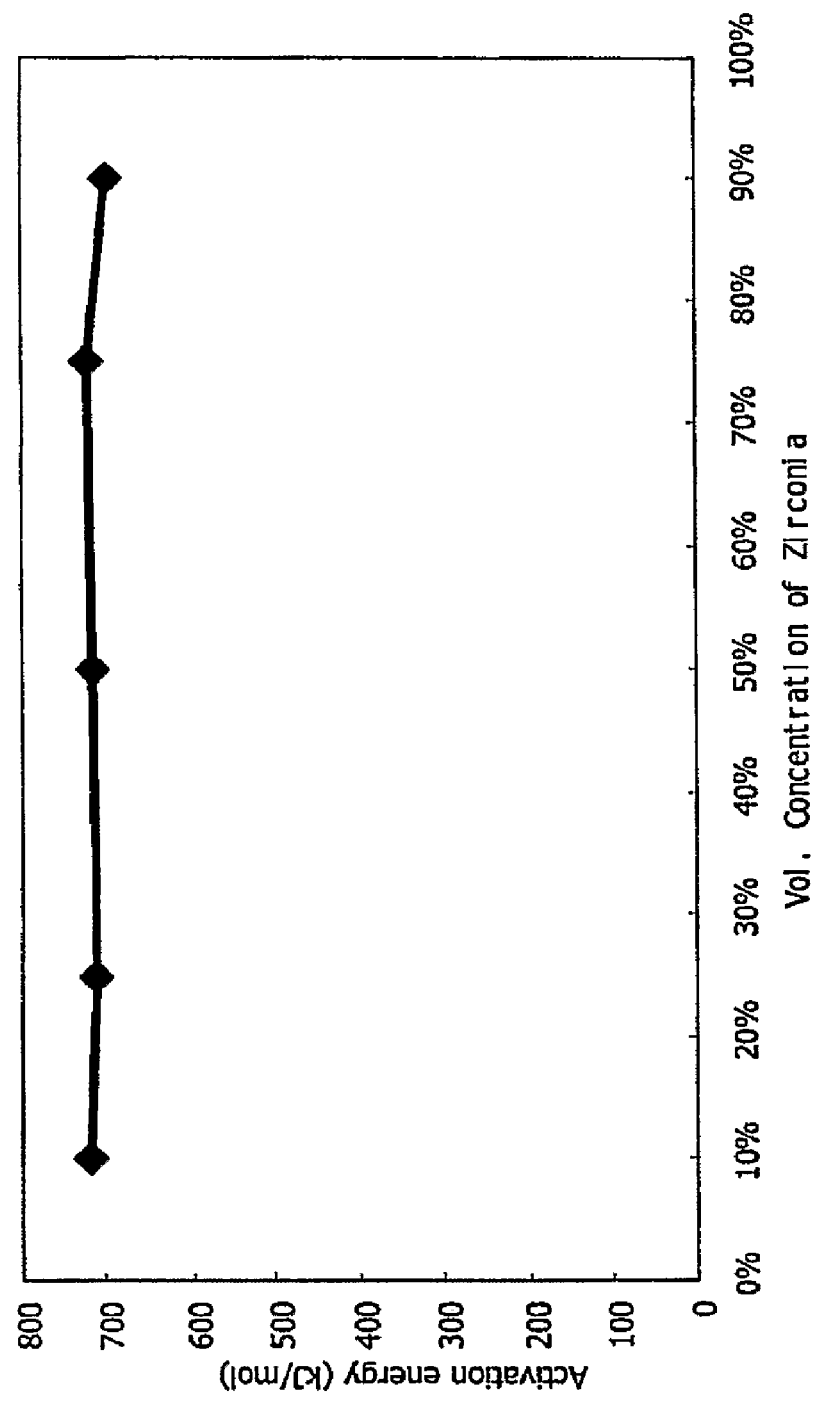
FIG. 29 illustrates activation energy vs. volume concentration of $ZrO_2$, which can be applied to practicing the methods of this invention, as described in detail, below.

After sintering, the final length of each specimen was measure using a digital caliper. The porosity was measured using Archimedes method. According to Raj (supra), the relative density evolution is described following eqn. (0.7). All the parameters are known except A and Q. Therefore, by data regression, activation energy Q can be obtained. The experimental results were summarized in the table, below, and plotted in FIG. 29 (activation energy vs. volume concentration of $ZrO_2$). It can be seen from the results that the activation energy is very close to that measured by Raj (supra) (see eqn. (0.9)). It is this value of Q (700 kJ/mol) that has been used in the calculations described above.

Table Error! No text of specified style in document. 1 Activation Q measured by dilatometry

| Specimen Number | Volume concentration of $ZrO_2$ (%) | Volume concentration of $Al_2O_3$ (%) | Activation Energy (kJ/mol) |
|---|---|---|---|
| 10-25 | 50 | 50 | 716 |
| 10-31 | 25 | 75 | 711 |
| 11-02 | 75 | 25 | 720 |
| 11-07 | 90 | 10 | 699 |
| 11-08 | 10 | 90 | 718 |

Fabrication of the Optimized Initial Shape by EPD

The FEM continuum modeling results discussed above indicate what the initial shape should be in order to produce the final desired shape after sintering. In this section, the problem of the fabrication by EPD of such optimized initial green specimen is addressed. The experimental part together with the theoretical part provides a novel systematic solution to the near net shaping problem of FGM sintering.

Figure 30A:
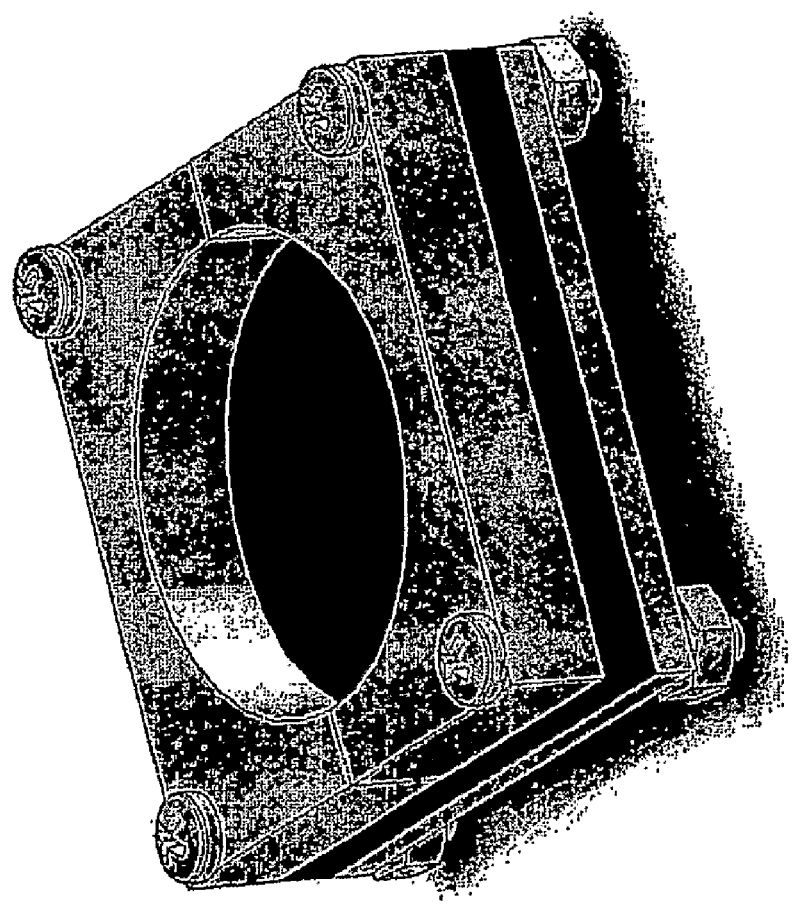
FIG. 30(A) illustrates an exemplary electrode assembly, a CAD model, for a device of this invention.
Figure 30B:
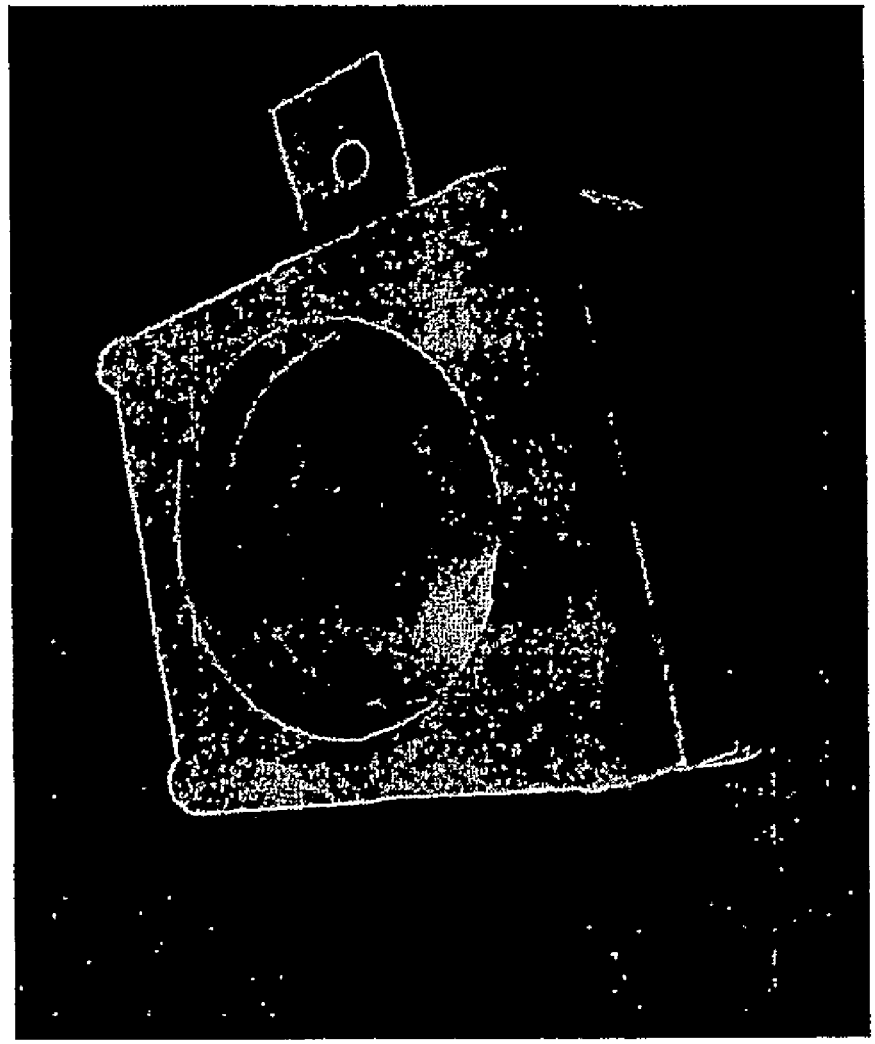
FIG. 30(B) illustrates the actual picture of an electrode assembly for device of this invention.
Figure 30C:
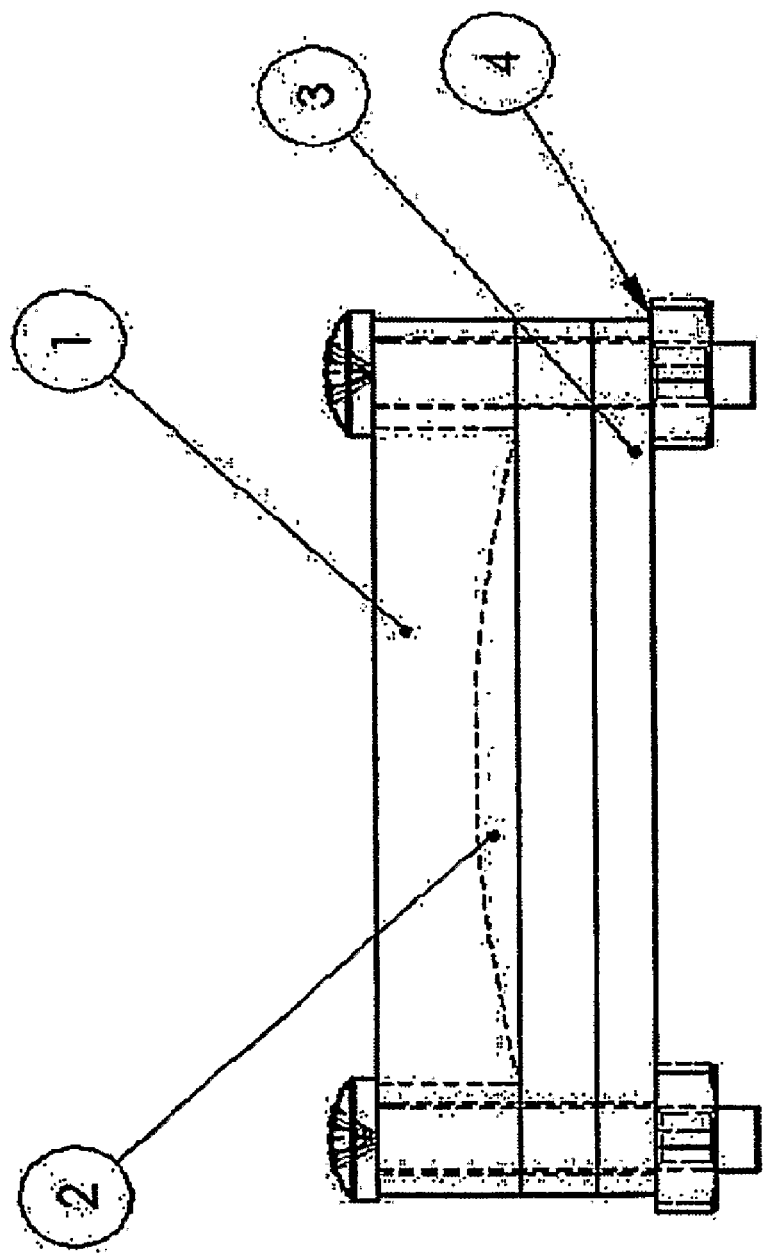
FIG. 30(C) shows the side view of the electrode assembly of a device of this invention (side view) (1) Front Teflon cover (2) Stainless steel electrode (3) Rear Teflon cover (4) Teflon screw and nut)
Figure 30D:
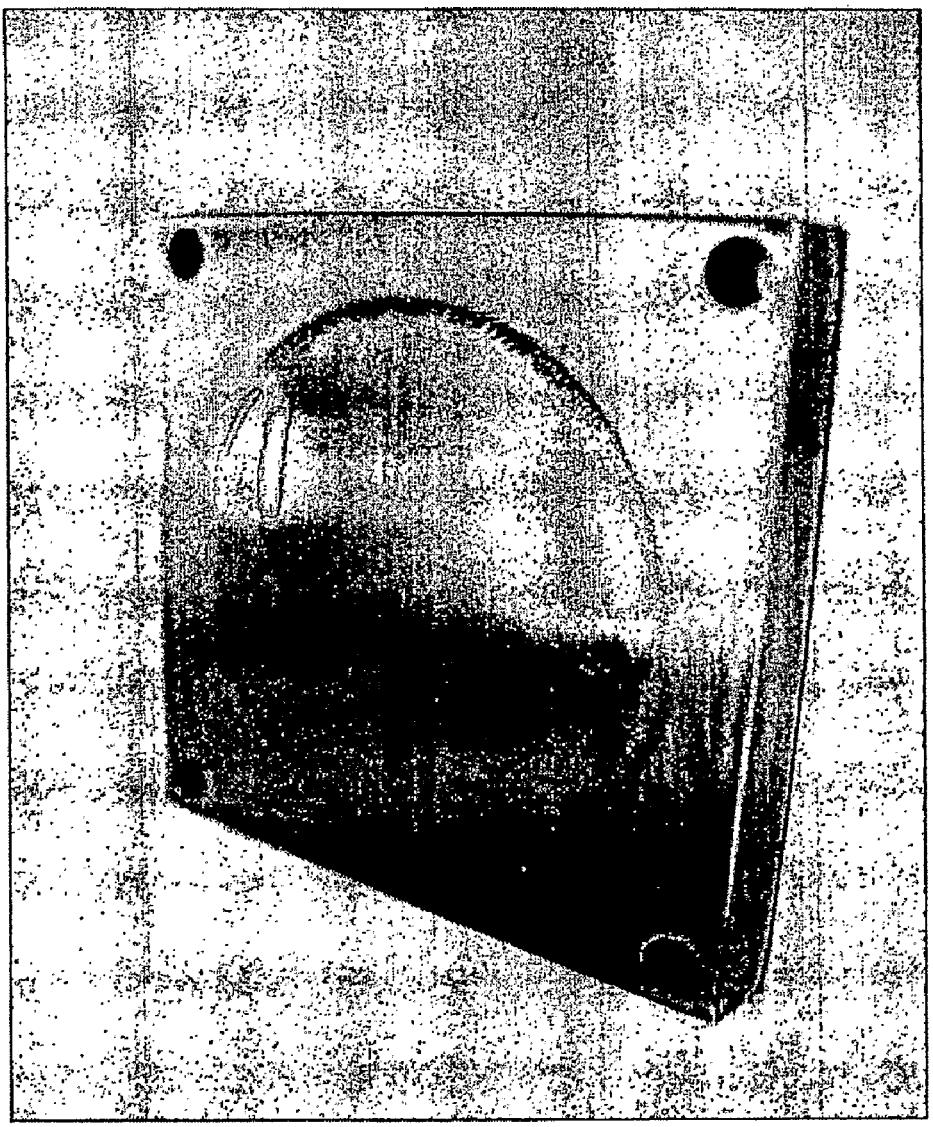
FIG. 30(D) shows an exemplary manufactured electrode of this invention with the convex "dome" from CAM, as described in detail, below.

As discussed above, it was shown that in order to obtain a flat disk $Al_2O_3/ZrO_2$ FGM after sintering, a "bended" initial green shape has to be produced. The shape of deposit in EPD will follow the shape of the deposition electrode. Realizing this fact, an electrode, which has the same configuration as the one predicted by inverse modeling results, has been designed using CAD/CAM. The electrode was made from stainless steel. The assembly of the electrode is shown in FIG. 30(A) (Electrode assembly CAD model); FIG. 30(B) shows the actual picture of the assembly (Electrode assembly—actual part), FIG. 30(C) shows the side view of the assembly (Electrode assembly (side view) (1) Front Teflon cover (2) Stainless steel electrode (3) Rear Teflon cover (4) Teflon screw and nut); and FIG. 30(D) (The stainless steel electrode for deposition of the FGM with "inversed" initial shape) shows the actual manufactured electrode of this invention with the convex "dome" from CAM. The bottom curve was approximated by an arc using 3 points on the curve as interpolation points. Then the interpolated arc shape was input into 3-D CAD modeling tools (SOLIDWORKS™). After the 3-D model was built, it was transferred into CAM to convert the CAD to actual component.

In order to deposit materials only in the desired area, the electrode was wrapped by plastic film except at the deposition area. The four screws FIG. 30(A) were made of TEFLON™, which prevented them from attracting particles and influencing the electric field in the suspension.

Electrode Assembly for EPD of Optimized Initial Shape

The materials used in these exemplary electrodes of the invention, and in these studies, were $Al_2O_3$ and $ZrO_2$. The deposition scheme was summarized:

Parameters to Deposit FGM with Inverse-Optimized Initial Shape

| Number | Starting suspension | Adding suspension | Time (s) | Voltage (V) |
|---|---|---|---|---|
| INV_FGM01 | 120 ml solution + 24 g $Al_2O_3$ | 30 ml solution + 12 g $ZrO_2$ | 180 | 200 |
| INV_FGM02 | Residual suspension from FGM 01 | 20 ml solution + 10 g $ZrO_2$ | 180 | 200 |
| INV_FGM03 | Residual suspension from FGM02 | 20 ml solution + 10 g $ZrO_2$ | 180 | 200 |

Comparison of the Solution of Inverse Problem of Sintering with Experimental Results After drying, the specimen was removed from the electrode and dried in air for 24 hours. The deposited shape was a "bended" shape which was the initial shape predicted by the inverse FEM modeling. This specimen was then sintered in a box furnace (Thermolyne 46200™) in air at 1500° C. for 4 hours.

After sintering, the specimens were cross-sectioned, and the green specimen (initial shape obtained by EPD) and the sintered specimen were compared. The comparison indicates that the "bended" initial shape becomes more "flat" after sintering, as predicted by FEM continuum modeling.

The second comparison was the sintered "inverse" specimen with the FEM prediction results. The comparison indicates that the sintering distortion of the "inverse" designed initial shape agrees with that of the FEM modeling results very well. The sintered shape with the stainless steel electrode was also compared.

The deviation of the modeling results from the experimental data indicates the necessity of the introduction of other parameters into the model. For example, the porosity distribution can influence the shrinkage rate significantly. Also grain growth and other dynamic effects are not taken into account in the model. Other parameters such as particle agglomeration may also influence the results.

It should also be noted that during drying after EPD, the specimen also undergoes shrinkages because of the evaporation of water. Therefore, the specimen was "pre-distorted" before sintering. This phenomenon also exists in all drying-related powder processing procedures, such as slip casting.

The distortion caused by drying may also contribute to the final shape change after sintering.

SUMMARY

The characteristics of EPD suspension were studied. The acetone-based suspension was able to produce $Al_2O_3/ZrO_2$ functionally graded materials successfully. From the study of the suspension viscosity, 8% vol. n-butylamine was added into the suspension to enhance particle charging. Particle agglomeration problems were solved by the ultrasonic vibration of the mixed suspension.

The deposition kinetics of $Al_2O_3$ and $ZrO_2$ was experimentally determined. The kinetics of the deposition of both thin films and 3-D shape components were studied. The obtained kinetics shows good agreement with Hamaker's law.

The green $Al_2O_3/ZrO_2$ 3-D FGM was successfully synthesized by EPD. Disks and cylinders were deposited using a self-designed device. It was found that large particles help avoiding cracking problems during drying. The fabricated specimens were sintered and the resultant SEM micrographs show the desired graded structures.

Based on the continuum theory, a constitutive model for the sintering of FGMs was formulated. A user subroutine, which implements the developed constitutive formulations for sintering of composite powders, was developed and linked to the commercial finite-element software ABAQUS.

Both porosity and shape evolution during sintering were simulated using the above-mentioned finite element code. The sintering of a disk-shape FGM made of $Al_2O_3/ZrO_2$ was simulated. The calculation results showed that the FGM disk has undergone warping because of the difference between the sintering kinetics of $Al_2O_3$ and $ZrO_2$.

The "inverse" methodology was successfully employed to determine the initial shape rendering the desired final shape after sintering. The initial shape of FGM made of $Al_2O_3/ZrO_2$ enabling the desired final disk-shape was determined.

The shape of the deposition electrode has been designed and fabricated using CAD/CAM according to the results of "inverse" modeling results. Using the electrode, the green $Al_2O_3/ZrO_2$ FGM specimen with designed shape has been successfully fabricated by EPD. After sintering, the final shape shows good agreement with the prediction of FEM modeling. Therefore, through the proposed theoretical-experimental methodology, near net shaping of FGM sintering can be achieved.

As an approach to obtain the thermal interface materials for electronic packaging, a sequential deposition process was designed. This process of the invention comprises electrophoretic deposition following electroplating. A copper sulfate plating bath was used for electroplating. The bright current density for electroplating was determined to be 20~60 $mA/cm^2$ by Hull cell studies. Through this process, an $Al_2O_3$/Cu composite was successfully fabricated.

By using unidirectional freezing and freeze-drying, the ceramic preform with aligned porosity has been obtained. The ceramic preform was further sintered and infiltrated with brushing gold. Gold wires have been found after annealing of the brushing gold in the aligned porous preform. The diameters of gold wires range from several hundred nanometers to several microns. The gold wires can be either straight or bended.

The electrophoretic deposition of zeolite 3A and 5A particles was successfully conducted using acetone and n-butylamine. There was no crack found after drying of the green deposit. By changing the composition of the suspension, zeolite FGM of zeolite type 3A and type 5A was successfully synthesized. The characterization by SEM indicated that the particles are uniformly deposited. The analysis by EDX indicated the graded structure of the deposited zeolite materials.

In alternative embodiments, this invention provides processes for the net shaping of FGM by addressing both the theoretical modeling and experimental implementation. The inverse modeling to predict the initial shape of FGM was successfully carried out. The predicted optimized FPM green shape was obtained by EPD. The results demonstrated that the developed framework of this invention could resolve the near net shaping challenge of FGM sintering. The comparison of modeling and experimental results showed good agreement.

In alternative embodiments, this invention provides processes for using EPD to fabricate other novel materials, including zeolite FGM and the ceramic-metal composites using sequential EPD-electroplating.

In alternative embodiments, this invention provides processes using freeze-drying of ceramic aligned porous structure. These processes can comprise infiltration of the second phase material, such as gold.

In alternative embodiments, this invention provides processes for particle manipulation and assembly to achieve "tailored" materials by controlling both the composition and the microstructure of the material.

As discussed above, this invention provides an optimization technique which enables the determination of the initial shape of the green specimen, rendering the required final shape after sintering. This aspect of the invention can also comprise the solution of the inverse sintering problem based on the detailed analysis of the evolution of mesoscopically inhomogeneous material structures during sintering. The prediction of the initial shape and the structure of a green body have been conducted through an iteration procedure of the invention, which is based on the idea of the "backward movie".

In alternative embodiments, this invention provides processes for near net shaping using the methodologies described herein.

The studies described herein demonstrated that this invention provides processes comprising EPD as a versatile technique which can be applied in many potential applications. These applications include advanced components for solar cells, solid-oxide fuel cells, catalytic adsorbers, materials for thermal management, etc.

The following examples are offered to illustrate, but not to limit the claimed invention.

EXAMPLES

Example 1

Development of Electrophoretic Deposition (EPD) Processes of the Invention

In one aspect, in order to fabricate FGMs by EPD followed by sintering, the initial shape has to be optimized prior to sintering. In this aspect, the formulations to simulate sintering of an FGM were developed based on the continuum theory of sintering. A finite element sintering-modeling subroutine was been created and linked to the commercial finite element package ABAQUS™ (Fremont, Calif.). The shape changes of FGM disks during sintering were simulated. In order to obtain the desired final shape after sintering, an inverse modeling methodology was developed to optimize the initial shape.

In one aspect, in order to fabricate the optimized initial shape of a green FGM specimen determined by the inverse continuum modeling of sintering, EPD of a number of FGM was investigated. The FGM green specimens made of $Al_2O_3$ and $ZrO_2$ with the initial shape predicted by the inverse modeling, were deposited using self-designed equipments. The acetone-based suspension with n-butylamine as a particle-charging additive was used. The comparison of the shape between the sintered and the green FGM indicated that the developed experimental-theoretical methodology provided a reliable solution for near net shaping of complex 3-D FGM components. Other applications of EPD, such as in electronic packaging materials and zeolites, were also investigated.

In one aspect, in order to fabricate functionally graded materials based on aligned porous structures, unidirectional freezing followed by freeze-drying and sintering has been investigated. The aligned porous preforms were sintered and then impregnated by brushing gold. After annealing at 600° C., the gold wires which have the diameters ranging from several hundreds of nanometers to several micrometers have been found in the ceramic performs.

Example II

Exemplary Processes of the Invention

A FGM disk made from Zeolite 3A (0.6 $K_2O$: 0.40 $Na_2O$: 1 $Al_2O_3$: 2.0±0.1$SiO_2$:$xH_2O$) and Zeolite 5A (0.80 CaO: 0.20 $Na_2O$: 1 $Al_2O_3$: 2.0±0.1 $SiO_2$:$xH_2O$) powders were deposited. The powders were mixed with DI water in a planetary ball mill for 2 hours to make the suspension homogeneous. After that, the suspension was further dispersed in an ultrasonic cleaner. The particle loading in the slurry were 5~50% vol. The particle size was 1 to 50 micron.

The DC voltage of 10~100V was used in the EPD step. A magnetic stirrer was used to stir the suspension during EPD. The PH of the chamber containing DI water was adjusted to 10 by adding TMAH solution. The plaster mold defining the disk shape was fabricated by slip casting of plaster of Paris. Two stainless steel electrodes served as electrodes. Two suspensions of zeolite type 3A and 5A were prepared as described above. In order to obtain FGM, zeolite type 5A suspension was added into the initial zeolite 3A suspension continuously during EPD process by a peristaltic pump. The total deposition time was 5 minutes. After deposition, the deposits have been dried at room temperature for 24 hours in air.

Example III

Exemplary Processes of the Invention

A FGM disk with thickness of 5 mm was deposited. The powders used in this example are: $Al_2O_3$ (0.5 μm, A16-SG from Alcoa, USA), and $ZrO_2$ (0.5 μm, TZ3YS from Tosoh, Japan). The pH of the DI water chamber was adjusted to 9.5-10 by adding TMAH. The slurry was mixture of $Al_2O_3$ and $ZrO_2$. Both concentrations are 50-100 g/l. The slurry mixture was ball milled for 2 hours and further ultrasonicated for 20 minutes to make it homogeneous. Binders and dispersant are Duramax B-1000 and Duramax 3005, respectively. Both are from Rohm and Haas (Philadelphia, USA).

The plaster mold was fabricated by regular slip casting process. The cavity was designed to be the disk shape. Except the cavity, other areas of the mold were covered by glue.

After pouring the slurry and ionic solution (DI water plus TMAH) to the slurry chamber and ionic solution chamber respectively, a DC voltage from 25-200 V was applied. As the deposition continues, the $ZrO_2$ slurry with concentration of 50-100 g/l was pumped into the slurry chamber. The process finished until the disk-shape cavity of the plaster of Paris was filled completely.

After deposition, the disk was dried together with the plaster mold in air.

Commercial binders and dispersants used in slip casting can be applied in this invention. They include but not limited to: Duramax series (from Rohm and Haas), such as D-3005, B-1000, HA-12, and compatibles; Zschimmer and Schwatz Gmbh series: Dolapix CE64, A88, AC-95, Glydol N-2002, and KB-2149.

While the invention is susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

Figure 2:
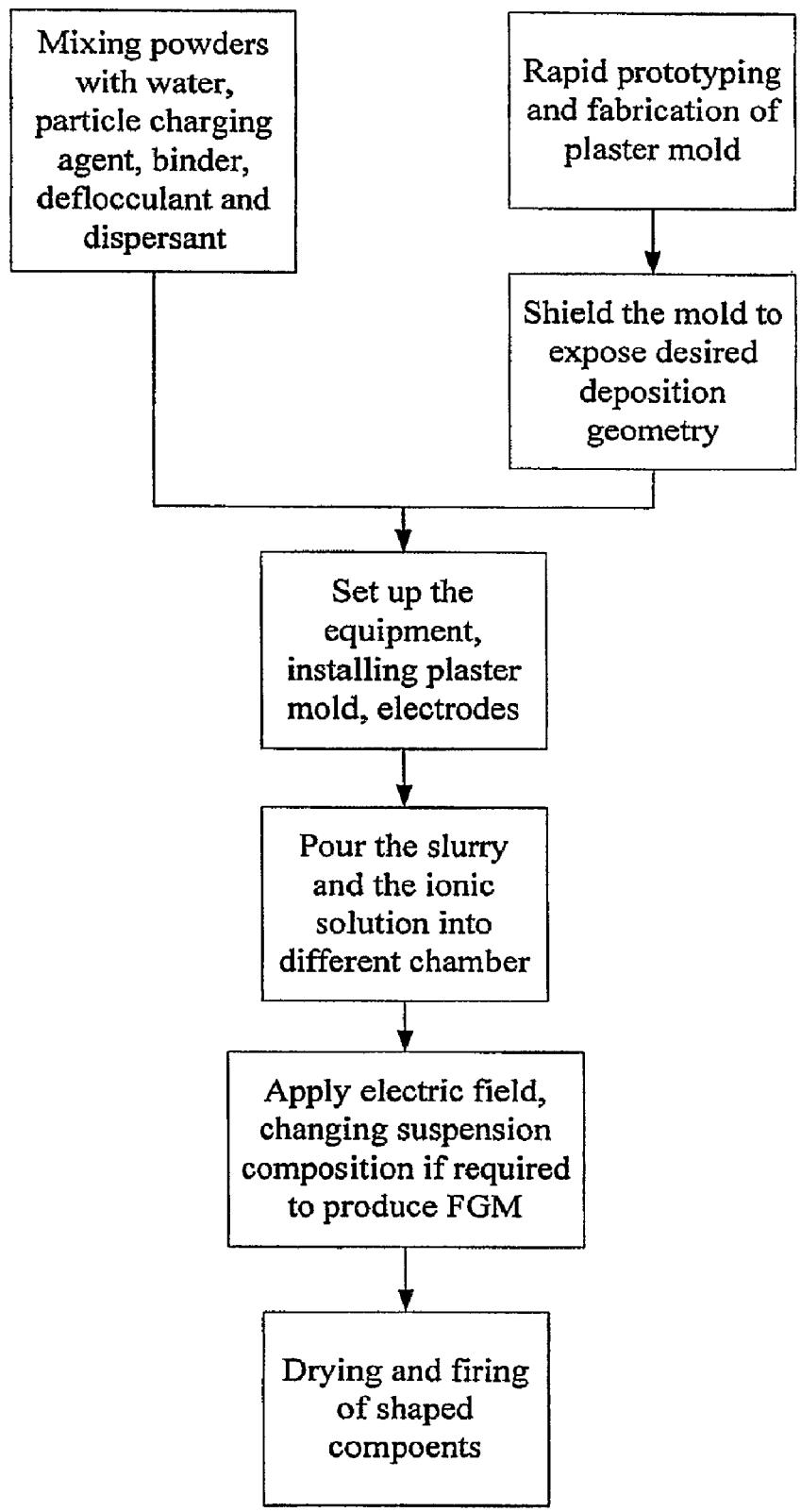
FIG. 2 illustrates an exemplary procedure of the invention to produce complex FGM geometries.

What is claimed is:

1. A hybrid slip casting—Electrophoretic Deposition (EPD) process comprising a process as set forth in FIG. 2,
    wherein the process is practiced in a product of manufacture for hybrid slip casting—Electrophoretic Deposition (EPD) comprising a system as set forth in FIG. 1,
    wherein the system comprises a deposition cell comprising a deposition electrode and a counter electrode, and a deposition bath in the deposition cell, and a porous mold introduced into the deposition bath between the deposition and the counter electrodes,
    and optionally the a porous mold is a porous plaster mold.

2. A product of manufacture for hybrid slip casting—Electrophoretic Deposition (EPD) comprising a system as set forth in FIG. 1,
    wherein the system comprises a deposition cell comprising a deposition electrode and a counter electrode, and a deposition bath well in the deposition cell, and a porous mold introduced into the deposition bath well between the deposition and the counter electrodes to produce two wells,
    and optionally the a porous mold is a porous plaster or a porous gypsum mold.

3. A process for hybrid slip casting—Electrophoretic Deposition (EPD) comprising the steps of:
    (a) providing a powder comprising a metal, ceramic, polymer or an equivalent compound or any combination thereof, and
    providing an ionic solution,
    and providing a product of manufacture for hybrid slip casting-Electrophoretic Deposition (EPD) comprising a system as set forth in claim 2;
    (b) mixing the powder with water, a particle charging agent, a binder, a de-flocculant and a dispersant to make a slurry,
    and placing the ionic solution in one or both of the deposition bath wells;
    (c) pouring the slurry into the counter electrode well of the deposition cell of the product of manufacture such that when applying an internal or external electric field, the powder or powders of the slurry are is selectively deposited inside of the porous mold to form a deposit,
    wherein optionally the mold is a porous plaster or a porous gypsum mold;
    (d) applying an internal or external electric field, thereby forming a powder deposition in the porous mold, wherein optionally the deposition forms a desired shape and a Functionally Graded Material (FGM) from the slurry in the form of a powder deposition in the porous mold wherein optionally the method further comprises drying and/or firing the electric field-shaped slurry.

4. The process of claim 3, wherein the powder comprises $Al_2O_3$, SiC, $ZrO_2$, zeolite 3A, zeolite 5A, $TiO_2$, Ni, Cu, equivalents thereof or any combination thereof;

or, the particle charging agent comprises n-butylamine as the particle-charging additive.

5. The process of claim 3, wherein the mold comprises an aligned porous structure, and optionally the aligned porous structure is made by a unidirectional freezing followed by freeze-drying and sintering; after the aligned porous structures were sintered they are impregnated by brushing gold; and optionally after annealing at 600° C., gold wires having diameters ranging from several hundreds of nanometers to several micrometers were applied.

6. An Electrophoretic Deposition-Slip casting method for near net shaping of articles comprising the following steps:
(a) preparing a porous mold conforming to the shape of a desired casting geometry, wherein optionally the mold comprises a gypsum mold;
(b) preparing at least one suspension (slurry) to be used to deposit the articles desired,
wherein optionally the at least one suspension (slurry) comprises a powder comprising a metal, ceramic, polymer or an equivalent compound or any combination thereof,
and also optionally comprises a particle-charging additive,
and optionally the at least one suspension (slurry) comprises a surfactant, which optionally comprises at least one, several or all of a dispersant, an electrosteric stabilizer, an electrostatic dispersant, a binders, wherein optionally the binder comprises phosphate ester;
(c) assembling the mold of step (a) in a silicone mold, or equivalent mold, wherein the mold of step (a) separates the said silicone or equivalent mold into two impermeable chambers;
(d) placing two electrodes at two ends of the said silicone or equivalent mold;
(e) pouring the at least one suspension (slurry) into a chamber A in the said silicone or equivalent mold,
wherein optionally at least two suspensions (slurries) are added sequentially, or together (simultaneously);
(f) pouring an ionic solution into a chamber B of the said silicone or equivalent mold;
(g) applying an electric field to the said electrodes,
wherein optionally the electric field comprises an external electric field;
(h) adding the said suspension (slurry) to the said chamber A of the said silicone mold or equivalent,
wherein optionally the addition is by a circulation pump;
(i) drying the deposited suspension (slurry) (article) in the said mold of step (a) (optionally a gypsum mold) after deposition is complete; and
(j) removing the casting from the said mold of step (a) and sintering or firing the article,
wherein optionally the sintering or firing comprises a microwave sintering, pressureless sintering, hot isostatic pressing and/or by hot pressing in a rigid die.

7. The process of claim 6, wherein the powder comprises $Al_2O_3$, SiC, $ZrO_2$, zeolite 3A, zeolite 5A, $TiO_2$, Ni, Cu, equivalents thereof or any combination thereof.

8. The process of claim 6, wherein the particle charging agent comprises n-butylamine as the particle-charging additive.

9. The method of claim 6, wherein said gypsum mold is a water permeable mold, optionally made from plaster of Paris, and optionally part of the said gypsum mold is covered with organic glue while the area to be deposited is exposed.

10. The method of claim 6, wherein said suspensions comprise, or consist of: water, which optionally comprises distilled water, the said powders to be deposited, and a deflocculant, and optionally the powder concentration is from about 5% to 50% v/v, or from about 1% to 90%, or from about 10% to 40%, and optionally the suspension is processed for between about 1to 60 minutes, or for about 10, 20, 30, 40, 50 or 60 or more minutes, wherein optionally the suspension is processed using a planetary ball mill.

11. The method of claim 6, wherein the said powders comprise metallic, ceramic or polymeric powders, and optionally the powders comprise a particle size ranging from about 40 nm to about 50 microns, or from about 30 nm to about 60 microns, or from about 10 nm to about 100 microns, and optionally the powder comprises any permutation of metallic, ceramic, polymeric, metal/ceramic composite, metal/polymer composite, polymer/ceramic composite, metal/ceramic/polymer composite.

12. The method of claim 6, wherein said silicone mold is capable of holding the said gypsum mold, and optionally the said gypsum mold separates the said silicone mold into the said chamber A and chamber B, and optionally the silicone mold has elasticity which can ensure that there is no mixing of liquid in chamber A and chamber B.

13. The method of claim 6, wherein said the electrodes are made of stainless steel.

14. The method of claim 6, wherein said ionic solution comprises a water, wherein optionally the water is DI water, and tetramethylammonium hydroxide (TMAH).

15. The method of claim 6, wherein the pH of the ionic solution ranges from between about pH 9 to about pH 13, or about pH 8, pH 9, pH 10, pH 11, pH 12 or pH 13.

16. The method of claim 6, wherein said the electric field comprises a DC voltage, and optionally the voltage ranges from between about 5 V to about 400 V, or about 5, 10, 20, 30, 40, 50, 60, 70, 80, 90, 100, 150, 200, 250, 300, 350 or 400 V.

17. The method of claim 6, wherein the mixing and deposition steps (processes) are simultaneous.

18. The method of claim 6, wherein the sintering is done with a minimum of warping, which can be achieved by the process comprising: using particle sizes to control the sintering rate, creating a variable temperature gradient (which optionally can be with laserbeam surface heating), microwave sintering, electric discharge through a stepped and/or use of a tapered die.

19. A Functionally Graded Material (FGM) made by the process of claim 1, or claim 3.

20. A product of manufacture comprising the Functionally Graded Material (FGM) of claim 19.

* * * * *